(12) United States Patent
Jang

(10) Patent No.: US 11,539,958 B2
(45) Date of Patent: Dec. 27, 2022

(54) METHOD FOR PREDICTING SUBBLOCK-BASED TEMPORAL MOTION VECTOR AND APPARATUS THEREFOR

(71) Applicant: LG ELECTRONICS INC., Seoul (KR)

(72) Inventor: Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/260,739

(22) PCT Filed: Jul. 17, 2019

(86) PCT No.: PCT/KR2019/008846
§ 371 (c)(1),
(2) Date: Jan. 15, 2021

(87) PCT Pub. No.: WO2020/017892
PCT Pub. Date: Jan. 23, 2020

(65) Prior Publication Data
US 2021/0266560 A1 Aug. 26, 2021

Related U.S. Application Data

(60) Provisional application No. 62/699,718, filed on Jul. 17, 2018.

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/132* (2014.11); *H04N 19/176* (2014.11); *H04N 19/46* (2014.11)

(58) Field of Classification Search
None
See application file for complete search history.

(56) References Cited

U.S. PATENT DOCUMENTS

| 2018/0070100 A1 | 3/2018 | Chen et al. | |
| 2020/0014931 A1* | 1/2020 | Hsiao | H04N 19/517 |
| 2021/0185338 A1* | 6/2021 | Xiu | H04N 19/51 |

FOREIGN PATENT DOCUMENTS

KR 1020170108010 9/2017

OTHER PUBLICATIONS

Chen, Jianle et al., Algorithm Description of Joint Exploration Test Model 7 (JEM 7). Joint Video Exploration Team (JVET) of ITU-T SG 16 WP 3 and ISO/IEC JTC 1/SC 29/WG 11. JVET-G1001, 7th Meeting, Torino, IT, Jul. 21, 2017, pp. 1-44, see sections 2.3.1, 2.3.1.1-2.3.1.1-2.3.1.3; and figures 11-12.

(Continued)

*Primary Examiner* — Christopher G Findley
(74) *Attorney, Agent, or Firm* — Dentons US LLP

(57) ABSTRACT

An image decoding method performed by a decoding apparatus according to the present disclosure includes determining whether to use an advanced temporal motion vector predictor (ATMVP) candidate of sub-block unit for a current block, specifying a corresponding block corresponding to the current block in a reference picture based on a motion vector for a spatial neighboring block of the current block when the ATMVP candidate of the sub-block unit is used, deriving the ATMVP candidate of the sub-block unit for the current block based on motion vectors of sub-block unit of the corresponding block, constructing a merge candidate list including the ATMVP candidate of the sub-block unit for the current block, generating prediction samples of the current block by deriving motion vectors of the sub-block unit for the current block based on the merge candidate list and (Continued)

reconstructing a current picture based on the prediction samples of the current block.

12 Claims, 20 Drawing Sheets

(51) Int. Cl.
    *H04N 19/132*     (2014.01)
    *H04N 19/176*     (2014.01)
    *H04N 19/46*     (2014.01)

(56) References Cited

OTHER PUBLICATIONS

Hsu, Chih-wei et al., Description of SDR video coding technology proposal by MediaTek, Joint Video Experts Team (JVET) of ITU-T SG 16 WP 3 and ISO/IEC JTC 1/SC 29/WG 11, JVET-J0018, 10th Meeting, San Diego, Apr. 20, 2018, pp. 1-61, see section 2.4.1.1; and figure 6.

Wang, Suhong et al., CE4-related; Simplification of ATMVP candidate derivation. Joint Video Experts Team (JVET) of ITU-T SG 16 WP 3 and ISO/IEC JTC 1/SC 29/WG 11, JVET-L0198_r2, 12th Meeting Macao, CN, Oct. 12, 2018, pp. 1-5, see pp. 1-4.

* cited by examiner

FIG. 8
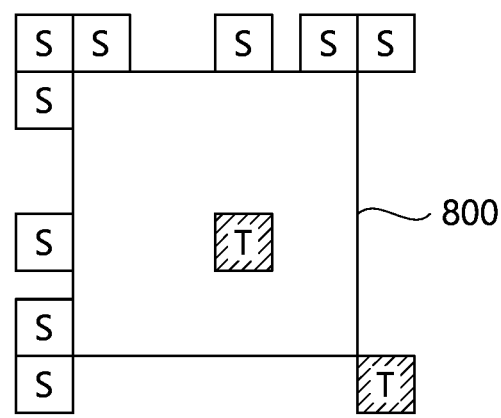

FIG. 11

METHOD FOR PREDICTING SUBBLOCK-BASED TEMPORAL MOTION VECTOR AND APPARATUS THEREFOR

CROSS-REFERENCE TO RELATED APPLICATIONS

This application is the National Stage filing under 35 U.S.C. 371 of International Application No. PCT/KR2019/008846, filed on Jul. 17, 2019, which claims the benefit of U.S. Provisional Application No. 62/699,718 filed on Jul. 17, 2018, the contents of which are all hereby incorporated by reference herein in their entirety.

BACKGROUND OF THE DISCLOSURE

Field of the Disclosure

The present disclosure relates to an image coding technology, and more specifically, a method and an apparatus for predicting a temporal motion vector in units of a sub-block in an image coding system.

Related Art

The demands for high-resolution and high-quality images and video, such as an ultra-high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY

An object of the present disclosure is to provide a method and an apparatus for enhancing image coding efficiency.

Another object of the present disclosure is to provide an efficient inter-prediction method and apparatus.

Still another object of the present disclosure is to provide a method and an apparatus for deriving a sub-block-based temporal motion vector, thereby improving the prediction performance.

Yet another object of the present disclosure is to provide a method and an apparatus for adjusting the size of a sub-block when deriving a sub-block-based temporal motion vector, thereby reducing the loss of the compression performance compared to the improvement in the complexity of a hardware.

An exemplary embodiment of the present disclosure provides an image decoding method performed by a decoding apparatus. The method includes: determining whether to use an advanced temporal motion vector predictor (ATMVP) candidate in units of sub-block for a current block, specifying a corresponding block corresponding to the current block in a reference picture based on a motion vector for a spatial neighboring block of the current block, if the ATMVP candidate in units of sub-block is used, deriving the ATMVP candidate in units of sub-block for the current block based on the motion vectors in units of sub-block of the corresponding block, configuring a merge candidate list including the ATMVP candidate in units of sub-block for the current block, generating prediction samples of the current block by deriving the motion vectors in units of sub-block for the current block based on the merge candidate list, and reconstructing a current picture based on the prediction samples of the current block.

Another exemplary embodiment of the present disclosure provides an image encoding method performed by an encoding apparatus. The method includes: determining whether to use an advanced temporal motion vector predictor (ATMVP) candidate in units of sub-block for a current block, specifying a corresponding block corresponding to the current block in a reference picture based on a motion vector for a spatial neighboring block of the current block, if the ATMVP candidate in units of sub-block is used, deriving the ATMVP candidate in units of sub-block for the current block based on the motion vectors in units of sub-block of the corresponding block, configuring a merge candidate list including the ATMVP candidate in units of sub-block for the current block, generating a candidate index indicating a candidate applied to the current block among the candidates within the merge candidate list, and encoding image information including the candidate index to output the encoded image information as a bitstream.

The present disclosure may enhance the overall image/video compression efficiency.

The present disclosure may enhance the efficiency of the image coding based on the inter-prediction, and reduce an amount of data necessary for transmitting the residual signal through the efficient inter-prediction.

The present disclosure may efficiently induce the temporal motion vector information in units of sub-block according to the size of the current block, thereby improving the performance and efficiency of the inter-prediction.

BRIEF DESCRIPTION OF THE DRAWINGS

FIG. 11 is a diagram for schematically explaining a method for deriving a sub-block-based temporal motion candidate (ATMVP-ext candidate) in the inter-prediction.

DESCRIPTION OF EXEMPLARY EMBODIMENTS

Figure 1:
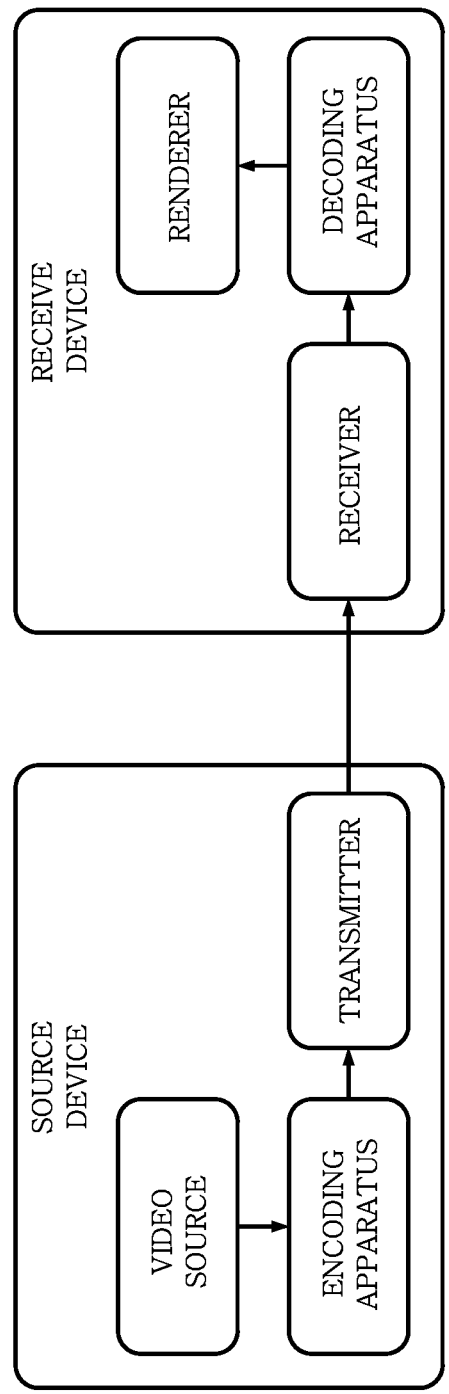
FIG. 1 schematically illustrates an example of a video/image coding system to which the present disclosure is applicable.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

Hereinafter, preferred embodiments of this document are described more specifically with reference to the accompanying drawings. Hereinafter, in the drawings, the same reference numeral is used in the same element, and a redundant description of the same element may be omitted.

This document relates to video/image coding. For example, the method/embodiment disclosed in this document may be related to a Versatile Video Coding (VVC) standard (ITU-T Rec. H.266), a next-generation video/image coding standard after VVC, or other video coding related standards (e.g., High Efficiency Video Coding (HEVC) standard (ITU-T Rec. H.265), and essential video coding (EVC) standard, AVS2 standard, etc.).

In this document, various embodiments of the video/image coding may be presented, and the above embodiments may be performed in combination with each other unless otherwise stated.

In this document, video may mean a set of a series of images over time. A picture generally means a unit representing one image in a specific time period, and a slice/tile is a unit constituting a part of the picture in the coding. The slice/tile may include one or more coding tree units (CTUs). One picture may be constituted by one or more slices/tiles. One picture may include one or more tile groups. One tile group may include one or more tiles.

A pixel or a pel may mean a smallest unit constituting one picture (or image). Further, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In this document, the term "I" and "," should be interpreted to indicate "and/or." For instance, the expression "A/B" may mean "A and/or B." Further, "A, B" may mean "A and/or B." Further, "A/B/C" may mean "at least one of A, B, and/or C." Further, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

FIG. 1 schematically illustrates an example of a video/image coding system to which embodiments of this document may be applied.

Referring to FIG. 1, a video/image coding system may include a source device and a receiving device. The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/ image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
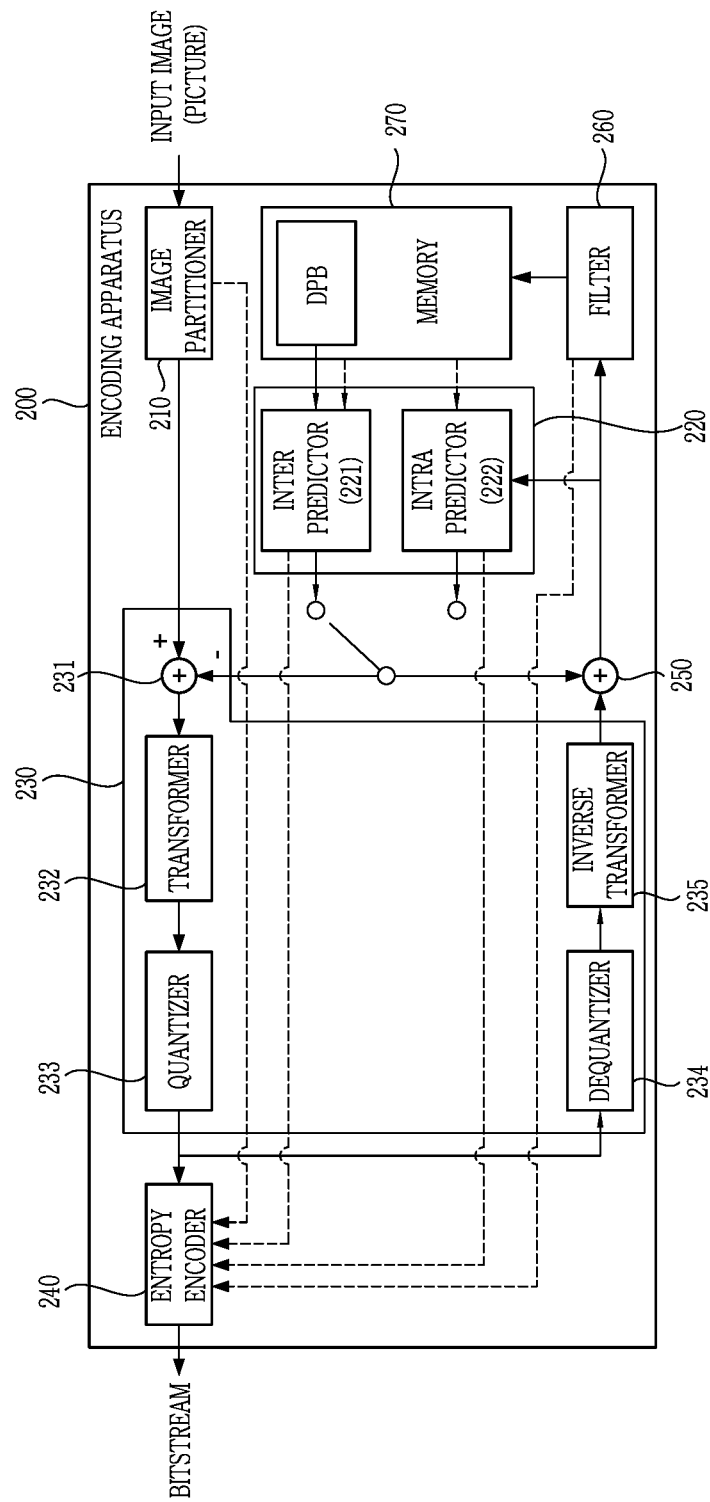
FIG. 2 is a diagram for schematically explaining a configuration of a video/image encoding apparatus to which the present disclosure is applicable.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

The subtractor 231 subtracts a prediction signal (a predicted block, prediction samples, or a prediction sample array) output from the predictor 220 from an input image signal (an original block, original samples, or an original sample array) to generate a residual signal (a residual block, residual samples, or a residual sample array) and the generated residual signal is transmitted to the transformer 232. The predictor 220 may perform prediction for a processing target block (hereinafter, referred to as a current block) and generate a predicted block including prediction samples for the current block. The predictor 220 may determine whether intra prediction is applied or inter prediction is applied in units of the current block or CU. The predictor may generate various information on prediction, such as prediction mode information, and transfer the generated various information to the entropy encoder 240 as described below in describing each prediction mode. The information on the prediction may be encoded by the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture inde.g., The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate the prediction signal based on various prediction methods to be described below. For example, the predictor may apply the intra prediction or inter prediction for prediction for one block and simultaneously apply the intra prediction and the inter prediction. This may be called combined inter and intra prediction (CIIP). In addition, the predictor may perform intra block copy (IBC) to predict the block. The intra block copy may be used for content image/video coding such as a game, for example, screen content coding (SCC). The IBC basically performs prediction in the current picture, but may be performed similarly to the inter prediction in that the IBC derives a reference block in the current picture. That is, the IBC may use at least one of the inter prediction techniques described in this document.

A prediction signal generated through the inter predictor 221 and/or the intra predictor 222 may be used for generating a reconstruction signal or used for generating the residual signal. The transformer 232 may generate transform coefficients by applying a transform technique to the residual signal. For example, the transform technique may include Discrete Cosine Transform (DCT), Discrete Sine Transform (DST), Graph-Based Transform (GBT), or Conditionally Non-linear Transform (CNT). Here, when relationship information between pixels is expressed by a graph, the GBT means a transform obtained from the graph. The CNT means a transform which generates the prediction signal by using all previously reconstructed pixels and is acquired based on the generated prediction signal. Further, a transform process may be applied to a square pixel block having the same size and applied even to a non-square block having a variable size.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. Signaled/transmitted information and/or syntax elements described later in this document may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the predictor 220 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
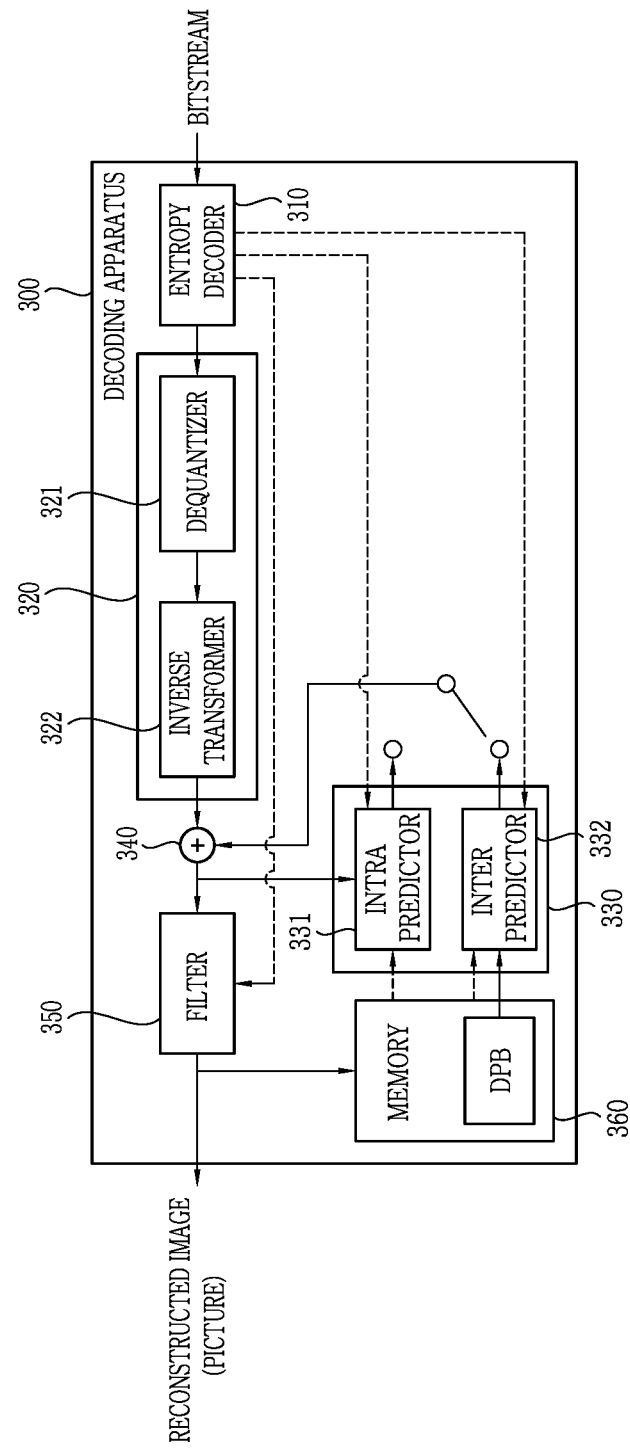
FIG. 3 is a diagram for schematically explaining a configuration of a video/image decoding apparatus to which the present disclosure is applicable.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (e.g. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and information on the residual on which the entropy decoding was performed in the entropy decoder 310, that is, the quantized transform coefficients and related parameter information, may be input to the dequantizer 321. In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor 330 may perform prediction on the current block and generate a predicted block including prediction samples for the current block. The predictor 330 may determine whether intra prediction or inter prediction is applied to the current block based on the information on the prediction output from the entropy decoder 310 and may determine a specific intra/inter prediction mode.

The predictor 330 may generate the prediction signal based on various prediction methods to be described below. For example, the predictor 330 may apply the intra prediction or inter prediction for prediction for one block and simultaneously apply the intra prediction and the inter prediction. This may be called combined inter and intra prediction (CIIP). In addition, the predictor 330 may perform intra block copy (IBC) to predict the block. The intra block copy may be used for content image/video coding such as a game, for example, screen content coding (SCC). The IBC basically performs prediction in the current picture, but may be performed similarly to the inter prediction in that the IBC derives a reference block in the current picture. That is, the IBC may use at least one of the inter prediction techniques described in this document.

The intra predictor 332 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 332 may determine the prediction mode applied to the current block by using the prediction mode applied to the neighboring block.

The inter predictor 331 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture inde.g., The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 331 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor 330. If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 331. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 332.

In the present disclosure, the embodiments described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

Further, exemplary embodiments disclosed in the present specification may be performed by the respective components of the encoding apparatus 200 illustrated in FIG. 2 and the respective components of the decoding apparatus 300 illustrated in FIG. 3, which are described above.

Meanwhile, the prediction is performed to enhance the compression efficiency when a video coding is performed as described above. Therefore, a predicted block including prediction samples for a current block, which is a block to be coded, may be generated. Here, the predicted block includes prediction samples in a spatial domain (or a pixel domain). The predicted block is equally derived by the encoding apparatus and the decoding apparatus, in which the encoding apparatus may signal the information about a residual (residual information) between an original block and the predicted block rather than an original sample value itself of the original block to the decoding apparatus, thereby enhancing the image coding efficiency. The decoding apparatus may derive a residual block including residual samples based on the residual information, generate a reconstructed block including reconstructed samples by summing the residual block and the predicted block, and generate a reconstructed picture including the reconstructed blocks.

The residual information may be generated by the transform and quantization procedures. For example, the encoding apparatus may signal the related residual information to the decoding apparatus (through a bitstream) by deriving the residual block between the original block and the predicted block, deriving transform coefficients by performing a transform procedure for the residual samples (residual sample array) included in the residual block, and deriving quantized transform coefficients by performing a quantization procedure for the transform coefficients. Here, the residual information may include information such as the value information of the quantized transform coefficients, location information, a transform technique, a transform kernel, and a quantized parameter. The decoding apparatus may perform dequantization/inverse transform procedures based on the residual information and derive the residual samples (or the residual block). The decoding apparatus may generate a reconstructed picture based on the predicted block and the residual block. Further, the encoding apparatus may derive the residual block by dequantizing/inversely transforming the quantized transform coefficients for referring to the inter-prediction of a next picture, and generate the reconstructed picture based on the residual block.

Figure 4:
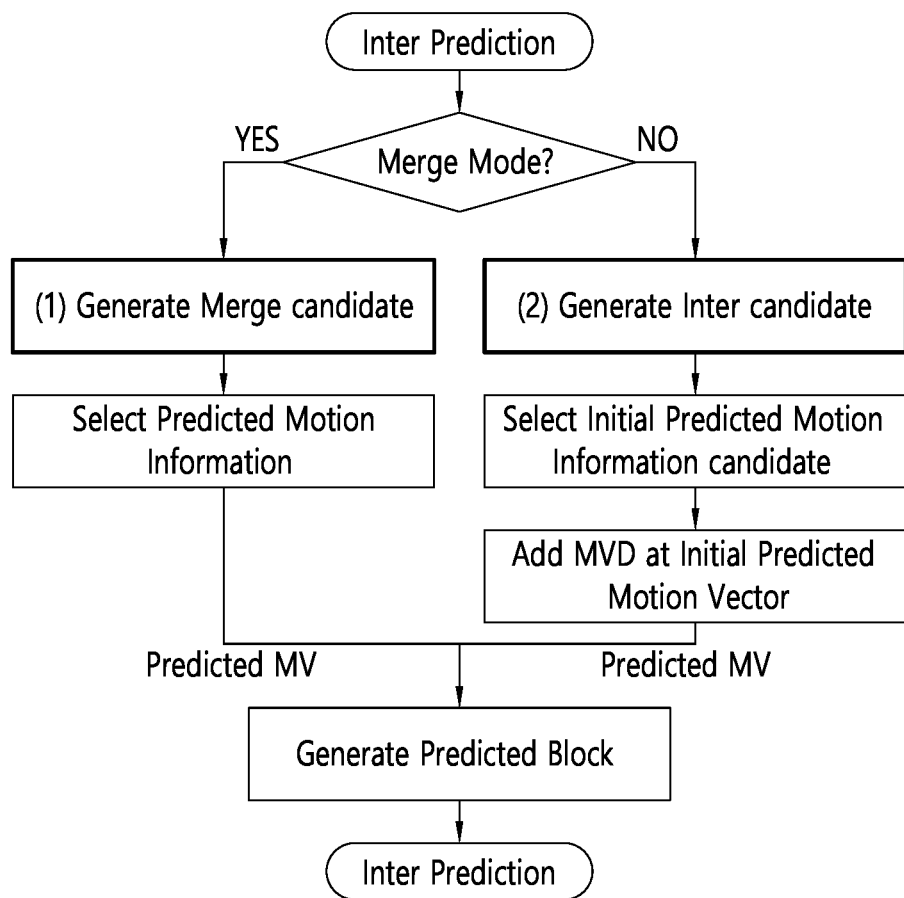
FIG. 4 is a flowchart for schematically explaining an inter-prediction method.

FIG. 4 is a flowchart for schematically explaining an inter-prediction method.

Referring to FIG. 4, an inter-prediction method is a technology for generating a predicted motion information (PMI), and may be classified into a merge mode, an inter mode including a motion vector prediction (MVP) mode, and the like. At this time, the inter-prediction mode such as the merge mode and the inter mode derives a motion information candidate (e.g., a merge candidate, an MVP candidate, or the like) for generating a prediction block by inducing a final PMI, and signal the information (e.g., a merge index, an mvp index, an mvp flag, or the like) about a selected candidate by selecting the candidate to be used as the final PMI among the derived motion information candidates. Further, the inter-prediction mode may additionally signal a reference picture index, a motion vector difference (MVD), and the like. Here, the inter-prediction mode may be classified into the merge mode, the inter mode, and the like according to whether to additionally signal the reference picture index, the motion vector difference, or the like.

For example, the merge mode is a method for performing the inter-prediction by signaling a merge index indicating a candidate to be used as the final PMI among the merge candidates. That is, the merge mode may generate predicted samples (prediction block) of a current block using the motion information of the merge candidate indicated by the merge index among the merge candidates. Therefore, the merge mode does not require additional syntax information other than the merge index for inducing the final PMI.

The inter mode is an inter-prediction method inducing the final PMI by additionally signaling the motion vector difference (MVD) together with the mvp flag (the mvp index) indicating the candidate to be used as the final PMI among the MVP candidates. That is, the inter mode may induce the final PMI based on the motion vector of the MVP candidate indicated by the mvp flag (the mvp index) among the MVP candidates and the motion vector difference (MVD), and generate the predicted samples (the prediction block) of the current block using the final PMI.

Figure 5:
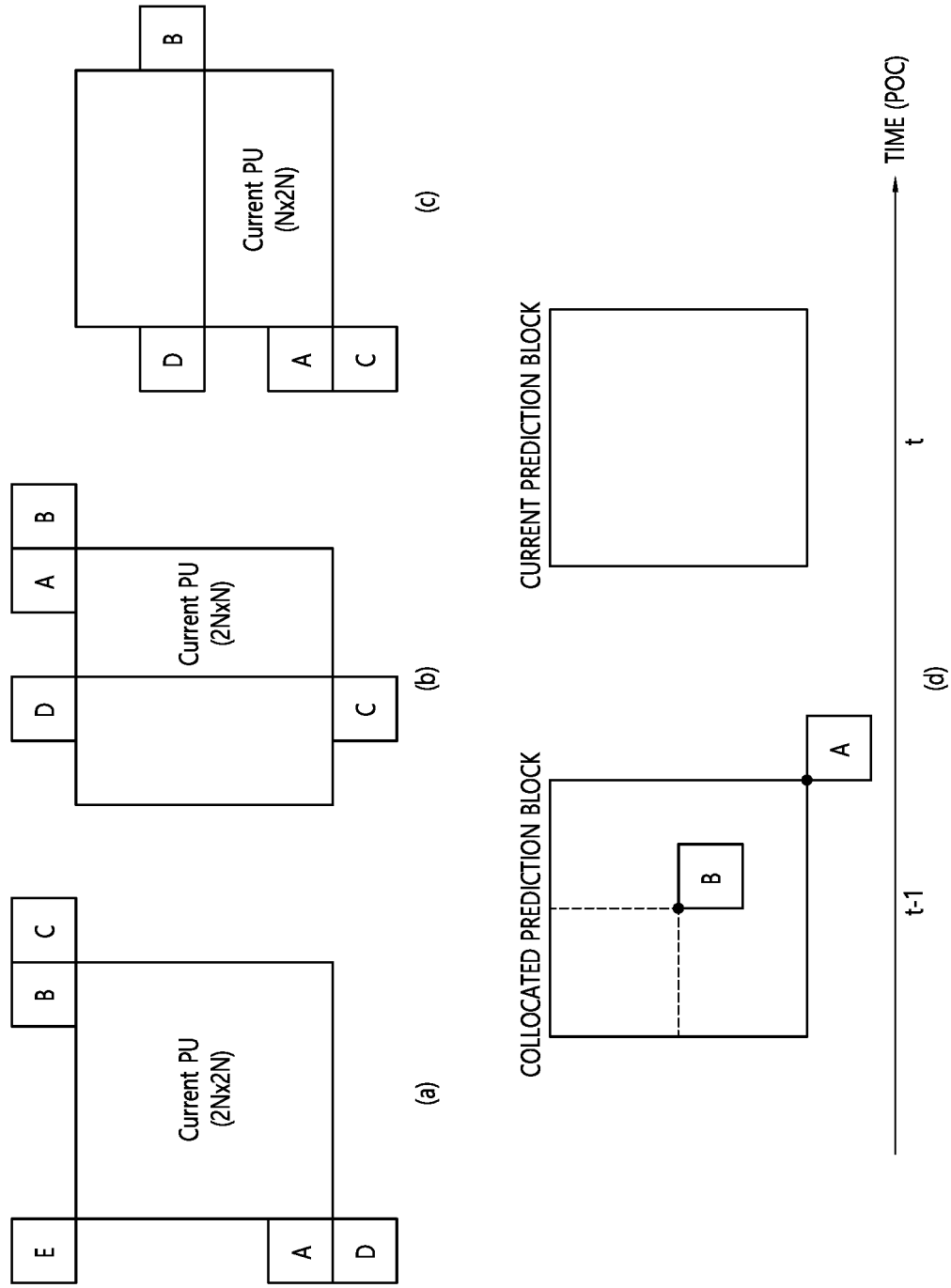
FIG. 5 is a diagram for explaining an inter-prediction method to which a merge mode is applied.

FIG. 5 is a diagram for explaining the inter-prediction method to which a merge mode is applied.

In the coding of a video signal, the inter-prediction predicts a current block using the temporal correlation. The current block performs the prediction with reference to at least one frame (picture) previously coded. The inter-prediction may be performed for the prediction block having the non-symmetric shape as well as the prediction block having the square shape. According to the inter-prediction, the encoding apparatus may transmit the reference index, the motion information, and the residual signal to the decoding apparatus. In this case, the merge mode does not transmit the motion information of the current prediction block, and induce the motion information of the current prediction block using the motion information of a neighbor prediction block. Therefore, the merge mode may induce the motion information of the current prediction block by transmitting flag information informing that the merge mode has been used and the merge index informing which neighbor prediction block has been used.

The encoding apparatus should search a merge candidate block used for inducing the motion information of the current prediction block in order to perform the merge mode. For example, the merge candidate block may be used up to five at maximum, but the present disclosure is not limited thereto. Further, the maximum number of merge candidate blocks may be transmitted by a slice header, and the present disclosure is not limited thereto. After finding the merge candidate blocks, the encoding apparatus may generate a merge list, and select the merge candidate block having the smallest cost in the merge list as a final merge candidate block.

The present disclosure provides various exemplary embodiments for the merge candidate block configuring the merge list.

The merge list may use five merge candidate blocks, and for example, may use four spatial merge candidates and one temporal merge candidate. As a specific example, the spatial merge candidate may use the blocks illustrated in (a) of FIG. 5 to (c) of FIG. 5 as the spatial merge candidate.

(a) of FIG. 5 illustrates the location of the spatial merge candidate of a 2N×2N current prediction block. For example, the encoding apparatus may search for five blocks illustrated in (a) of FIG. 5 in the order of A, B, C, D, E to construct four among them as the merge list.

(b) of FIG. 5 illustrates the location of the spatial merge candidate in the case where the size of the current prediction block is 2N×N and the current prediction block is located on the right. For example, the encoding apparatus may search for four blocks illustrated in (b) of FIG. 5 in the order of A, B, C, D to construct the merge list.

(c) of FIG. 5 illustrates the location of the spatial merge candidate in the case where the size of the current prediction block is N×2N and the current prediction block is located on the bottom. For example, the encoding apparatus may search for four blocks illustrated in (c) of FIG. 5 in the order of A, B, C, D to construct the merge list. Meanwhile, a candidate having the overlapping motion information among the spatial merge candidates may be removed from the merge list.

The merge list may construct the spatial merge candidate, and then construct the temporal merge candidate.

Referring to (d) of FIG. 5, the temporal merge candidate may use the prediction block of the same location as that of the current prediction block within a frame (picture) different from a current frame (picture). For example, the encoding apparatus may search for two blocks illustrated in (d) of FIG. 5 in the order of A, B to construct the merge list. Here, the different frame may be earlier or later than the current frame in the picture order count (POC).

Figure 6:
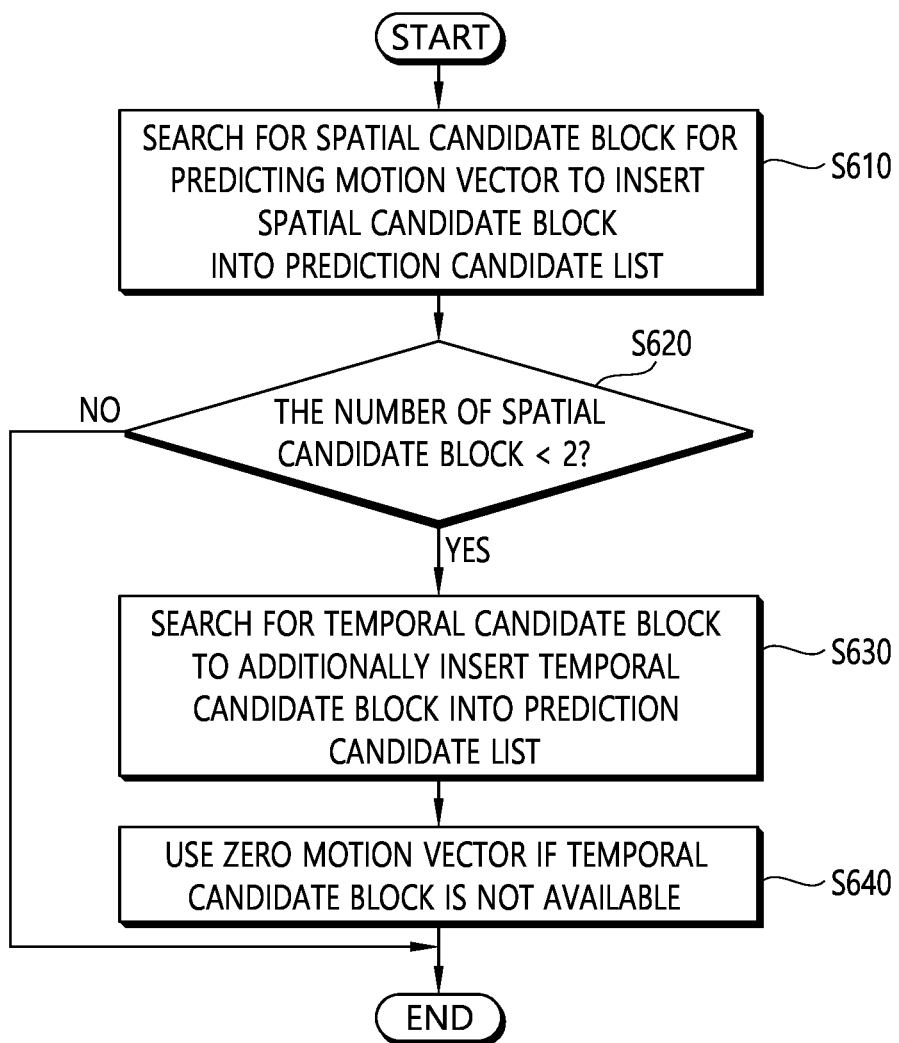
FIG. 6 is a flowchart for explaining an inter-prediction method to which an MVP mode is applied.

FIG. 6 is a flowchart for explaining the inter-prediction method to which an MVP mode is applied.

In the case of the MVP mode, the encoding apparatus predicts the motion vector according to the type of the prediction block and transmits a difference value between an optimal motion vector and a prediction value to the decoding apparatus. In this case, the encoding apparatus transmits the motion vector difference (MVD), the neighboring block information, the reference index, and the like to the decoding apparatus.

The encoding apparatus may construct a prediction candidate list for predicting the motion vector, and the prediction candidate list may include at least one of the spatial candidate block and the temporal candidate block.

Referring to FIG. 6, the encoding apparatus may search for a spatial candidate block for predicting a motion vector to insert the spatial candidate block into a prediction candidate list (S610). The searching of the spatial candidate block may apply the method illustrated in FIG. 5.

The encoding apparatus may confirm whether the number of spatial candidate blocks is less than 2 (S620).

As the confirmation result, if the number of spatial candidate blocks is less than 2, the encoding apparatus may search for a temporal candidate block to add the temporal candidate block to the prediction candidate list (S630). At this time, if all of the temporal candidate blocks may not be used, the encoding apparatus may use a zero motion vector as a motion vector prediction value (S640).

A process of configuring the temporal candidate block may apply the method illustrated in (d) of FIG. 5.

Meanwhile, as the confirmation result, if the number of spatial candidate blocks is 2 or more, the encoding apparatus may terminate the configuration of the prediction candidate list, and select the block having the smallest cost among the candidate blocks. The encoding apparatus may determine the motion vector of the selected candidate block as the motion vector prediction value of the current block, and obtain a motion vector difference using the motion vector prediction value. The thus obtained motion vector difference may be transmitted to the decoding apparatus.

As described above, when the inter-prediction is performed, the spatial similarity information and temporal similarity information of the current block may be used. At this time, the inter-prediction may be performed by variously configuring the spatial candidate and the temporal candidate according to the kinds (e.g., the merge mode, the MVP mode, and the like) of the mode used for the inter-prediction, thereby improving the prediction performance and the accuracy of the prediction.

Figure 7:
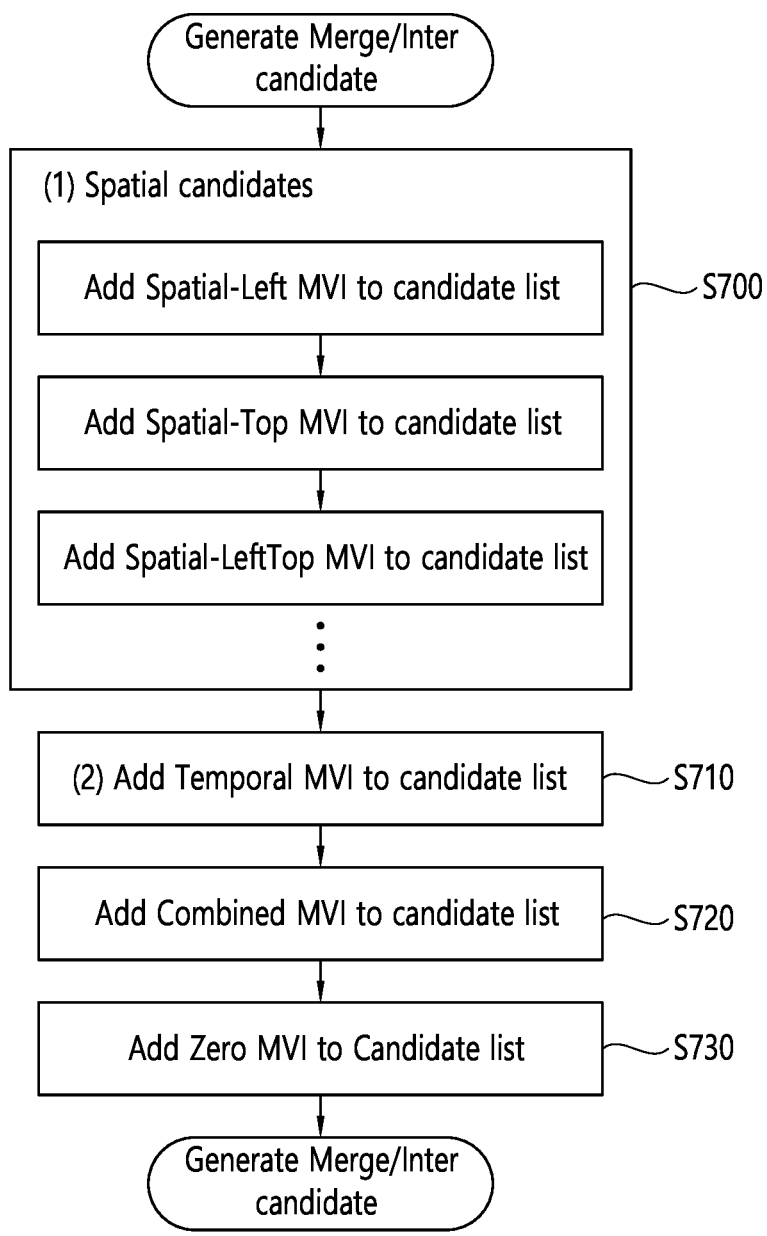
FIG. 7 is a flowchart for schematically explaining a method for configuring a motion information candidate in the inter-prediction, and FIG. 8 exemplarily illustrates a spatial neighboring block and a temporal neighboring block of a current block used for configuring a motion information candidate.

FIG. 7 is a flowchart for schematically explaining a method for configuring a motion information candidate in the inter-prediction, and FIG. 8 exemplarily illustrates a spatial neighboring block and a temporal neighboring block of a current block used for configuring the motion information candidate.

The exemplary embodiment illustrated in FIGS. 7 and 8 is illustrated by generalizing a process of configuring a candidate list (a motion information candidate list) by inducing the spatial candidate and the temporal candidate when the inter-prediction is performed by applying the merge mode, the MVP mode, or the like.

Referring to FIG. 7, the encoding apparatus/the decoding apparatus may derive a spatial motion information candidate based on a spatial neighboring block of a current block (S700).

As illustrated in FIG. 8, the spatial neighboring block refers to neighboring blocks located around a current block 800, which is the target for which the inter-prediction is currently performed, and may include neighboring blocks located around the left of the current block 800 or neighboring blocks located around the top of the current block 800. For example, the spatial neighboring block may include the bottom-left corner neighboring block, left neighboring block, top-right corner neighboring block, top neighboring block, and top-left corner neighboring block of the current block 800. FIG. 8 illustrates the spatial neighboring blocks as "S".

According to an exemplary embodiment, the encoding apparatus/the decoding apparatus may detect available neighboring blocks by searching for the spatial neighboring blocks of the current block (e.g., the bottom-left corner neighboring block, the left neighboring block, the top-right corner neighboring block, the top neighboring block, and the top-left corner neighboring block) in a pre-defined order, and derive the motion information of the detected neighboring blocks as a spatial motion information candidate.

The encoding apparatus/the decoding apparatus may derive a temporal motion information candidate based on the temporal neighboring block of the current block (S710).

As described above with reference to FIG. 5, the temporal neighboring block is a block located on a picture (i.e., a reference picture) different from a current picture including the current block, and refers to a collocated block with the current block within the reference picture. Here, the reference picture may be earlier or later than the current picture in the picture order count (POC). Further, the reference picture used for inducing the temporal neighboring block may be referred to as a col picture (collocated picture). Further, the collocated block may represent the block located in the position within the col picture corresponding to the position of the current block, and be referred to as a col block. For example, as illustrated in FIG. 8, the temporal neighboring block may include the bottom-right corner neighboring block of the col block and/or the center bottom-right block of the col block located corresponding to the current block 800 within the reference picture (i.e., the col picture). FIG. 8 illustrates the temporal neighboring blocks as "T".

According to the exemplary embodiment, the encoding apparatus/the decoding apparatus may detect the available block by searching for the temporal neighboring blocks (e.g., the bottom-right corner neighboring block of the col block and the center bottom-right block of the col block) of the current block in the pre-defined order, and derive the motion information of the detected block as a temporal motion information candidate. As described above, a technique of using the temporal neighboring block may be referred to as a temporal motion vector prediction (TMVP).

The encoding apparatus/the decoding apparatus may construct a motion information candidate list based on the derived current candidates (the spatial motion information candidate and the temporal motion information candidate).

At this time, the encoding apparatus/the decoding apparatus may compare the number of derived current candidates (the spatial motion information candidate and/or the temporal motion information candidate) with the maximum candidate number necessary for configuring the motion information candidate list, and add a combined bi-predictive candidate and a zero vector candidate to the motion information candidate list if the number of current candidates is smaller than the maximum candidate number according to the comparison result (S720, S730). The maximum candidate number is pre-defined, or signaled from the encoding apparatus to the decoding apparatus.

As described above, when configuring the motion information candidate in the inter-prediction, the spatial motion information candidate derived based on the spatial similarity and the temporal motion information candidate derived based on the temporal similarity are used. However, since the TMVP method for deriving the motion information candidate using the temporal neighboring block uses the motion information of the col block within the reference picture corresponding to the bottom-right corner sample location of the current block or the center bottom-right sample location of the current block, there is the case where the motion within the screen is not reflected. Therefore, as a method for improving the conventional TMVP method, an adaptive temporal motion vector prediction (ATMVP) method may be used. The ATMVP is the method for correcting the temporal similarity information considering the spatial similarity, and the method for deriving the col block based on the location indicated by the motion vector of the spatial neighboring block, and using the motion vector of the derived col block as a temporal motion information candidate (i.e., an ATMVP candidate). As described above, the ATMVP may derive the col block using the spatial neighboring block, thereby further enhancing the accuracy of the col block compared to the conventional TMVP method.

Figure 9:
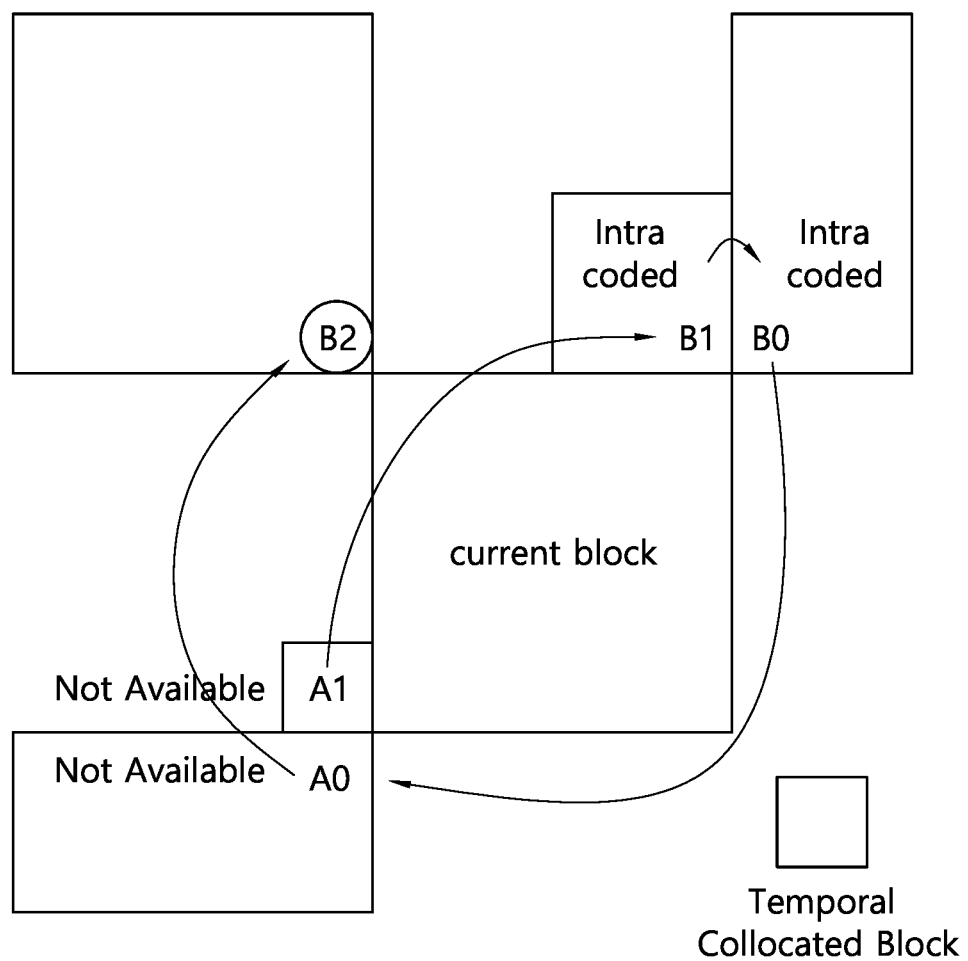
FIG. 9 exemplarily illustrates a spatial neighboring block which may be used for deriving a temporal motion information candidate (ATMVP candidate) in the inter-prediction.

FIG. 9 exemplarily illustrates the spatial neighboring block which may be used for deriving the temporal motion information candidate (the ATMVP candidate) in the inter-prediction.

As described above, the inter-prediction method applying the ATMVP (hereinafter, referred to as an ATMVP mode) may construct the temporal motion information candidate (i.e., the ATMVP candidate) by inducing the col block (or the corresponding block) using the spatial neighboring block of the current block.

Referring to FIG. 9, the spatial neighboring block in the ATMVP mode may include at least one of the bottom-left corner neighboring block (A0), left neighboring block (A1), top-right corner neighboring block (B0), top neighboring block (B1), and top-left corner neighboring block (B2) of the current block. In some cases, the spatial neighboring block may further include other neighboring blocks other than the neighboring blocks illustrated in FIG. 9, or may not include a specific neighboring block among the neighboring blocks illustrated in FIG. 9. Further, the spatial neighboring block may also include only the specific neighboring block, and for example, include only the left neighboring block (A1) of the current block.

If the ATMVP mode is to be applied, the encoding apparatus/the decoding apparatus may detect the motion vector (temporal vector) of the first available spatial neighboring block while searching for the spatial neighboring block in the pre-defined searching order when configuring the temporal motion information candidate, and determine the block which exists at the location indicated by the motion vector (temporal vector) of the spatial neighboring block in the reference picture as the col block (i.e., the corresponding block).

At this time, whether the spatial neighboring block is available may be determined by the reference picture information of the spatial neighboring block, the prediction mode information, the location information, or the like. For example, if the reference picture of the spatial neighboring block and the reference picture of the current block are the same, the corresponding spatial neighboring block may be determined as being available. Alternatively, if the spatial neighboring block is coded in an intra-prediction mode or the spatial neighboring block is located outside a current picture/tile, the corresponding spatial neighboring block may be determined as being not available.

Further, the searching order of the spatial neighboring block may be various defined, and for example, the order of A1, B1, B0, A0, B2. Alternatively, whether the A1 is available may be determined by searching for only the A1.

Figure 10:
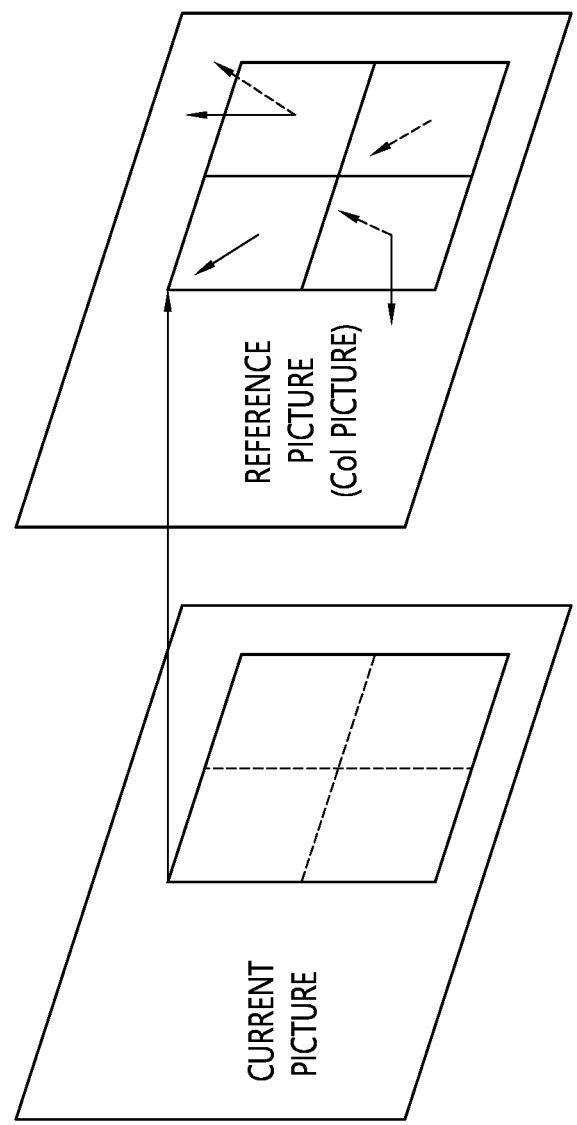
FIG. 10 is a diagram for schematically explaining a method for deriving a sub-block-based temporal motion information candidate (ATMVP candidate) in the inter-prediction.

FIG. 10 is a diagram for schematically explaining a method for deriving a sub-block-based temporal motion information candidate (an ATMVP candidate) in the inter-prediction.

An ATMVP mode may derive the temporal motion information candidate in units of sub-block with respect to the current block. In this case, the ATMVP mode may construct the temporal motion information candidate (the ATMVP candidate) by dividing the current block into sub-blocks to derive the motion vectors of the corresponding block corresponding to the respective sub-blocks. In this case, since the ATMVP candidate is derived based on the motion vectors in units of sub-block, the ATMVP candidate may also be referred to as a sub-block-based ATMVP (sbTMVP; a sub-block-based temporal motion vector prediction) candidate.

Referring to FIG. 10, as described above, the encoding apparatus/the decoding apparatus may specify the corresponding block located corresponding to the current block in the reference picture based on the spatial neighboring block of the current block. Further, the encoding apparatus/the decoding apparatus may derive the motion vectors in units of sub-block with respect to the corresponding block, and use the motion vectors in units of sub-block as the motion vectors in units of sub-block (i.e., the ATMVP candidate) for the current block. In this case, a scaling may be applied to the motion vectors in units of sub-block of the corresponding block, such that the motion vectors in units of sub-block of the current block may also be derived. The scaling may be performed based on the temporal distance difference between the reference picture of the corresponding block and the reference picture of the current block.

When the motion vectors in units of sub-block for the corresponding block may be derived, there may be the case where the motion vector does not exist in a specific sub-block within the corresponding block. In this case, the motion vector of the block located in the center of the corresponding block may be used for the specific sub-block in which the motion vector does not exist, and the motion vector may be stored as a representative motion vector. Here, the block located in the center of the corresponding block may indicate the block including the center bottom-right sample of the corresponding block. The center bottom-right sample of the corresponding block may indicate the sample located on the bottom-right among four samples located in the center of the corresponding block.

Figure 11:
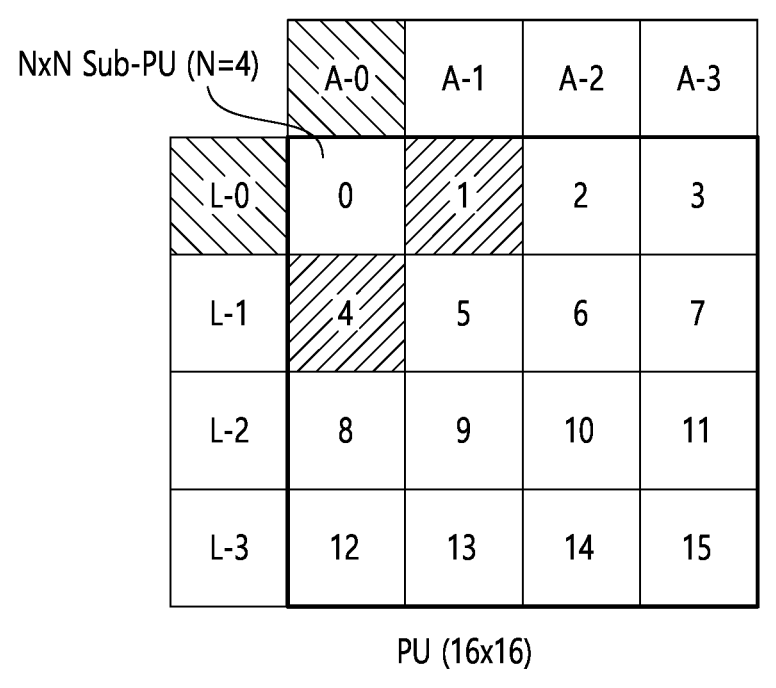

FIG. 11 is a diagram for schematically explaining a method for deriving the sub-block-based temporal motion candidate (ATMVP-ext candidate) in the inter-prediction.

An ATMVP-ext mode is a method for improving the conventional TMVP like the ATMVP method, and implemented by expanding the ATMVP. The ATM VP-ext mode may construct a temporal motion information candidate (i.e., an ATMVP-ext candidate) by deriving the motion vector in units of sub-block based on two spatial neighboring blocks and two temporal neighboring blocks for the current block.

Referring to FIG. 11, the current block may be split into sub-blocks (0 to 15). Here, a motion vector for the sub-block (0) of the current block may derived by detecting the motion vectors of the available block among spatial neighboring blocks (L-0, A-0) and the temporal neighboring blocks corresponding to the locations of the sub-blocks (1, 4) to calculate an average value of the motion vectors. At this time, if only some of four blocks (i.e., two spatial neighboring blocks and two temporal neighboring blocks) are available, an average value for the motion vectors of the available blocks may be calculated and used as the motion vector for the sub-block (0) of the current block. Here, a reference picture index may be fixed as zero and used. The motion vectors of other sub-blocks (1 to 15) within the current block may be derived by the process applied to the sub-block (0).

The temporal motion information candidate derived using the aforementioned ATMVP or ATMVP-ext may be included in the motion information candidate list (e.g., the merge candidate list, the MVP candidate list, or the sub-block merge candidate list). For example, when the motion information candidate list is constructed in the case of applying the merge mode, the number of merge candidates may be increased and applied to use the ATMVP method. At this time, the number of merge candidates may be applied without using an additional syntax. In the case of using the ATMVP candidate, the maximum number of merge candidates included in a sequence parameter set (SPS) may be changed from 5 to 6. For example, the conventional merge mode checks whether the merge candidates are available in the order of {A1, B1, B0, A0, B2, Combined bi-pred, Zero vector} to sequentially add five available merge candidates to the merge candidate list. Here, the A1, B1, B0, A0, B2 may represent the spatial neighboring blocks as illustrated in FIG. 9. When using the ATMVP method, the merge mode may check whether the merge candidates are available in the order of {A1, B1, B0, A0, ATMVP, B2, Combined bi-pred, Zero vector} to sequentially add six available merge candidates to the merge candidate list. Further, when using the ATMVP-ext method, the merge mode may not add a specific syntax for supporting the corresponding mode like the ATMVP method, and increase the number of merge candidates to construct the motion information candidate list. For example, when the merge mode uses both the ATMVP candidate and the ATMVP-ext candidate, the maximum number of merge candidates may be defined as 7, and at this time, the availability of the merge candidate list may be checked in the order of {A1, B1, B0, A0, ATMVP, ATMVP-ext, B2, Combined bi-pred, Zero vector}.

Hereinafter, the method for performing the inter-prediction by applying the ATMVP or ATMVP-ext method in units of sub-block will be described in detail.

Figure 12:
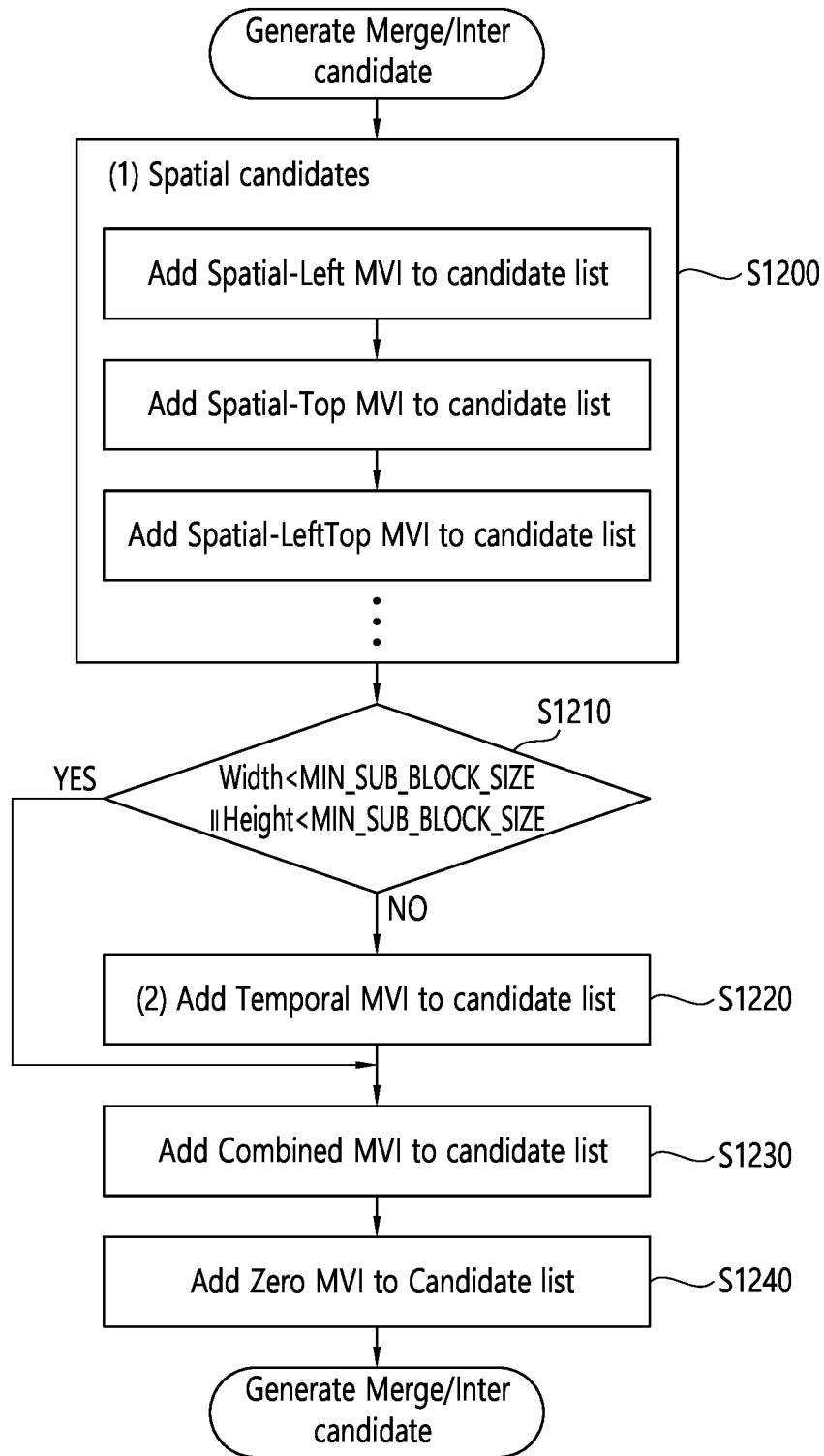
FIG. 12 is a flowchart for schematically explaining an inter-prediction method according to an exemplary embodiment of the present disclosure.

FIG. 12 is a flowchart for schematically explaining the inter-prediction method according to an exemplary embodiment of the present disclosure. The method illustrated in FIG. 12 may be performed by the encoding apparatus 200 illustrated in FIG. 2 and the decoding apparatus 300 illustrated in FIG. 3.

The encoding apparatus/the decoding apparatus may generate the prediction samples (the prediction block) by applying the inter-prediction mode such as the merge mode or the MVP (or an AMVP) mode for the current block. For example, if the merge mode is applied, the encoding apparatus/the decoding apparatus may construct the merge candidate list by deriving the merge candidate. Alternatively, if the MVP (or the AMVP) mode is applied, the encoding apparatus/the decoding apparatus may construct the MVP (or AMVP) candidate list by deriving the MVP (or AMVP) candidate. At this time, when the motion information candidate list (e.g., the merge candidate list, the MVP candidate list, or the like) is constructed, the motion information in units of sub-block may be induced and used as the motion information candidate. This will be described in detail with reference to FIG. 12.

Referring to FIG. 12, the encoding apparatus/the decoding apparatus may derive the spatial motion information candidate based on the spatial neighboring block of the current block to add the spatial motion information candidate to the motion information candidate list (S1200). This process may be performed in the same method as the step S500 illustrated in FIG. 5, and has been described with reference to FIGS. 7 and 8, such that the detailed description thereof will be omitted.

The encoding apparatus/the decoding apparatus may determine whether the temporal motion information candidate in units of sub-block may be derived based on the size of the current block (S1210).

According to an exemplary embodiment, the encoding apparatus/the decoding apparatus may determine whether the temporal motion information candidate in units of sub-block for the current block may be derived according to whether the size of the current block is smaller than the minimum size of the sub-block (MIN_SUB_BLOCK_SIZE).

Here, the minimum size of the sub-block may be pre-defined, and for example, pre-defined as the size of 8×8. However, the size of 8×8 is merely illustrative, and the minimum size of the sub-block may also be defined as different sizes in consideration of the hardware performance or coding efficiency of the encoder/the decoder. For example, the minimum size of the sub-block may also be the size of 8×8 or more, and also be defined as the size smaller than 8×8. Further, the information about the minimum size of the sub-block may be signaled from the encoding apparatus to the decoding apparatus.

If the size of the current block is larger than the minimum size of the sub-block, the encoding apparatus/the decoding apparatus may determine that the temporal motion information candidate in units of sub-block for the current block may be derived, and derive the temporal motion information candidate in units of sub-block for the current block to add the temporal motion information candidate in units of sub-block to the motion information candidate list (S1220).

According to the exemplary embodiment, if the minimum size of the sub-block is pre-defined as the size of 8×8 and the size of the current block is larger than the size of 8×8, the encoding apparatus/the decoding apparatus may split the current block into sub-blocks having the fixed sizes, and derive the temporal motion information candidate in units of sub-block for the current block based on the motion vectors of the sub-blocks within the corresponding block corresponding to the sub-blocks within the current block.

Here, the temporal motion information candidate in units of sub-block for the current block may be derived based on the motion vectors in units of sub-block of the corresponding block (or the col block) located corresponding to the current block in the reference picture (or the col picture). The corresponding block may be derived from the reference picture based on the motion vector of the spatial neighboring block of the current block. For example, the location of the corresponding block in the reference picture may be specified by the top-left sample of the corresponding block, and the location of the top-left sample of the corresponding block may correspond to the location moved from the location of the top-left sample of the current block by the motion vector of the spatial neighboring block in the reference picture. Further, the size (width/height) of the corresponding block may be equal to the size (width/height) of the current block.

The spatial neighboring block may be derived by checking whether it is available based on the neighboring blocks including at least one of the bottom-left corner neighboring block, left neighboring block, top-right corner neighboring block, top neighboring block, and top-left corner neighboring block of the current block. Since this has been described in detail with reference to FIG. 9, the detailed description thereof will be omitted.

When deriving the temporal motion information candidate in units of sub-block for the current block, the encoding apparatus/the decoding apparatus may derive the ATMVP candidate or ATMVP-ext candidate (hereinafter, referred to as the sbTMVP candidate for convenience of explanation) in units of sub-block by applying the aforementioned ATMVP or ATMVP-ext method, and add the ATMVP candidate or ATMVP-ext candidate to the motion information candidate list. Since the process of deriving the sbTMVP candidate has been described in detail with reference to FIGS. 10 and 11, the detailed description thereof will be omitted.

As the determination result in the step S1210, if the size of the current block is smaller than the minimum size of the sub-block, the encoding apparatus/the decoding apparatus may determine that the temporal motion information candidate in units of sub-block for the current block may not be derived, and may not perform the process of deriving the temporal motion information candidate in units of sub-block for the current block.

According to the exemplary embodiment, if the minimum size of the sub-block is pre-defined as the size of 8×8 and the size of the current block is the size of any one of 4×4, 4×8, 8×4, or 8×8, the encoding apparatus/the decoding apparatus may determine that the size of the current block is smaller than the minimum size of the sub-block not to derive the temporal motion information candidate in units of sub-block for the current block.

The encoding apparatus/the decoding apparatus may compare the number of derived current candidates (the spatial motion information candidate and the temporal motion information candidate) with the maximum number of candidates necessary for configuring the motion information candidate list, and add the combined bi-predictive candidate and the zero vector candidate to the motion information candidate list if the number of current candidates is smaller than the maximum number of candidates according to the comparison result (S1230, S1240). The maximum number of candidates may be pre-defined, or signaled from the encoding apparatus to the decoding apparatus.

Meanwhile, the process of deriving the temporal motion information candidate in units of sub-block for the current block requires a process of fetching the motion vectors in units of sub-block from the corresponding block in the reference picture. The reference picture at which the corresponding block is located is the picture in which the coding (encoding/decoding) is already completed, and stored in a memory (i.e., a DPB). Therefore, to obtain the motion information from the reference picture stored in the memory (i.e., the DPB), the process of fetching the corresponding information by approaching the memory is required.

Figure 13:
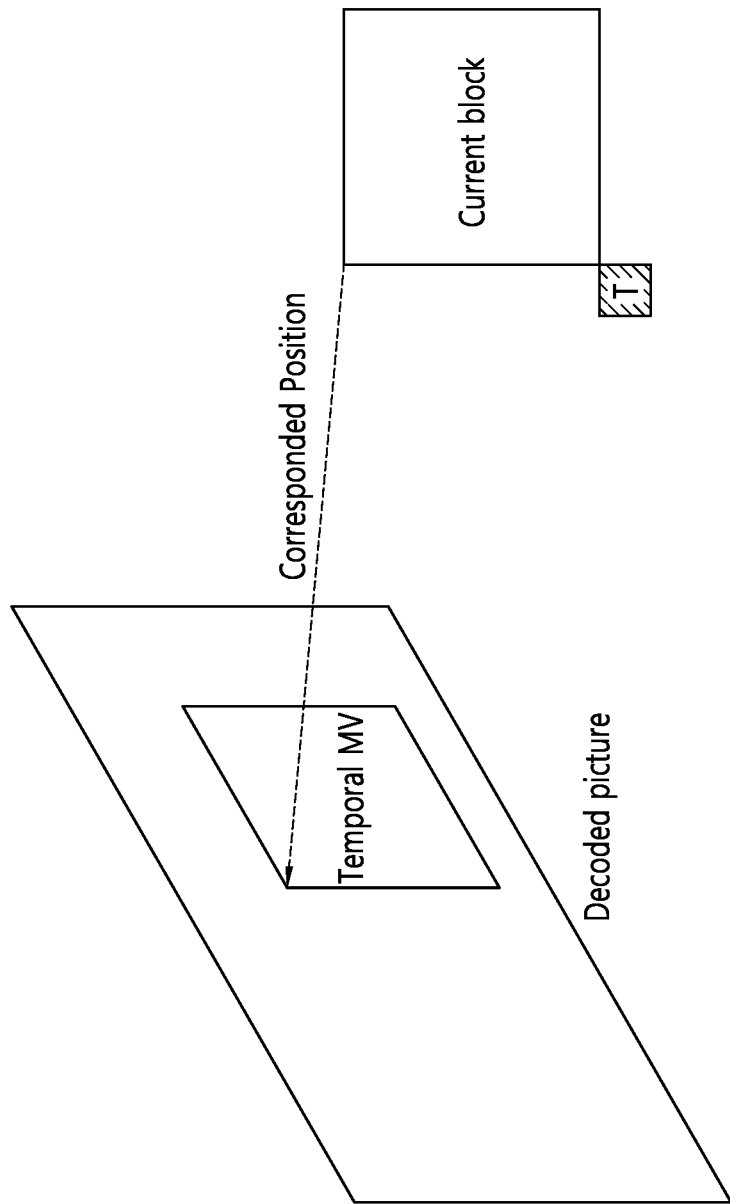
FIGS. 13 and 14 are diagrams for explaining a process of inducing a motion vector in units of current block from a corresponding block of a reference picture.
Figure 14:
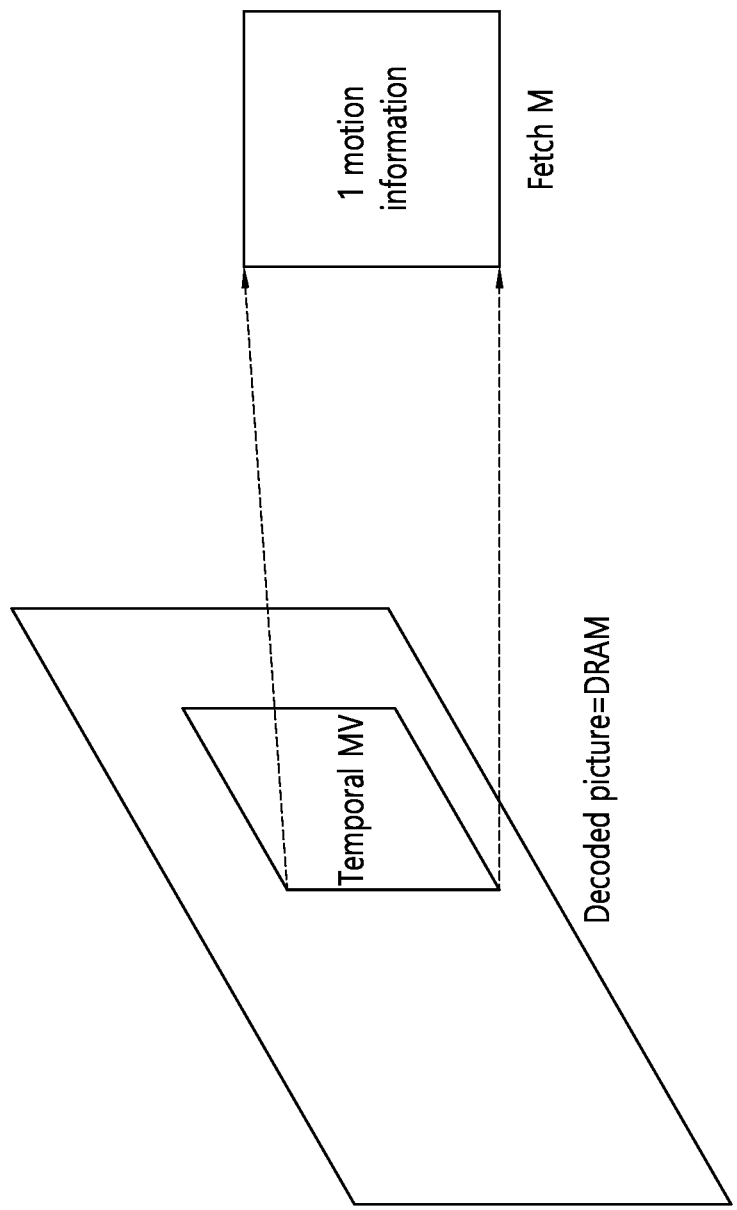
Figure 15:
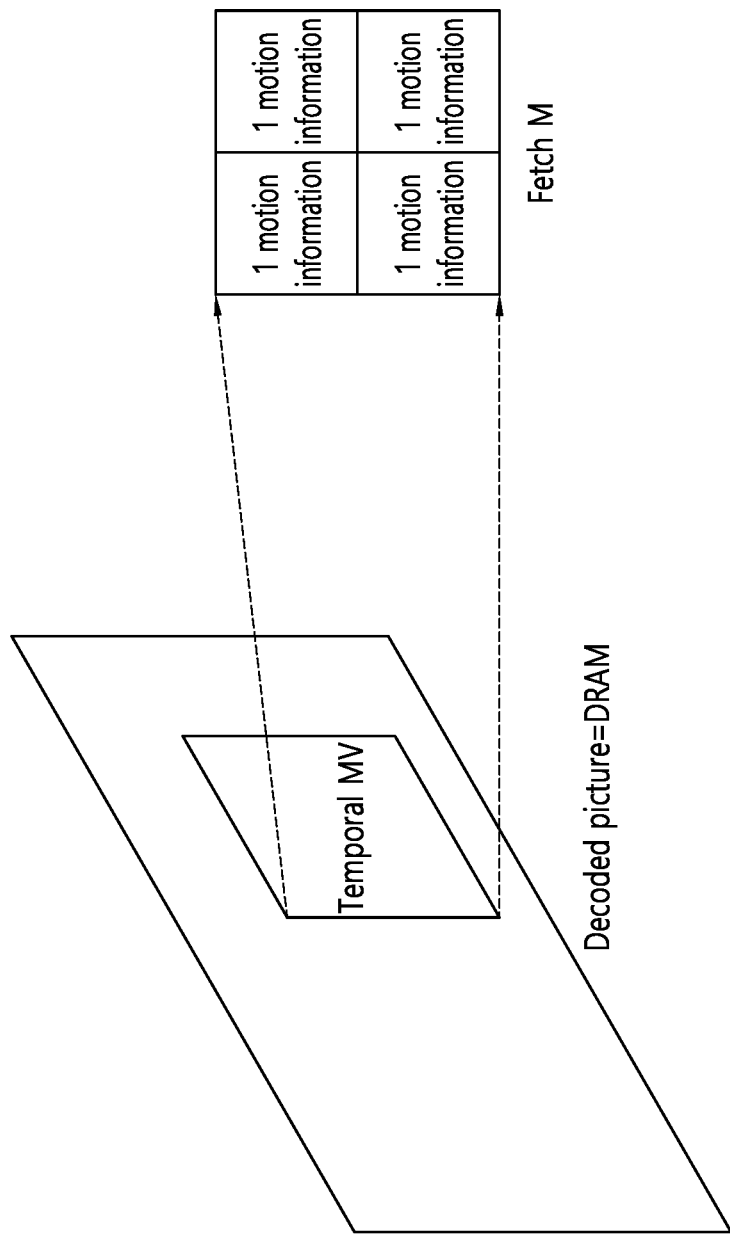
FIG. 15 is a diagram for explaining a process of inducing a motion vector in units of sub-block of a current block from a corresponding block of a reference picture.

FIGS. 13 and 14 are diagrams for explaining the process of inducing the motion vector in units of current block from the corresponding block of the reference picture, and FIG. 15 is a diagram for explaining the process of inducing the motion vector in units of sub-block of the current block from the corresponding block of the reference picture.

Referring to FIGS. 13 and 14, to derive the temporal motion information candidate for the current block, the corresponding block located corresponding to the current block may be derived from the reference picture. At this time, since the reference picture already completes the coding (encoding/decoding) and is stored in the memory (i.e., the DPB), the process of fetching the temporal motion vector from the corresponding block in the reference picture by approaching the memory should be performed. The temporal motion information candidate (i.e., the temporal motion vector) for the current block may be induced by the memory fetch.

However, as described above, the temporal motion vector in units of current block may also be induced, but the temporal motion vector in units of sub-block for the current block may also be induced. This is the method for inducing the temporal motion vector in units of sub-block by applying the aforementioned ATMVP or ATMVP-ext method, and in this case, a larger amount of data should be fetched from the memory.

FIG. 15 illustrates the case where the current block is split into four sub-blocks. Referring to FIG. 15, to derive the temporal motion information candidate in units of sub-block for the current block, the motion vectors for four sub-blocks within the current block from the corresponding block in the reference picture should be fetched from the memory. In this case, when compared with the process of inducing the temporal motion vector in units of current block illustrated in FIGS. 13 and 14, it may be seen that more memory fetching process is required according to the number of sub-blocks. That is, the size of the sub-block may affect the process of fetching the data from the memory, and this may affect the configuration and throughput of the pipeline of the encoder/the decoder according to the hardware fetch performance. If the current block is excessively split into the sub-blocks, there may occur a problem in that the fetch should be performed many times due to the size of a memory bus performing the fetch. Therefore, the present disclosure proposes the method capable of adjusting and using the size of the sub-block to prevent the excessive fetch process from occurring.

Meanwhile, the conventional ATMVP or ATMVP-ext induces the temporal motion vector by splitting the current block in units of sub-block having the size of 4×4. In this case, since the fetch process should be performed in units of sub-block having the size of 4×4, there are problems in that the excessive memory approach occurs and the complexity of the hardware is increased.

Therefore, the present disclosure determines the fixed minimum size of the sub-block, and allows the current block to perform the fetch with the fixed minimum size of the sub-block, thereby reducing the loss of the compression performance compared to the improvement in the complexity of the hardware. According to the exemplary embodiment, the fixed minimum size of the sub-block may be defined as the size of 8×8, 16×16, or 32×32. It was proved by the experimental result that due to the fixed minimum size of the sub-block, the loss of the compression performance was reduced compared to the improvement in the complexity of the hardware.

Table 1 below expresses the compression performance in which the ATMVP is performed by conventionally splitting the current block in units of sub-block having the size of 4×4.

TABLE 1

| | Over VTM-1.0 | | | | |
| --- | --- | --- | --- | --- | --- |
| | Y | U | V | EncT | DecT |
| Class A1 | −0.80% | −0.77% | −0.66% | 105% | 122% |
| Class A2 | −1.07% | −0.80% | −0.85% | 107% | 129% |
| Class B | −1.02% | −0.77% | −0.66% | 106% | 123% |
| Class C | −1.41% | −1.07% | −1.18% | 105% | 127% |
| Class E | | | | | |

TABLE 1-continued

| | Over VTM-1.0 | | | | |
| --- | --- | --- | --- | --- | --- |
| | Y | U | V | EncT | DecT |
| Overall | −1.09% | −0.86% | −0.84% | 106% | 125% |
| Class D | −1.58% | −0.94% | −1.03% | 106% | 128% |

Table 2 below expresses the compression performance of the method for performing the ATMVP by splitting the current block in units of sub-block having the size of 8×8 according to the exemplary embodiment of the present disclosure.

TABLE 2

| | Over VTM-1.0 | | | | |
| --- | --- | --- | --- | --- | --- |
| | Y | U | V | EncT | DecT |
| Class A1 | −0.82% | −0.76% | −0.67% | 104% | 108% |
| Class A2 | −1.02% | −0.75% | −0.83% | 103% | 110% |
| Class B | −0.96% | −0.71% | −0.68% | 103% | 109% |
| Class C | −1.27% | −0.94% | −1.03% | 102% | 111% |
| Class E | | | | | |
| Overall | −1.02% | −0.79% | −0.80% | 103% | 109% |
| Class D | −1.41% | −0.69% | −0.87% | 102% | 110% |

Table 3 below expresses the compression performance of the method for performing the ATMVP by splitting the current block in units of sub-block having the size of 16×16 according to the exemplary embodiment of the present disclosure.

TABLE 3

| | Over VTM-1.0 | | | | |
| --- | --- | --- | --- | --- | --- |
| | Y | U | V | EncT | DecT |
| Class A1 | −0.77% | −0.75% | −0.60% | 104% | 115% |
| Class A2 | −0.93% | −0.63% | −0.71% | 105% | 105% |
| Class B | −0.89% | −0.63% | −0.54% | 102% | 106% |
| Class C | −1.15% | −0.70% | −0.85% | 102% | 107% |
| Class E | | | | | |
| Overall | −0.94% | −0.68% | −0.67% | 103% | 108% |
| Class D | −1.26% | −0.55% | −0.60% | 103% | 106% |

Table 4 below expresses the compression performance of the method for performing the ATMVP by splitting the current block in units of sub-block having the size of 32×32 according to the exemplary embodiment of the present disclosure.

TABLE 4

| | Over VTM-1.0 | | | | |
| --- | --- | --- | --- | --- | --- |
| | Y | U | V | EncT | DecT |
| Class A1 | −0.72% | −0.64% | −0.52% | 106% | 117% |
| Class A2 | −0.79% | −0.57% | −0.62% | 104% | 123% |
| Class B | −0.81% | −0.50% | −0.49% | 103% | 104% |
| Class C | −1.06% | −0.63% | −0.75% | 103% | 107% |
| Class E | | | | | |
| Overall | −0.86% | −0.58% | −0.59% | 104% | 111% |
| Class D | −1.18% | −0.43% | −0.51% | 104% | 106% |

As expressed by Tables 1 to 4, it may be confirmed that a difference between the compression efficiency and the decoding velocity has the trade-off result according to the size of the sub-block based on the experimental result.

The size of the sub-block used to induce the ATMVP candidate as described above may also be pre-defined, and may also be the information signaled from the encoding apparatus to the decoding apparatus. Hereinafter, the method for signaling the size of the sub-block according to the exemplary embodiment of the present disclosure will be described.

According to the exemplary embodiment of the present disclosure, the information about the size of the sub-block may be signaled at a slice level or a sequence level. For example, the default size of the sub-block used in the process of inducing the ATMVP candidate may be signaled in the sequence level, and to indicate whether the default size of the sub-block is used in the current slice, one flag information may be additionally signaled at the picture/slice level. At this time, if the flag information is false (i.e., if it is indicated that the default size of the sub-block does is not used in the current slice), the size of the sub-block may be additionally signaled in a slice header for the picture/slice.

Table 5 expresses an example of a syntax table signaling the information related to the ATMVP mode (i.e., the process of inducing the ATMVP candidate) and the information about the size of the sub-block in the sequence parameter set. Table 6 expresses an example of a semantics table defining the information represented by the syntax elements expressed by Table 5.

TABLE 5

| | Descriptor |
| --- | --- |
| sequence_parameter_set( ) { | |
| ...... | |
|   sps_atmvp_enabled_flag | u(1) |
|   if(sps_atmvp_enabled_flag) | |
|     log2_atmvp_sub_block_size_default_minus2 | ue(v) |
| ...... | |
| } | |

TABLE 6 sps_atmvp_enabled_flag equal to 1 specifies the ATMVP is enabled.
sps_atmvp_enabled_flag equal to 0 specifies the ATMVP is disabled,
log2_atmvp_sub_block_size_default_minus2 plus 2
specifies the inferred value of
log2_atmvp_sub_block_size_active_minus2 for the slices with
atmvp_sub_block_size_override_flag is equal to 0.

Table 7 expresses an example of a syntax table signaling the information about the size of the sub-block in the slice header. Table 8 expresses an example of a semantics table defining the information represented by the syntax elements expressed by Table 7.

TABLE 7

| | Descriptor |
| --- | --- |
| slice_segment_header( ) { | |
| ...... | |
|   if(sps_atmvp_enabled_flag) | |
|     atmvp_sub_block_size_override_flag | ue(v) |
|   if(atmvp_sub_block_size_override_flag) | |
|     log2_atmvp_sub_block_size_active_minus2 | ue(v) |
| ...... | |
| } | |

TABLE 8 atmvp_sub_block_size_override_flag
equal to 1 specifies that the syntax
log2_atmvp_sub_block_size_active_minus2
is present for the current slice.

TABLE 8-continued atmvp_sub_block_size_override flag equal
to 0 specifies that the syntax element
log2_atmvp_sub_block_size_active_minus2
is not present,
log2_atmvp_sub_block_size_active_minus2
is inferred to be equal to
log2_atmvp_sub_block_size_default_minus2.
log2_atmvp_sub_block_size_active_minus2
plus 2 specifies the value of the sub-block size that
is used for deriving the motion parameters for the
ATMVP of the current slice.

As expressed by Tables 5 to 8, a flag (sps_atmvp_enabled_flag) representing whether the ATMVP mode (i.e., the process of inducing the ATMVP candidate) is applied in the sequence parameter set may be signaled. Further, if the ATM VP mode (i.e., the process of inducing the ATMVP candidate) is applied, the information about the size of the sub-block (log 2_atmvp_sub_block_size_default minus2) used in the process of inducing the ATMVP candidate may be signaled. At this time, the information about the size of the sub-block (atmvp_sub_block_size_override_flag, log2_atmvp_sub_block_size_active_minus2) in the slice header may be signaled according to whether the size of the sub-block for inducing the ATMVP candidate is used at the slice level.

Table 9 expresses an example of the syntax table signaling the information about the size of the sub-block in the sequence parameter set. Table 10 expresses an example of the semantics table defining the information represented by the syntax elements expressed by Table 9.

TABLE 9

| sequence_parameter_set( ) { | Descriptor |
|---|---|
| ...... | |
| log2_atmvp_sub_block_size_default_minus2 | ue(v) |
| ...... | |
| } | |

TABLE 10 log2_atmvp_sub_block_size_default_minus2
plus 2 specifies the inferred value of
log2_atmvp_sub_block_size_active_minus2
for the slices with
atmvp_sub_block_size_override_flag is equal to 0.

Table 11 expresses an example of the syntax table signaling the information about the size of the sub-block in the slice header. Table 12 expresses an example of the semantics table defining the information represented by the syntax elements expressed by Table 11.

TABLE 11

| slice_segment_header( ) { | Descriptor |
|---|---|
| ...... | |
| atmvp_sub_block_size_override_flag | ue(v) |
| if(atmvp_sub_block_size_override_flag) | |
| log2_atmvp_sub_block_size_active_minus2 | ue(v) |
| ...... | |
| } | |

TABLE 12 atmvp_sub_block_size_override_flag equal to 1
specifies that the syntax

TABLE 12-continued log2_atmvp_sub_block_size_active_minus2 is
present for the current slice.
atmvp_sub_block_size_override_flag equal to 0
specifies that the syntax element
log2_atmvp_sub_block_size_active_minus2 is not present,
log2_atmvp_sub_block_size_active_minus2
is inferred to be equal to
log2_atmvp_sub_block_size_default_minus2.
log2_atmvp_sub_block_size_active_minus2 plus 2
specifies the value of the sub-block size that
is used for deriving the motion parameters for the
ATMVP of the current slice. The variable is
derived to subBlkLog2Width and subBlkLog2Height
is derived to be equal to
log2_atmvp_sub_block_size_default_minus2 plus 2.
log2_atmvp_sub_block_size_active_minus2
shall be in the range of 0 to 1.

As expressed by Tables 9 to 12, the information about the size of the sub-block (log 2_atmvp_sub_block_size_default_minus2) used in the process of inducing the ATMVP candidate in the sequence parameter set may be signaled. At this time, the information about the size of the sub-block (atmvp_sub_block_size_override_flag, log 2_atmvp_sub_block_size_active_minus2) in the slice header may be signaled according to whether the size of the sub-block for inducing the ATMVP candidate is used at the slice level.

Table 13 expresses an example of the syntax table signaling the information about the size of the sub-block in the sequence parameter set. Table 14 expresses an example of the semantics table defining the information represented by the syntax elements expressed by Table 13.

TABLE 13

| sequence_parameter set( ) { | Descriptor |
|---|---|
| ...... | |
| log2_atmvp_sub_block_size_default_minus2 | ue(v) |
| ...... | |
| } | |

TABLE 14 log2_atmvp_sub_block_size_default_minus2 plus 2
specifies the value of the subblock size that
is used for deriving the motion parameters for the ATMVP.
When log2_atmvp_sub_block_size_active_minus2 is not
present, it is inferred to be equal to 0 for the slices.

Table 15 expresses an example of the syntax table signaling the information about the size of the sub-block in the slice header. Table 16 expresses an example of the semantics table defining the information represented by the syntax elements expressed by Table 15.

TABLE 15

| slice_segment_header( ) { | Descriptor |
|---|---|
| ...... | |
| atmvp_sub_block_size_inherit_flag | ue(v) |
| ...... | |
| } | |

TABLE 16 atmvp_sub_block_size_inherit_flag equal to 0 specifies that the variable subBlkLog2Width and subBlkLog2Height is derived to be equal to log2_atmvp_sub_block_size_default_minus2 plus 2. atmvp_sub_block_size_inheirt_flag equal to 1 specifies that the variable subBlkLog2Width and subBlkLog2Height is derived to be (!log2_atmvp_sub_block_size_default_minus2) plus 2.

As expressed by Tables 13 to 16, the information about the size of the sub-block (log 2_atmvp_sub_block_size_default_minus2) used in the process of inducing the ATMVP candidate in the sequence parameter set may be signaled. At this time, the addition information (atmvp_sub_block_size_inherit_flag) about whether the information about the size of the sub-block (log 2_atmvp_sub_block_size_default_minus2) is to be used may be signaled in the slice header.

Meanwhile, as described above, the corresponding block used to induce the temporal motion information candidate (i.e., the ATMVP candidate) in units of sub-block for the current block is located in the reference picture (i.e., the col picture), and the reference picture may be induced from the reference picture list. The reference picture list may be composed of a reference picture list 0 (L0) and a reference picture list 1 (L1). The reference picture list 0 may be used in a P slice coded by the uni-directional inter-prediction using one reference picture, or used in a B slice coded by the forward, backward, or bi-directional inter-prediction using two reference pictures. The reference picture list 1 may be used in the B slice. As described above, as the reference picture list is composed of the L0 and the L1, the process of finding the corresponding block for each of the reference picture lists L0 and L1 is repeated. Further, since the corresponding block is specified in the reference picture based on the spatial neighboring block of the current block, the process of searching for the spatial neighboring block of the current block may also be performed for each of the reference picture lists L0 and L1. Therefore, the present disclosure proposes the method capable of simplifying the repetitive process of checking the reference picture lists L0 and L1.

The exemplary embodiment of the present disclosure may use the flag information (collocated_from_l0_flag) indicating whether the reference picture (i.e., the col picture) used to induce the ATMVP candidate is derived from any of the reference picture lists L0 and L1. The corresponding block may be specified within the reference picture with reference to only one of the reference picture lists L0 and L1 according to the flag information (collocated_from_l0_flag), and the motion vector of the corresponding block may be used as the ATMVP candidate.

Further, if the motion vector of the first available spatial neighboring block is detected while searching for the spatial neighboring blocks of the current block in the pre-defined order, the corresponding block may be specified in the reference picture based on the motion vector of the spatial neighboring block detected as being first available, and the ATMVP candidate may be determined by deriving the motion vector in units of sub-block of the corresponding block. Thereafter, the process of checking the availability of the remaining spatial neighboring blocks may be skipped. According to the exemplary embodiment, the searching order of checking whether the spatial neighboring block is available may be the order of A0, B0, B1, A1, but this is merely illustrative. Alternatively, the process of checking the availability of the spatial neighboring block may also check whether only the A1 is available for the simplification. Here, the spatial neighboring blocks A0, B0, A1, B1, B2 are illustrated in FIG. 9.

The aforementioned exemplary embodiment of the present disclosure may be implemented according to the specification expressed by Table 17 below.

TABLE 17

1. Decoding process for advanced temporal motion vector prediction mode
Inputs to this process are:
  a luma location ( xCb, yCb ) specifying the top-left luma sample of the current coding block relative to the top-left luma sample of the current picture,
  a variable nCbW specifying the width of the current luma prediction block,
  a variable nCbH specifying the width of the current luma prediction block,
  the availability flags availableFlagA0, availableFlagAl, availableFlagB0 and availableFlagB1,
  the prediction list utilization flags predFlagLXA0, predFlagLXA1, predFlagLXB0 and predFlagLXB1, with X being 0 or 1,
  the reference indices refIdxLXA0, refIdxLXA1, refIdxLXB0 and refIdxLXB1, with X being 0 or 1,
  the motion vectors mvLXA0, mvLXA1 mvLXB0 and mvLXB1, with X being 0 or 1,
  a variable colPic, specifying the collocated picture.
Outputs of this process are:
  The modified array MvLX specifying the motion vectors of the current picture, with X = 0,1,
  The modified array RefidxLX specifying the reference indices of the current picture, with X = 0,1,
  The modified array PredFlagLX specifying the prediction list utilization flags of the picture, with X = 0,1,
The the luma location (xCurr-Ctu, yCurrCtu) of the CTU that contains the current coding block is derived as follows:
    xCurrCtu = (xCb>>CtuLog2Size)<<CtuLog2Size     (X-XX)
    yCurrCtu = (yCb>>CtuLog2Size)<<CtuLog2Size     (X-XX)
The variables subBlkLog2Width and subBlkLog2Height are derived as follows:
    subBlkLog2Size = log2_atmvp_sub_block_size_active_minus + 2     (X-XX)
    subBlkLog2 Width = Log2((nCbW < (1<<subBlkLog2Size))? nCbW : (1<<subBlkLog2Size))     (X-XX)
    subBlkLog2Height = Log2((nCbH <(1<<subBlkLog2Size))? tiCbH : (1<<subBlkLog2Size))     (X-XX)
Depending on the values of slice_type, collocated_from_l0_flag, and collocated_ref_idx, the variable colPic, specifying the collocated picture, is derived as follows:
    If slice_type is equal to B and collocated_from_l0_flag is equal to 0, colPic is set equal to
    RefPicList1[ collocated_ref_idx ].
    Otherwise (slice_type is equal to B and collocated_from_l0_flag is equal to 1 or slice_type is equal to P),
    colPic is set equal to RetPicList0[ collocated_ref_idx ].

TABLE 17-continued

The decoding process for advance temporal motion vector prediction mode consists of the following ordered steps:
1. The derivation process for motion parameters for collocated block as specified in subclause 1.1 is invoked with the availability flags availableFlagA0, availableFlagA1 availableFlagB0 and availableFlagB1, the prediction list utilization flags predFlagLXA0, predFlagLXA1, predFlagLXB0 and predFlagLXB1, the reference indices refIdxLXA0, refIdxLXA1 refIdxLXB0 and refIdxLXB1 and the motion vectors mvLXA0, mvLXA1 mvLXB0 and mvLXB1, with X being 0 or 1, the coding block location ( xCb+(nCbW>>1), yCb+(nCbH>>1) ) and the collocated picture colPic as input and the motion vectors colMvLX, the prediction list utilization flags colPredFlagLX and the reference indices colRefIdxLX of the collocated block, and one motion vector mvCol as output, with X=0,1.
2. The motion data of each subBlkWidth x subBlkHeight prediction block is derived by applying the following steps with xPb = 0, ..., (nCbW>>subBlkLog2Width) −1 and yPb = 0, ..., (nCbH>>subBlkLog2Height)−1:
 The luma location (xColPb, yColPb) of the collocated block of the prediction block inside the collocated picture is derived as:
 xColPb = Clip3(xCurrCtu, min(CurPicWidthInSamplesY −1, xCurrCtu + (1<<CtuLog2Size) + 3),
  xCb + (xPb<<subBlkLog2Width) + (mvCol[0]>>4)) (X-XX)
 yColPb = Clip3(yCurrCtu, min(CurPicHeightInSamplesY−1,yCurrCtu + (1<<CtuLog2Size) + 3),
  yCb + (yPb<<subBlkLog2Height) + (mvCol[1]>>4)) (X-XX)
 The motion vectos pbMvLX, the prediction list utilization flags pbProdFlagLX and the reference indices pbRefIdxLX, with X=0,1, of the prediction block are derived by invoking the derivation process of temporal motion vector components and reference indices for prediction block as specified in subclause 1.2 with the luma sample location (xColPb, yColPb) of the collocated block, colPic, colMvLX, colRefIdxLX and colPredFlagLX, with X=0,1, as inputs.
 The variables MvLX[xSb][y Sb], RefIdxLX[xSb][ySb]and PredFlagLX[xSb][ySb], with X=0,1, of the sub-blocks wihtin the prediciton block are derived as follows with xSb = (nCbW>>2), ..., (nCbW>>2)+subBlkLog2Width−1, ySb = (nCbH>>2), ..., (nCbH>>2)+subBlkLog2Height−1:
  MvL0[xSb][y Sb]= pbMvL0 (X-XX)
  MvL1[xSb][y Sb] = pbMvL1 (X-XX)
  RefIdxL0[xSb][y Sb] = pbRefIdxL0 (X-XX)
  RefIdxL1[xSb][y Sb]+ = pbRefIdxL1 (X-XX)
  PredFlagL0[xSb][y Sb] = pbPredFlagL0 (X-XX)
  PredFlagL1[xSb][y Sb] = pbPredFlagL1 (X-XX)
1.1 Derivation process of motion parameters for collocated block
Inputs to this process are:
 a luma location (xCb, yCb) specifying the top-left luma sample of the collocated block relative to the top-left luma sample of the collocated picture,
 the availability flags availableFlagA0, availableFlagAl, availableFlagB0 and availableFlagB1,
 the prediction list utilization flags predFlagLXA0, predFlagLXA1, predFlagLXB0, predFlagLXB1 with X being 0 or 1,
 the reference indices refIdxLXA0, refIdxLXA1, refIdxLXB0 and refIdxLXB1, with X being 0 or 1,
 the motion vectors mvLXA0, mvLXA1 mvLXB0 and mvLXB1, with X being 0 or 1,
 a variable colPic, specifying the collocated picture.
Outputs of this process are:
 the motion vectors colMvLX, with X being 0 or 1
 the prediction list utilization flags colPredFlagLX, with X being 0 or 1,
 the reference indices colRefIdxLX of the collocated block,
 the temporal motion vector vector mvCol.
colPredFlagLX and colRefIdxLX, with X being 0 or 1, are set equal to 0 and a variable candStop is set equal to FALSE.
colMvLX, with X being 0 or 1, are set equal to (0, 0).
mvCol is set equal to (0, 0).
For i in the range of 0 to (slice_type = = B) ? 1: 0, inclusive, the following applies:
 If DiffPicOrderCnt(aPic, currPic) is less than or equal to 0 for every picture aPic in every reference picture list of the current slice, slice_type is equal to B and collocated_from_10_flag is equal to 0, X is set equal to (1 − i).
 Otherwise, X is set equal to i.
 mvCol is derived as following step order:
1. If candStop is equal to FALSE, availableFlagLXA0 is set equal to 1 and DiffPicOrderCnt(colPic, RefPicListX[refIdxLXA0]) is equal to 0, the following applies:
  mvCol = mvLXA0 (X-XX)
  candStop = TRUE (X-XX)
2. If candStop is equal to FALSE, availableFlagLXB0 is set equal to 1, DiffPicOrderCnt(colPic, RefPicListX[refIdxLXB0]) is equal to 0, the following applies:
  mvCol = mvLXB0 (X-XX)
  candStop = TRUE (X-XX)
3. If candStop is equal to FALSE, availableFlagLXB1 is set equal to 1, DiffPicOrderCnt(colPic, RcfPicListX[refIdxLXB1]) is equal to 0, the following applies:
  mvCol = mvLXB1 (X-XX)
  candStop = TRUE (X-XX)
4. If candStop is equal to FALSE, availableFlagLXA1 is set equal to 1, DiffPicOrderCnt(colPic, RefPicListX[refIdxLXA1]) is equal to 0, the following applies:
  mvCol = mvLXA1 (X-XX)
  candStop = TRUE (X-XX)

TABLE 17-continued

The luma location (xColPb, yColPb) of the collocated block of the prediction block inside the collocated picture
is derived as:
   xColPb = Clip3(xCurrCtu,
      min(CurPicWidthInSamplesY−1, xCurrCtu + (1<<CtuLog2Size) + 3), xCb + (mvCol[0]>>4))       (X-XX)
   yColPb = Clip3(yCurrCtu,
      min(CurPicHeightInSamplesY−1,yCurrCtu + (1<<CtuLog2Size) + 3), yCb + (mvCol[1]>>4))       (X-XX)
The array colPredMode[x][y] is set equal to the prediction mode array of the collocated picture specified by colPic.
   If colPredMode[xColPb>>2][yColPb>>2] is equal to MODE_INTER, the following applies:
      The derivation process for temporal motion vector prediction in subclause 1.3 is invoked the luma sample
      location (xColPb, yColPb), colPic, colRefIdxL0 as inputs and the output being assigned to colMvL0 and
      colPredFlagL0.
      The derivation process for temporal motion vector prediction in subclause 1.3 is invoked the luma sample
      location (xColPb, yColPb), colPic, colRefIdxL1 as inputs and the output being assigned to colMvL1 and
      colPredFlagL1.
1.2 Derivation process of temporal motion parameters for prediction block
Inputs to this process are:
   a luma location ( xColPb, yColPb ) specifying the top-left luma sample of the collocated block relative to the
top-left luma sample of the collocated picture,
   the collocated picture colPic,
   the motion vectors colMvLX, with X = 0,1
   the reference indices colRefIdxLX, with X = 0,1
   the prediction list utilization flags colPredFlagLX, with X = 0,1,
Outputs of this process are:
   the motion vectors pbMvLX of the prediction block, with X = 0,1
   the referenc indices pbRefIdxLX of the prediction block, with X = 0,1
   the prediction list utilization flags pbPredFlagLX of the prediction block, with X = 0,1.
The array colPredMode[ x ][ y ] is set equal to the prediction mode array of the collocated picture specified by
colPic.
   1. If colPredMode[xColPb>>2][yColPb>>2] is equal to MODE_INTER, the following applies:
      The reference indices pbRefIdxLX, with x = 0,1, are set equal to 0,
      The derivation process for temporal motion vector prediction in subclause 1.3 is invoked the luma sample
      location (xColPb, yColPb), colPic, pbRefIdxL0 as inputs and the output being assigned to pbMvL0 and
      pbPredFlagL0.
      The derivation process for temporal motion vector prediction in subclause 1.3 is invoked the lima sample
      location (xColPb, yColPb), colPic, pbRefIdxL1 as inputs and the output being assigned to pbMvL1 and
      pbPredFlagL1.
   2. Otherwise (colPreclMode[xColPb>>2][yColPb>>2] is equal to MODE_INTRA), the following applies:
      pbMvL0 = colMvL0       (X-XX)
      pbMvL1 = colMvL1       (X-XX)
      pbRefIdxL0 = colRefIdxL0       (X-XX)
      pbRefIdxL1 = colRefIdxL1       (X-XX)
      pbPredFlagL0 = colPrcdFlagL0       (X-XX)
      pbPredFlagL1 = colPredFlagL1       (X-XX)
1.3 Derivation process for temporal motion vector prediction
Inputs of this process are
   a luma location ( xColPb, yColPb ) specifying the top-left luma sample of the collocated block relative to the
top-left luma sample of the collocated picture,
   the collocated picture colPic,
   a reference index refIdxLX, with X being 0 or 1,
Outputs of this process are
   the motion vector mvLXCol
   the prediction list utilization flag predFlagLX
The array colPredModer[ x ][ y ] is set equal to the prediction mode array of the collocated picture specified by
colPic.
The arrays colPredFlagLX [ x ][ y ], colMvLXCol[ x ][ y ], and colRefIdxLX [ x ][ y ] are set equal to the
corresponding arrays of the collocated picture specified by colPic. PredFlagLX[ x ][ y ], MvLX[ x ][ y ], and
RefIdxLX[ x ][ y ], respectively, with X being the value of X this process is invoked for.
The variable currPic specifies the current picture.
The variables mvLXCol and predFlagLX are derived as follows:
   If colPredMod[xColPb>>2][yColPb>>2] is MODE_INTRA, both components of mvLXCol are set to
   0 and predFlagLX is set to 0.
   Otherwise, the motion vector mvCol, the reference index refIdxCol, and the reference list identifier
   listCol are derived as follows:
   If colPredFlagLX[ xColPb >>2][ yColPb >>2] is equal to 1, predFlagLX is set to 1 and mvCol, refIdxCol,
   and listCol are set equal to colMvLX [ xColPb >>2][ yColPb >>2], colRefIdxLX
   [ xColPb>>2 ][ yColPb>>2 ], and LX, respectively.
   Otherwise (colPredFlagLX[ xColPb >>2][ yColPb >>2] is equal to 0), the following applies:
     If DiffPicOrderCnt( aPic, currPic ) is less than or equal to 0 for every picture aPic in every reference
     picture list of the current slice and colPredFlagLN[xColPb>>2][yColPb>>2] is equal to 1, mvCol,
     refIdxCol, and listCol are set equal to colMvLX[ xColPb>>2 ][ yColPb>>2 ],
     refIdxLXCol[ xColPb>>2 ][ yColPb>>2 ] and LN, respectively, with N being equal to 1-X where X
     being the value of X this process is invoked for.
     Otherwise, both components of mvLXCol are set to 0 and predFlagLX is set to 0.
   If predFlagLX is equal to 1, the variables mvLXCol and predFlagLX are derived as follows:
     refPicListCol[ refIdxCol ] is set to be the picture with reference index refIdxCol in the reference
     picture list listCol of the collocated picture colPic,
       colPocDiff = DiffPicOrderCnt( colPic, refPicListCol[ refIdxCol ] )       (X-XX)
       currPocDiff = DiffPicOrderCnt( currPic, RefPicListX[ refIdx_LX ] )       (X-XX)

TABLE 17-continued

| | |
|---|---|
| If colPocDiff is equal to currPocDiff, mvLXCol is derived as follows: | |
|     mvLXCol = mvCol | (X-XX) |
| Otherwise, mvLXCol is derived as a scaled version of the motion vector mvCol as follows: | |
|     tx = ( 16384 + ( Abs( td ) >> 1 ) ) / td | (X-XX) |
|     distScaleFactor = Clip3( −4096, 4095, ( tb * tx + 32 ) >> 6 ) | (X-XX) |
|     mvvLXCol = Clip3( −32768, 32767, Sign( distScaleFactor * mvCol ) | |
|         ( ( Abs( distScaleFactor * mvCol ) + 127 ) >>8 ) ) | (X-XX) |
|     where td and tb are derived as follows: | |
|         td = Clip3( −128, 127, colPocDiff ) | (X-XX) |
|         tb = Clip3( −128, 127, currPocDiff ) | (X-XX) |

Further, according to the present disclosure, the corresponding block used to induce the ATMVP candidate may be specified within the constrained area. This will be described with reference to FIG. 16.

Figure 16:
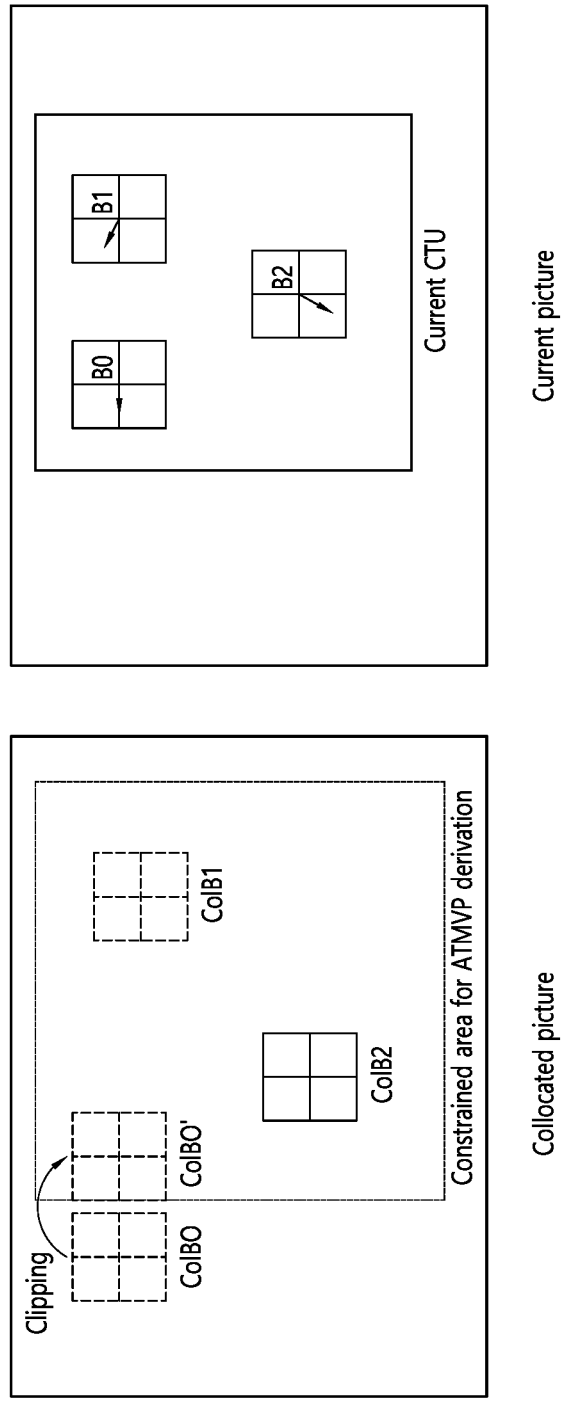
FIG. 16 is a diagram for explaining an exemplary embodiment to which a constrained area is applied when an ATMVP candidate is induced.

FIG. 16 is a diagram for explaining the exemplary embodiment to which the constrained area is applied when the ATMVP candidate is induced.

Referring to FIG. 16, a current coding tree unit (CTU) exists within the current picture, and current blocks (B0, B1, B2) performing the inter-prediction by applying the ATMVP within the current CTU may exist. To derive the temporal motion information candidate (the ATMVP candidate) in units of sub-block for the current block by applying the ATMVP mode, corresponding blocks (the col blocks) (ColB0, ColB1, ColB2) may be first derived in the reference picture (the col picture) for each of the current blocks (B0, B1, B2). At this time, the constrained area may be applied to the reference picture (the col picture). According to the exemplary embodiment, an area obtained by adding one column of the 4×4 blocks to the current CTU within the reference picture may be defined as the constrained area. That is, the constrained area may mean an area obtained by adding one column of the 4×4 blocks to the CTU area located corresponding to the current CTU in the reference picture.

For example, as illustrated in FIG. 16, if the corresponding block (ColB0) located corresponding to the current block (B0) is located out of the constrained area in the reference picture, the corresponding block (ColB0) may be clipped to be located within the constrained area. At this time, the corresponding block (ColB0) may be clipped to the closest boundary of the constrained area to adjust as a corresponding block (ColB0').

The aforementioned exemplary embodiments of the present disclosure reduce an amount of the data fetched from the memory in the same area unit, thereby improving the complexity of the hardware. Further, to improve the worst case, the method for controlling the process of inducing the temporal motion information candidate in units of sub-block is additionally proposed. The latest video compression technology as well as the conventional video compression technology performs the prediction and perform the coding by splitting the picture into various forms of blocks. Further, to improve the prediction performance and the coding efficiency, the picture is split into small blocks such as 4×4, 4×8, and 8×4. As described above, if the picture is split into the small blocks, there may occur the case where the current block is smaller than the unit (i.e., the minimum size of the sub-block) of fetching the temporal motion vector when the temporal motion information candidate in units of sub-block is induced. In this case, since the memory fetch with the size (i.e., the minimum size of the prediction unit) of the current block smaller than the fetch unit (i.e., the minimum size of the sub-block) occurs, there occurs the worst case in terms of hardware. That is, the present disclosure proposes the condition capable of determining whether the temporal motion information candidate in units of sub-block is derived as described above in consideration of such a problem, and proposes the method for deriving the temporal motion information candidate in units of sub-block only in the case of satisfying the condition.

Figure 17:
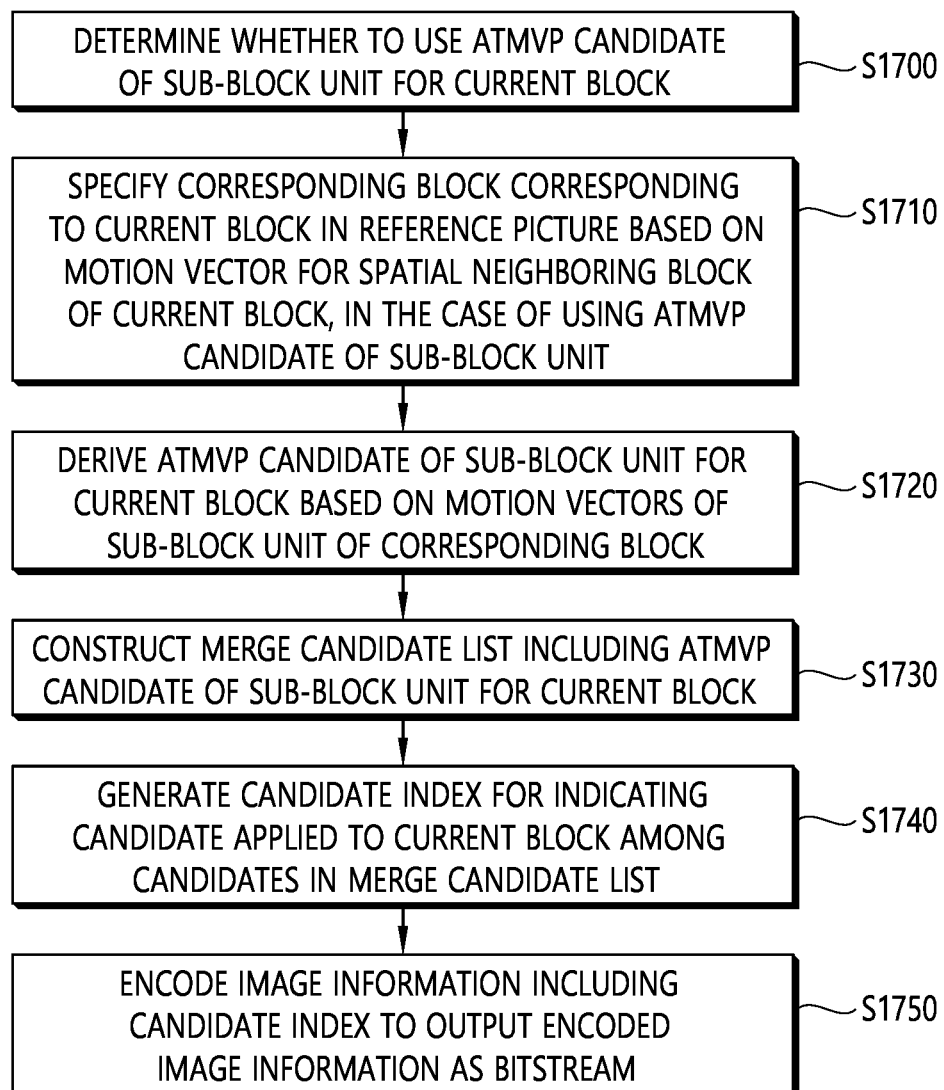
FIG. 17 is a flowchart schematically illustrating an image encoding method by an encoding apparatus according to the present disclosure.

FIG. 17 is a flowchart schematically illustrating an image encoding method by an encoding apparatus according to the present disclosure.

A method illustrated in FIG. 17 may be performed by the encoding apparatus 200 illustrated in FIG. 2. More specifically, the step S1700 may be performed by the entropy encoder 240 or the predictor 220 illustrated in FIG. 2, the steps S1710 to S1740 may be performed by the predictor 220 illustrated in FIG. 2, and the step S1750 may be performed by the entropy encoder 240 illustrated in FIG. 2. Further, the method illustrated in FIG. 17 may include the aforementioned exemplary embodiments in the present specification. However, in FIG. 17, the description of the detailed contents overlapping the contents described with reference to FIGS. 1 to 16 will be omitted or simplified.

Referring to FIG. 17, the encoding apparatus may determine whether the advanced temporal motion vector predictor (ATMVP or ATMVP-ext) candidate of sub-block unit for the current block is to be used (S1700).

According to the exemplary embodiment, in performing the inter-prediction for the current block, the encoding apparatus may determine whether the ATMVP candidate of sub-block unit based on the size of the current block is to be used. At this time, the encoding apparatus may determine whether the size of the current block is smaller than the fixed size of the sub-block. This may be expressed by Equation 1 below. The encoding apparatus may determine that the ATMVP candidate of sub-block unit is not used for the current block in the case of satisfying the condition of Equation 1 below. Alternatively, the encoding apparatus may determine that the ATM VP candidate of sub-block unit is used for the current block in the case of not satisfying the condition of Equation 1 below.

$$\text{Condition} = \text{Width}_{block} < \text{MIN\_SUB\_BLOCK\_SIZE} \| \text{Height}_{block} < \text{MIN\_SUB\_BLOCK\_SIZE} \quad \text{Equation 1}$$

The fixed size of the sub-block may be pre-defined as the minimum size of the sub-block expressed by Equation 1, and for example, pre-defined as the fixed size of 8×8. However, the size of 8×8 is merely illustrative, and may also be defined as different sizes in consideration of the hardware performance or the coding efficiency of the encoder/the decoder. For example, the minimum size of the sub-block may also be the size of 8×8 or more, and also be defined as the size smaller than 8×8. Further, the information about the minimum size of the sub-block may be signaled from the encoding apparatus to the decoding apparatus.

If the size (Width$_{block}$, Height$_{block}$) of the current block is smaller than the fixed size of the sub-block, the encoding apparatus determines that the ATMVP candidate of sub-block unit is not used for the current block, and may not perform the process of deriving the ATMVP candidate of sub-block unit for the current block. In this case, the merge candidate list except for the ATMVP candidate in units of sub-block may be constructed. For example, if the fixed size of the sub-block is pre-defined as the minimum size of the sub-block of 8×8 and the size of the current block is the size of any one of 4×4, 4×8, 8×4, or 8×8, the encoding apparatus may determine that the size of the current block is smaller than the minimum size of the sub-block, and may determine that the ATMVP candidate of sub-block unit is not used for the current block.

If the size (Width$_{block}$, Height$_{block}$) of the current block is larger than the fixed size of the sub-block, the encoding apparatus may determine that the ATMVP candidate of sub-block unit for the current block is used, and derive the ATMVP candidate of sub-block unit for the current block. For example, if the fixed size of the sub-block is pre-defined as the minimum size of the sub-block of 8×8 and the size of the current block is larger than the size of 8×8, the encoding apparatus may determine that the size of the current block is larger than the minimum size of the sub-block, and may determine that the ATMVP candidate of sub-block unit for the current block is used.

According to another exemplary embodiment, the encoding apparatus may determine whether the ATMVP candidate of sub-block unit is to be applied to the current block based on the flag information for indicating whether to use the ATMVP candidate of sub-block unit. For example, the encoding apparatus may generate the flag information in the case of performing the inter-prediction by applying the ATMVP candidate of sub-block unit for the current block in consideration of the prediction performance or the rate-distortion (RD) cost, and encode the image information including the flag information to output the encoded image information as a bitstream. In this case, the decoding apparatus may determine whether the ATMVP candidate of sub-block unit is used for the current block based on the bitstream including the flag information signaled by the encoding apparatus.

Table 18 below expresses an example of the syntax table signaling the information indicating whether to use the ATMVP candidate of sub-block unit in the sequence parameter set. Table 19 below expresses an example of the semantics table defining the information represented by the syntax elements expressed by Table 18.

TABLE 18

| | Descriptor |
|---|---|
| seq_parameter_set_rbsp( ) { | |
|   sps_seq_parameter_set_id | ue(v) |
|   chroma_format_idc | ue(v) |
|   If( chroma_format_idc = = 3 ) | |
|     separate_colour_plane_flag | u(1) |
|   pic_width_in_luma_samples | ue(v) |
|   pic_height_in_luma_samples | ue(v) |
|   bit_depth_luma_minus8 | ue(v) |
|   bit_depth_chroma_minus8 | ue(v) |
|   log2_ctu_size_minus2 | ue(v) |
|   log2_min_qt_size_intra_slices_minus2 | ue(v) |
|   log2_min_qt_size_inter_slices_minus2 | ue(v) |
|   max_mtt_hierarchy_depth_inter_slices | ue(v) |
|   max_mtt_hierarchy_depth_intra_slices | ue(v) |
|   sps_atmvp_enabled_flag | u(1) |
|   if(sps_atmvp_enabled_flag) | |
|     log2_atmvp_default_size_minus2 | u(3) |
|   rbsp_tralling_bits( ) | |
| } | |

TABLE 19 sps_ atmvp_enabled_flag specifies whether advanced temporal motion vector predictors can be used for inter prediction. If sps_ atmvp_enabled_flag is equal to 0, the syntax elements of the current picture shall be constrained such that no advanced temporal motion vector predictor is used in decoding of the current picture. Otherwise (sps_ atmvp_enabled_flag is equal to 1), advanced temporal motion vector predictors may be used in decoding of the current picture. When not present, the value of sps_use_atmvp_flag is inferred to be equal to 0. log2_atmvp_default_size_minus2 specifies the inferred value of log2_atmvp_active_size_minuss for the slices with atmvp_size_override_flag is equal to 0.

Table 20 below expresses an example of the syntax table signaling the information indicating whether to use the ATMVP candidate of sub-block unit in the slice header. Table 21 below expresses an example of the semantics table defining the information represented by the syntax elements expressed by Table 20.

TABLE 20

| | Descriptor |
|---|---|
| slice_header( ) { | |
|   slice_pic_parameter_set_id | ue(v ) |
|   slice_address | u(v) |
|   slice_type | ue(v) |
|   if ( slice_type != I ) | |
|     log2_diff_ctu_max_bt_size | ue (v) |
|     if( sps_temporal_mvp_enable_flag ) | |
|       slice_temporal_mvp_enabled_flag | u (1) |
|     if sps_atmvp_enabled_flag ) | |
|     { | |
|       atmvp_size_override_flag | u(1) |
|       if(atmvp_size_override_flag) | |
|         log2_atmvp_active_size_minus2 | u(3) |
|     } | |
|   if ( slice_type != I ) | |
|     six_minus_max_num_merge_cand | uc(v) |
|   byte_alignment( ) | |
| } | |

TABLE 21 slice_temporal_mvp_enabled_flag specifies whether temporal motion vector predictors can be used for
inter prediction. If slice_temporal_mvp_enabled_flag is equal to 0, the syntax elements of the current picture
shall be constrained such that no temporal motion vector predictor is used in decoding of the current picture.
Otherwise (slice_temporal_mvp_enabled_flag is equal to 1), temporal motion vector predictors may be used
in decoding of the current picture. When not present, the value of slice_temporal_mvp_enabled_flag is
inferred to be equal to 0.
When both slice_temporal_mvp_enabled_flag and TemporalId are equal to 0, the syntax
elements for all coded pictures that follow the current picture in decoding order shall be
constrained such that no temporal motion vector from any picture that precedes the current
picture in decodin order is used in decoding of any coded picture that follows the current
picture in decoding order.
   NOTE 2-When slice_temporal_mvp_enabled_flag is equal to 0 in an I slice, it has no impact
   on the normative decoding process of the picture but merely expresses a bitstream constraint
   NOTE 3-When slice_temporal_mvp_enabled_flag is equal to 0 in a slice with TemporalId are equal to 0,
   decoders may empty "motion vector storage" for all reference pictures in the decoded picture buffer.
six_minus_max_num_merge_cand specifies the maximum number of merging MVP candidates
supported in the slice subtracted from 6. The maximum number of merging MVP candidates,
MaxNumMergeCand is derived as follows:
    MaxNumMergeCand = 6 − five_minus_max_num_mcrgc_cand (7-39)
The value of MaxNumMergeCand shall be in the range of 1 to 6, inclusive.
atmvp_size_override_flag equal to 1 specifies that the syntax log2_atmvp_active_size_minus2 is
present for the current slice. atmvp_size_override_flag equal to 0 specifies that the syntax
element log2_atmvp_active_size_minus2 is not present, log2_atmvp_size_active_minus2 is
inferred to be equal to log2_atmvp_default_size_minus2.
log2_atmvp_active_size_minus2 plus 2 specifies the value of the sub-block size that is used for
deriving the motion parameters for the ATMVP of the current slice.

As expressed by Tables 18 to 21, the flag (sps_atmvp_enabled_flag) representing whether the ATMVP candidate of sub-block unit is to be used through the sequence parameter set or the slice header may be signaled. Further, if the ATMVP candidate of sub-block unit is used according to the flag (sps_atmvp_enabled_flag) information, the information about the size of the sub-block (log 2_atmvp_default_size_minus2, atmvp_size_override_flag, log 2_atmvp_active_size_minus2, and the like) may be additionally signaled.

When determining to use the ATMVP candidate of sub-block unit, the encoding apparatus may specify the corresponding block corresponding to the current block in the reference picture based on the motion vector for the spatial neighboring block of the current block (S1710).

Here, the spatial neighboring block may be derived by checking the availability based on the neighboring blocks including at least one of the bottom-left corner neighboring block, left neighboring block, top-right corner neighboring block, top neighboring block, and top-left corner neighboring block of the current block. Therefore, the motion vector for the spatial neighboring block of the current block may be the motion vector of the neighboring block of any one of the bottom-left corner neighboring block, the left neighboring block, the top-right corner neighboring block, the top neighboring block, and the top-left corner neighboring block, which is determined as being available.

Further, the spatial neighboring block may also include a plurality of neighboring blocks, and also include only one neighboring block (e.g., the left neighboring block). If the plurality of neighboring blocks (e.g., including at least one of the bottom-left corner neighboring block, the left neighboring block, the top-right corner neighboring block, the top neighboring block, and the top-left corner neighboring block) are to be used as the spatial neighboring block, the availability of the motion vector of the corresponding spatial neighboring block may be checked while searching for the plurality of neighboring blocks according to the pre-defined order, and the motion vector of the spatial neighboring block determined as being first available may be used. Since this has been described in detail with reference to FIG. 9, the detailed description thereof will be omitted.

As described above, when deriving the motion vector of the spatial neighboring block of the current block, the encoding apparatus may derive the corresponding block based on the location indicated by the motion vector of the spatial neighboring block in the reference picture. According to the exemplary embodiment, the encoding apparatus may specify the top-left sample location of the corresponding block corresponding to the top-left sample location of the current block in the reference picture, and specify the location moved from the top-left sample location of the corresponding block specified in the reference picture by the motion vector of the spatial neighboring block as the location of the corresponding block. At this time, the size (width/height) of the corresponding block may be equal to the size (width/height) of the current block.

The encoding apparatus may derive the ATMVP candidate of sub-block unit for the current block based on the motion vectors of sub-block unit of the corresponding block (S1720).

According to the exemplary embodiment, the encoding apparatus may split the current block into sub-blocks based on the fixed size of the sub-block, and derive the motion vectors of the sub-blocks within the corresponding block corresponding to the sub-blocks within the current block to use the motion vector of the sub-block as the ATMVP candidate of sub-block unit for the current block.

In splitting the current block into the sub-blocks having the fixed size of the sub-block, as described with reference to FIGS. 13 to 15, since this may affect the process of fetching the motion vector of the corresponding block from the reference picture according to the size of the sub-block, the size of the sub-block may be defined as the fixed size. According to the exemplary embodiment, the size of the sub-block is the fixed size, and for example, may be the size of 8×8, 16×16, or 32×32. That is, the encoding apparatus may derive the temporal motion vector for each of the split sub-blocks by splitting the current block in units of sub-block fixed as the size of 8×8, 16×16, or 32×32. Here, the fixed size of the sub-block may also be pre-defined, and may also be signaled from the encoding apparatus to the decoding apparatus. At this time, only if the ATMVP candidate of sub-block unit for the current block is used, the information about the fixed size of the sub-block may also be signaled from the encoding apparatus to the decoding apparatus. The method for signaling the size of the sub-block has been described in detail with reference to Tables 5 to 16.

In the motion vectors of the sub-blocks within the corresponding block are derived, there may be the case where the motion vector does not exist in the specific sub-block within the corresponding block. That is, if the motion vector of the specific sub-block within the corresponding block is not available, the encoding apparatus may derive the motion vector of the block located at the center within the corresponding block to use the motion vector as the motion vector of the specific sub-block within the corresponding block. Therefore, the motion vector of the sub-block within the current block corresponding to the specific sub-block within the corresponding block may use the motion vector of the block located at the center within the corresponding block. Here, the block located at the center within the corresponding block may indicate the block including the sample located at the center of the corresponding block. Further, the sample located at the center may indicate the sample located on the bottom-right of four samples located at the center of the corresponding block.

Since the process of deriving the ATMVP candidate of sub-block unit has been described in detail with reference to FIGS. 9 to 16, the detailed description thereof will be omitted in the present exemplary embodiment. Of course, the exemplary embodiments illustrated in FIGS. 9 to 16 may also be applied to the present exemplary embodiment.

The encoding apparatus may construct the merge candidate list including the ATMVP candidate of sub-block unit for the current block (S1730).

The encoding apparatus may add the ATMVP candidate of sub-block unit for the current block to the merge candidate list. At this time, the encoding apparatus may compare the number of current candidates with the maximum number of candidates necessary for constructing the merge candidate list, and add the combined bi-predictive candidate and the zero vector candidate to the merge candidate list if the number of current candidates is smaller than the maximum number of candidates according to the comparison result. The maximum number of candidates may be pre-defined, or signaled from the encoding apparatus to the decoding apparatus.

According to the exemplary embodiment, as described with reference to FIGS. 4 to 7 and 12, the encoding apparatus may also construct the merge candidate list including all of the spatial motion information candidate and the ATMVP candidate, or also construct the merge candidate list based on the sub-block for the ATMVP candidate of sub-block unit. That is, the encoding apparatus may generate the candidate list by variously configuring the candidate, the number of candidates, or the like constructed according to the inter-prediction mode applied upon the inter-prediction. For example, if the merge mode is applied, the encoding apparatus may generate the merge candidate list by constructing the merge candidate based on the spatial motion information candidate and the temporal motion information candidate. At this time, if the ATMVP mode or the ATMVP-ext mode is applied when the temporal motion information candidate is derived, the merge candidate list may be constructed by adding the temporal motion information candidate (the ATMVP candidate or the ATMVP-ext candidate) thereto. Alternatively, as described above, if the sbTMVP candidate is used based on the flag information (e.g., sps_atmvp_enabled_flag) for indicating whether to use the temporal motion information candidate of sub-block unit (i.e., the sbTMVP candidate), the encoding apparatus may construct the candidate list based on the sub-block for the sbTMVP candidate by deriving the sbTMVP candidate. In this case, the candidate list for the ATMVP candidate of sub-block unit may be referred to a sub-block merge candidate list.

Since the process of constructing the merge candidate list has been described in detail with reference to FIGS. 4, 5, 7, and 12, the detailed description thereof will be omitted in the present exemplary embodiment. Of course, the exemplary embodiments illustrated in FIGS. 4, 5, 7, and 12 may also be applied to the present exemplary embodiment.

The encoding apparatus may generate the candidate index for indicating the candidate applied to the current block among the candidates of the merge candidate list (S1740).

According to the exemplary embodiment, the encoding apparatus may select an optimal candidate among the candidates included in the merge candidate list based on the rate-distortion (RD) cost, and generate the candidate index information for indicating the selected candidate as the candidate applied to the inter-prediction of the current block.

The encoding apparatus may encode the image information including the candidate index to output the encoded image information as the bitstream (S1750).

According to the exemplary embodiment, the candidate index information may be generated and encoded in the form of the syntax table expressed by Table 22 below and output as the bitstream.

Table 23

TABLE 23

| coding_unit( x0, y0, cbWidth, cbHeight ) { | Descriptor |
|---|---|
|   if (slice_type != I ) | |
|     cu_skip_flag[ x0 ][ y0 ] | ae(v) |
|   if( cu_skip_flag[ x0 ][ y0 ] ) { | |
|     if' (MaxNumberMergeCand >1) | |
|       merge_idx[x0][y0] | ae(v) |
|     return | |
|   } | |
|   if( slice_type != I ) { | |
|     pred_mode_flag | ae(v) |
|   } | |
|   if( CuPredMode[ x0 ][ y0 ] = = MODE_INTRA) | |
| { | |
|     [Ed. (BB): Intra prediction yet to be added, pending further specification development.] | |
|   }else { | |
|     [Ed, (BB) Inter prediction yet to be added, pending further specification development.] | |
|     merge_flag[ x0 ][ y0 ] | ac(v) |
|     if( merge_flag[ x0 ][ y0 ] ) { | |
|       if( MaxNumMergeCand> 1 ) | |
|         merge idx[ x0 ][ y0 ] | ae(v) |
|     } else { | |
|     [AMVP mode syntax] | |
|     } | |
|   } | |
|   if( CuPredMode[ x0 ][ y0 ] != MODE_INTRA ) | |
|     cu_cbf | ac(v) |
|   if( cu_cbf ) { | |
|     transform_tree( x0, y0, cbWidth, cbHeight ) | |
| } | |

As expressed by Table 23, the candidate index information may be generated as merge_idx and signaled to the decoding apparatus. Table 23 is merely illustrative, and the present disclosure may also generate and encode the candidate index information using the syntax elements (e.g., merge_subblock_flag and merge_subblock_idx) for the candidate in units of sub-block.

Further, the encoding apparatus may derive the candidate (i.e., the candidate indicated by the candidate index) selected as the optimal candidate among the candidates of the merge candidate list as the motion vector of the current block, and generate the prediction samples of the current block by performing the inter-prediction for the current block based on the derived motion vector of the current block. For example, if the ATMVP candidate of sub-block unit among the candidates included in the merge candidate list is selected as the optimal candidate, the encoding apparatus may derive the motion vectors of sub-block unit for the current block to generate the prediction samples of the current block based on the motion vectors of sub-block unit.

Further, the encoding apparatus may derive the residual samples based on the prediction samples of the current block (S1530), and encode the information about the residual samples. That is, the encoding apparatus may generate the residual samples based on the original samples for the current block and the prediction samples of the current block. Further, the encoding apparatus may encode the information about the residual samples to output the encoded information as the bitstream, and transmit the bitstream to the decoding apparatus through a network or a storage medium.

Figure 18:
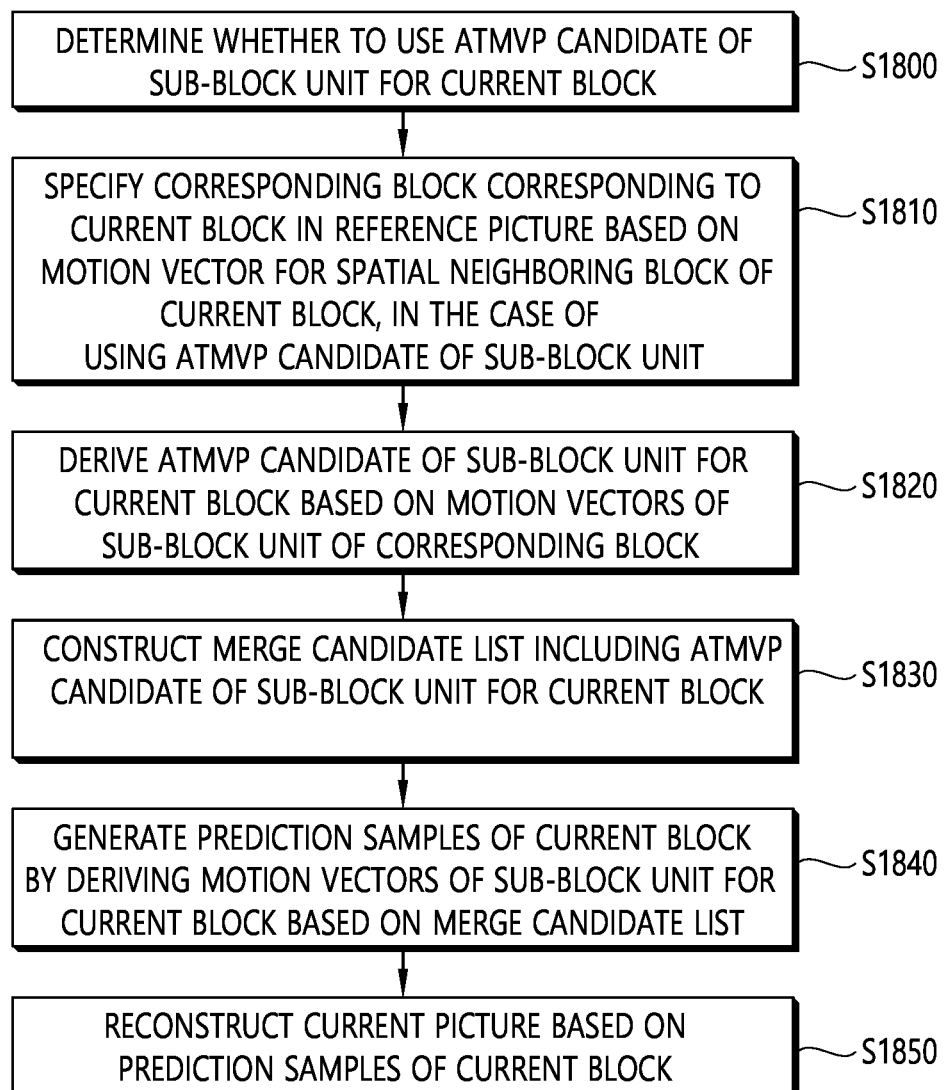
FIG. 18 is a flowchart schematically illustrating an image decoding method by a decoding apparatus according to the present disclosure.

FIG. 18 is a flowchart schematically illustrating an image decoding method by a decoding apparatus according to the present disclosure.

A method illustrated in FIG. 18 may be performed by the decoding apparatus 300 illustrated in FIG. 3. More specifically, the step S1800 may be performed by the entropy decoder 310 or the predictor 330 illustrated in FIG. 3, and the steps S1810 to S1850 may be performed by the predictor 330 illustrated in FIG. 3. Further, the method illustrated in FIG. 18 may include the aforementioned exemplary embodiments in the present specification. However, in FIG. 18, the description of the detailed contents overlapping the contents described with reference to FIGS. 1 to 16 will be omitted or simplified.

Referring to FIG. 18, the decoding apparatus may determine whether to use the advanced temporal motion vector predictor (ATMVP or ATMVP-ext) candidate of sub-block unit for the current block (S1800).

According to the exemplary embodiment, the decoding apparatus may determine whether to use the ATMVP candidate of sub-block unit based on the size of the current block when performing the inter-prediction for the current block. At this time, the decoding apparatus may determine whether to use the ATMVP candidate according to whether the size of the current block is smaller than the fixed size of the sub-block. This may be expressed by Equation 1 described above. The decoding apparatus may determine that the ATMVP candidate of sub-block unit is not used for the current block in the case of satisfying the aforementioned condition of Equation 1. Alternatively, the decoding apparatus may determine that the ATMVP candidate of sub-block unit is used for the current block in the case of not satisfying the aforementioned condition of Equation 1.

Here, the fixed size of the sub-block may be pre-defined as the minimum size of the sub-block expressed by Equation 1, and for example, may be pre-defined as the fixed size of 8×8. However, the size of 8×8 is merely illustrative, and may be defined as different sizes in consideration of the hardware performance or coding efficiency of the encoder/the decoder. For example, the minimum size of the sub-block may also be the size of 8×8 or more, and may also be defined as the size smaller than 8×8. Further, the information about the minimum size of the sub-block may be signaled from the encoding apparatus to the decoding apparatus.

If the size (Width$_{block}$, Height$_{block}$) of the current block is smaller than the fixed size of the sub-block, the decoding apparatus may determine that the ATMVP candidate of sub-block unit is not used for the current block, and may not perform the process of deriving the ATMVP candidate of sub-block unit for the current block. In this case, the merge candidate list except for the ATMVP candidate of sub-block unit may be constructed. For example, if the fixed size of the sub-block is pre-defined as the minimum size of the sub-block of 8×8 and the size of the current block is the size of any one of 4×4, 4×8, 8×4, or 8×8, the decoding apparatus may determine that the size of the current block is smaller than the minimum size of the sub-block, and may determine that the ATMVP candidate of sub-block unit is not used for the current block.

If the size (Width$_{block}$, Height$_{block}$) of the current block is larger than the fixed size of the sub-block, the decoding apparatus may determine that the ATMVP candidate of sub-block unit is used for the current block, and derive the ATMVP candidate of sub-block unit for the current block. For example, if the fixed size of the sub-block is pre-defined as the minimum size of the sub-block of 8×8 and the size of the current block is larger than the size of 8×8, the decoding apparatus may determine that the size of the current block is larger than the minimum size of the sub-block, may determine that the ATMVP candidate of sub-block unit is used for the current block.

According to another exemplary embodiment, the decoding apparatus may determine whether the ATMVP candidate of sub-block unit is to be applied to the current block based on the flag information for indicating whether to use the ATMVP candidate of sub-block unit. For example, the decoding apparatus may obtain the bitstream including the aforementioned flag information (e.g., sps_atmvp_enabled_flag) expressed by Tables 18 to 21 from the encoding apparatus, and decode the flag information from the bitstream to determine whether the ATMVP candidate of sub-block unit is to be applied to the current block.

When determining to use the ATMVP candidate f sub-block unit, the decoding apparatus may specify the corresponding block corresponding to the current block in the reference picture based on the motion vector for the spatial neighboring block of the current block (S1810).

Here, the spatial neighboring block may be derived by checking the availability based on the neighboring blocks including at least one of the bottom-left corner neighboring block, left neighboring block, top-right corner neighboring block, top neighboring block, and top-left corner neighboring block of the current block. Therefore, the motion vector for the spatial neighboring block of the current block may be the motion vector of the neighboring block of any one of the bottom-left corner neighboring block, the left neighboring block, the top-right corner neighboring block, the top neighboring block, and the top-left corner neighboring block, which is determined as being available.

Further, the spatial neighboring block may also include a plurality of neighboring blocks, and also include only one neighboring block (e.g., the left neighboring block). If the plurality of neighboring blocks (e.g., including at least one of the bottom-left corner neighboring block, the left neighboring block, the top-right corner neighboring block, the top neighboring block, and the top-left corner neighboring block) are to be used as the spatial neighboring block, the availability of the motion vector of the corresponding spatial neighboring block may be checked while searching for the plurality of neighboring blocks according to the pre-defined order, and the motion vector of the spatial neighboring block determined as being first available may be used. Since this has been described in detail with reference to FIG. 9, the detailed description thereof will be omitted.

As described above, when deriving the motion vector of the spatial neighboring block of the current block, the decoding apparatus may derive the corresponding block based on the location indicated by the motion vector of the spatial neighboring block in the reference picture. According to the exemplary embodiment, the decoding apparatus may specify the top-left sample location of the corresponding block corresponding to the top-left sample location of the current block in the reference picture, and specify the location moved from the top-left sample location of the corresponding block specified in the reference picture by the motion vector of the spatial neighboring block as the location of the corresponding block. At this time, the size (width/height) of the corresponding block may be equal to the size (width/height) of the current block.

The decoding apparatus may derive the ATMVP candidate of sub-block unit for the current block based on the motion vectors of sub-block unit of the corresponding block (S1820).

According to the exemplary embodiment, the decoding apparatus may split the current block into sub-blocks based on the fixed size of the sub-block, and derive the motion vectors of the sub-blocks within the corresponding block corresponding to the sub-blocks within the current block to use the motion vector of the sub-block as the ATMVP candidate of sub-block unit for the current block.

In splitting the current block into the sub-blocks having the fixed size of the sub-block, as described with reference to FIGS. 13 to 15, since this may affect the process of fetching the motion vector of the corresponding block from the reference picture according to the size of the sub-block, the size of the sub-block may be defined as the fixed size. According to the exemplary embodiment, the size of the sub-block is the fixed size, and for example, may be the size of 8×8, 16×16, or 32×32. That is, the decoding apparatus may derive the temporal motion vector for each of the split sub-blocks by splitting the current block of sub-block unit fixed as the size of 8×8, 16×16, or 32×32. Here, the fixed size of the sub-block may also be pre-defined, and may also be signaled from the encoding apparatus to the decoding apparatus. At this time, only if the ATMVP candidate of sub-block unit for the current block is used, the information about the fixed size of the sub-block may also be signaled from the encoding apparatus to the decoding apparatus. The method for signaling the size of the sub-block has been described in detail with reference to Tables 5 to 16.

In the motion vectors of the sub-blocks within the corresponding block are derived, there may be the case where the motion vector does not exist in the specific sub-block within the corresponding block. That is, if the motion vector of the specific sub-block within the corresponding block is not available, the decoding apparatus may derive the motion vector of the block located at the center within the corresponding block to use the motion vector as the motion vector of the specific sub-block within the corresponding block. Therefore, the motion vector of the sub-block within the current block corresponding to the specific sub-block within the corresponding block may use the motion vector of the block located at the center within the corresponding block. Here, the block located at the center within the corresponding block may indicate the block including the sample located at the center of the corresponding block. Further, the sample located at the center may indicate the sample located on the bottom-right of four samples located at the center of the corresponding block.

Since the process of deriving the ATMVP candidate of sub-block unit has been described in detail with reference to FIGS. 9 to 16, the detailed description thereof will be omitted in the present exemplary embodiment. Of course, the exemplary embodiments illustrated in FIGS. 9 to 16 may also be applied to the present exemplary embodiment.

The decoding apparatus may construct the merge candidate list including the ATMVP candidate of sub-block unit for the current block (S1830).

The decoding apparatus may add the ATMVP candidate of sub-block unit for the current block to the merge candidate list. At this time, the decoding apparatus may compare the number of current candidates with the maximum number of candidates necessary for constructing the merge candidate list, and add the combined bi-predictive candidate and the zero vector candidate to the merge candidate list if the number of current candidates is smaller than the maximum number of candidates according to the comparison result. The maximum number of candidates may be pre-defined, or signaled from the encoding apparatus to the decoding apparatus.

According to the exemplary embodiment, as described with reference to FIGS. 4 to 7 and 12, the decoding apparatus may also construct the merge candidate list including all of the spatial motion information candidate and the ATMVP candidate, or also construct the merge candidate list based on the sub-block for the ATMVP candidate of sub-block unit. That is, the decoding apparatus may generate the candidate list by variously configuring the candidate, the number of candidates, or the like constructed according to the inter-prediction mode applied upon the inter-prediction. For example, if the merge mode is applied, the decoding apparatus may generate the merge candidate list by constructing the merge candidate based on the spatial motion information candidate and the temporal motion information candidate. At this time, if the ATMVP mode or the ATMVP-ext mode is applied when the temporal motion information candidate is derived, the merge candidate list may be constructed by adding the temporal motion information candidate (the ATMVP candidate or the ATMVP-ext candidate) thereto. Alternatively, as described above, if the sbTMVP candidate is used based on the flag information (e.g., sps_atmvp_enabled_flag) for indicating whether to use the temporal motion information candidate of sub-block unit (i.e., the sbTMVP candidate), the decoding apparatus may construct the candidate list based on the sub-block for the sbTMVP candidate by deriving the sbTMVP candidate. In this case, the candidate list for the ATMVP candidate in units of sub-block may be referred to a sub-block merge candidate list.

Since the process of configuring the merge candidate list has been described in detail with reference to FIGS. 4, 5, 7, and 12, the detailed description thereof will be omitted in the present exemplary embodiment. Of course, the exemplary embodiments illustrated in FIGS. 4, 5, 7, and 12 may also be applied to the present exemplary embodiment.

The decoding apparatus may generate the prediction samples of the current block by deriving the motion vectors of sub-block unit for the current block based on the merge candidate list (S1840).

According to the exemplary embodiment, the decoding apparatus may select the candidate indicated by the candidate index among the candidates included in the merge candidate list to derive the candidate as the motion vector of the current block. At this time, the candidate index information may be the index indicating the candidate used for the inter-prediction of the current block within the merge candidate list. The candidate index information may be signaled from the encoding apparatus. For example, the decoding apparatus may obtain the bitstream including the aforementioned syntax element "merge_idx" expressed by Table 23 from the encoding apparatus, and decode the syntax element "merge_idx" from the bitstream to obtain the candidate index information. As another example, the decoding apparatus may also obtain the syntax element (e.g., merge_subblock_idx) for the candidate of sub-block unit as the candidate index information from the encoding apparatus.

Further, the decoding apparatus may perform the inter-prediction for the current block based on the motion vector of the current block to generate the prediction samples of the current block. For example, if the ATMVP candidate of sub-block unit is selected by the candidate index among the candidates included in the merge candidate list, the decoding apparatus may derive the motion vectors of sub-block unit of the current block to generate the prediction samples of the current block based on the motion vectors in units of sub-block.

The decoding apparatus may reconstruct the current picture based on the prediction samples of the current block (S1850).

According to the exemplary embodiment, the decoding apparatus may derive the residual samples based on the residual information of the current block, and reconstruct the current picture based on the derived residual samples and the prediction samples. At this time, the residual information may be signaled from the encoding apparatus.

Meanwhile, the inter-prediction method based on the ATMVP candidate (or the ATMVP-ext candidate) of sub-block unit described above in the present specification may be implemented according to the specification expressed by Table 24 below.

TABLE 24

8 Decoding process
8.1 Decoding process for coding units coded in inter prediction mode
8.1.1 Decoding process for prediction units in inter prediction mode
11.1.1.1 Derivation process for motion vector components and reference indices
Inputs to this process are
    a luma location (xC, yC) of the top-left sample of the current luma coding block relative to
    the top-left luma sample of the current picture,
    variables specifying the width and the height of the luma prediction block, nCbW and nPbH,
Outputs of this process are
    luma motion vectors mvL0 and mvL1
    chroma motion vectors mvCL0 and mvCL1,
    reference indices refIdxL0 and refIdxL1,
    prediction list utilization flags predFlagL0 and predFlagL1.
Let the variable currPic and ListX be the current picture and RefPicListX (with X being 0 or 1) of
the current picture, respectively.
The function LongTermRefPic(nPic, nCb, refIdx, LX), with X being either 0 or 1, is defined as
follows. If the picture with index refIdx from reference picture list LX of the slice containing coding
block nCb in the picture nPic was marked as "used for long term reference" at the time when
nPic was the current picture, LongTermRefPic(nPic, nCb, refIdx, LX) is equal to 1; otherwise
LongTermRefPic(nPic, nCb, refIdx, LX) is equal to 0.
The variable subPuLog2Size is set to log2_atmvp_active_size_minus2 + 2.
For the derivation of the variables mvL0 and mvL1, refIdxL0 and refIdxL1 as well as predFlagL0
and predFlagL1, the following applies.
    If CuPredMode[xC][yC] is equal to MODE_SKIP, the derivation process for luma motion
    vectors for merge mode as specified in subclause 8.1.1.1.1 is invoked with the luma location
    (xC, yC), variables nCbW, nCbH, mergeType and the subPuLog2Size as inputs and the output
    being the luma motion vectors mvL0, mvL1, the reference indices refIdxL0, refIdxL1, and the
    prediction list utilization flags predFlagL0 and predFlagL1.
    Otherwise, if CuPredMode[xC][yC] is equal to MODE_INTER and merge_flag[xC][yC] is
    equal to 1, the derivation process for luma motion vectors for merge mode as specified in
    subclause 8.1.1.1.1 is invoked with the luma location (xC, yC), variables nCbW and nCbH,
    mergeType and the subPuLog2Size as inputs and the outputs being the luma motion vectors
    mvL0 and mvL1, the reference indices refIdxL0 and refIdxL1, the prediction utilization flags
    predFlagL0 and predFlagL1.
    When variable mergeType is equal to 1, the derivation process for luma motion vector
    predicito is as folows. For X being replaced by either 0 or 1 in the variables predFlagLX,
    mvLX, refIdxLX and in Pred_LX and in the syntax elements ref_idx_lX and MvdLX, the
    following applies.
    1. The variables refIdxLX and predFlagLX are derived as follows.
        If inter_pred_idc[xP][yP] is equal to Pred_LX or Pred_BI,
            refIdxLX = ref_idx_lX[xP][yP]     (8-67)
            predFlagLX = 1     (8-68)
        Otherwise, the variables refIdxLX and predFlagLX are specified by
            refIdxLX = −1     (8-69)
            predFlagLX = 0     (8-70)
    2. The variable mvdLX is derived as follows.
        mvdLX[0] = MvdLX[xP][yP][0]     (8-71)
        mvdLX[1] = MvdLX[xP][yP][1]     (8-72)
    3. When predFlagLX is equal to 1, the derivation process for luma motion vector
        prediction in subclause 8.5.3.1.5 is invoked with the luma coding block location
        (xC, yC), the coding block size nCS, the luma prediction block location (xP, yP),
        variables nPbW and nPbH, refIdxLX, and the partition index partIdx as the inputs
        and the output being mvpLX.

TABLE 24-continued

4. When predFlagLX is equal to 1, the luma motion vector mvLX is derived as $$uLX[0] = (mvpLX[0] + mvdLX[0] + 2^{16}) \% 2^{16} \quad (8\text{-}73)$$

$$mvLX[0] = (uLX)[0] >= 2^{15} ? (uLX[0] - 2^{16}) : uLX[0] \quad (8\text{-}74)$$

$$uLX[1] = (mvpLX[1] + mvdLX[1] + 2^{16}) \% 2^{16} \quad (8\text{-}75)$$

$$mvLX[1] = (uLX)[1] >= 2^{15} ? (uLX[1] - 2^{16}) : uLX[1] \quad (8\text{-}76)$$

NOTE - The resulting values of mvLX[0] and mvLX[1] as specified above will always be in the range of $-2^{15}$ to $2^{15} - 1$.

When ChromaArrayType is not equal to 0 and predFlagLX (with X being either 0 or 1) is equal to 1, the derivation process for chroma motion vectors in subclause 8.5.3.1.9 is invoked with mvLX and refIdxLX as inputs and the output being mvCLX.

11.1.1.1.1 Derivation process for luma motion vectors for merge mode

This process is only invoked when CuPredMode[xC][yC] is equal to MODE_SKIP or CuPredMode[xC][yC] is equal to MODE_INTER and merge_flag [xC][yC] is equal to 1, where (xC, yC) specify the top-left sample of the current luma coding block relative to the top-left luma sample of the current picture.

Inputs of this process are
    a luma location (xC, yC) of the top-left sample of the current luma coding block relative to the top-left luma sample of the current picture,
    variables specifying the width and the height of the luma prediction block, nCbW and nCbH,
    variable specifying the type of merge mode, mergeType,
    variable specifying the size of sub prediction unit, subPuLog2Size, Outputs of this process are
    the luma motion vectors mvL0 and mvL1,
    the reference indices refIdxL0 and refIdxL1,
    the prediction list utilization flags predFlagL0 and predFlagL1.

The motion vectors mvL0 and mvL1, the reference indices refIdxL0 and refIdxL1, and the prediction utilization flags predFlagL0 and predFlagL1 are derived as specified by the following ordered steps:

1. The derivation process for merging candidates from neighboring prediction unit partitions in subclause 8.1.1.1.2 is invoked with the luma coding block location (xC, yC), the coding block size nCS, the luma prediction block location (xP, yP), the variable singleMCLFlag, the width and the height of the luma prediction block nPbW and nPbH and the partition index partIdx as inputs and the output being the availability flags availableFlag$A_0$, availableFlag$A_1$, availableFlag$B_0$, availableFlag$B_1$, availableFlag$B_2$, the reference indices refIdxLX$A_0$, refIdxLX$A_1$, refIdxLX$B_0$, refIdxLX$B_1$, refIdxLX$B_2$, the prediction list utilization flags predFlagLX$A_0$, predFlagLX$A_1$, predFlagLX$B_0$, predFlagLX$B_1$, predFlagLX$B_2$ and the motion vectors mvLX$A_0$, mvLX$A_1$, mvLX$B_0$, mvLX$B_1$, mvLX$B_2$ (with X being 0 or 1, respectively).
2. The reference indices for the advanced temporal merging candidate are set equal to 0.
3. The derivation process for advanced temporal luma motion vector prediction in subclause 8.1.1.1.7 is invoked with luma location (xC, yC), the width and the height of the luma prediction block nCbW and nCbH, mergeType, subPuLog2Size and the availability flags availableFlag$A_0$, availableFlag$A_1$, availableFlag$B_0$ and availableFlag$B_1$, the reference indices refIdxLX$A_0$, refIdxLX$A_1$, refIdxLX$B_0$ and refIdxLX$B_1$, the prediction list utilization flags predFlagLX$A_0$, predFlagLX$A_1$, predFlagLX$B_0$ and predFlagLX$B_1$ and the motion vectors mvLX$A_0$, mvLX$A_1$, mvLX$B_0$ and mvLX$B_1$ (with X being 0 or 1, respectively) as the inputs and the output being the availability flag availableFlagATMVP, the prediction utilization flags predFlagLXATMVP and the temporal motion vectors mvLXATMVP[xP][yP] (with X being 0 or 1, respectively).
4. The reference indices for the temporal merging candidate, refIdxLXCol (with X being 0 or 1, respectively), are set equal to 0.
5. The derivation process for temporal luma motion vector prediction in subclause 8.5.3.1.7 is invoked with luma location (xP, yP), the width and the height of the luma prediction block nPbW and nPbH, and refIdxLXCol as the inputs and the output being the availability flags availableFlagLXCol and the temporal motion vectors mvLXCol (with X being 0 or 1, respectively). The variables availableFlagCol and predFlagLXCol (with X being 0 or 1, respectively) are derived as specified below.

$$\text{availableFlagCol} = \text{availableFlagL0Col} \;||\; \text{availableFlagL1Col} \quad (8\text{-}77)$$

$$\text{predFlagLXCol} = \text{availableFlagLXCol} \quad (8\text{-}78)$$

6. The merging candidate list, mergeCandList, is constructed as follows.
    1. $A_1$, if availableFlag$A_1$ is equal to 1
    2. $B_1$, if availableFlag$B_1$ is equal to 1
    3. $B_0$, if availableFlag$B_0$ is equal to 1
    4. $A_0$, if availableFlag$A_0$ is equal to 1
    5. ATMVP, if availableFlagATMVP is equal to 1
    6. $B_2$, if availableFlag$B_2$ is equal to 1
    7. Col, if availableFlagCol is equal to 1
7. The variable numMergeCand and numOrigMergeCand are set to the number of merging candidates in the mergeCandList.
8. When slice_type is equal to B, the derivation process for combined bi-predictive merging candidates specified in subclause 8.1.1.1.3 is invoked with mergeCandList, the reference indices refIdxL0N and refIdxL1N, the prediction list utilization flags predFlagL0N and predFlagL1N, the motion vectors mvL0N and mvL1N of every candidate N being in mergeCandList, numMergeCand and numOrigMergeCand given as input and the output is assigned to mergeCandList, numMergeCand, the reference indices refIdxL0combCand$_k$ and refIdxL1combCand$_k$, the prediction list utilization flags predFlagL0combCand$_k$ and predFlagL1combCand$_k$ and the motion vectors mvL0combCand$_k$ and mvL1combCand$_k$ of every new candidate combCand$_k$ being added in mergeCandList. The number of candidates being added numCombMergeCand is set equal to (numMergeCand − numOrigMergeCand). When numCombMergeCand is greater than 0, k ranges from 0 to numCombMergeCand 1, inclusive.

TABLE 24-continued

9. The derivation process for zero motion vector merging candidates specified in subclause 8.1.1.1.4 is invoked with the mergeCandList, the reference indices refIdxL0N and refIdxL1N, the prediction list utilization flags predFlagL0N and predFlagL1N, the motion vectors mvL0N and mvL1N of every candidate N being in mergeCandList and the NumMergeCand as the inputs and the output is assigned to mergeCandList, numMergeCand, the reference indices refIdxL0zeroCand$_m$ and refIdxL1zeroCand$_m$, the prediction list utilization flags predFlagL0zeroCand$_m$ and predFlagL1zeroCand$_m$, the motion vectors mvL0zeroCand$_m$ and mvL1zeroCand$_m$ of every new candidate zeroCand$_m$ being added in mergeCandList. The number of candidates being added numZeroMergeCand is set equal to
(numMergeCand numOrigMergeCand numCombMergeCand). When numZeroMergeCand is greater than 0, m ranges from 0 to numZeroMergeCand − 1, inclusive.

10. The following assignments are made with N being the candidate at position merge_idx[xC][yC] in the merging candidate list mergeCandList
(N = mergeCandList[merge_idx[xC][yC]]) and X being replaced by 0 or 1:

mvLX[0] = mvLXN[0]     (8-79)
    mvLX[1] = mvLXN[1]     (8-80)
    refIdxLX = refIdxLXN     (8-81)
    predFlagLX = predFlagLXN     (8-82)

11. When predFlagL0 is equal to 1 and predFlagL1 is equal to 1, and (nPbW + nPbH) is equal to 12, the following applies.

refIdxL1 = −1     (8-83)
    predFlagL1 = 0     (8-84)

11.1.1.1.2 Derivation process for spatial merging candidates

Inputs to this process are
    a luma location (xC, yC) of the top-left sample of the current luma coding block relative to the top-left luma sample of the current picture,
    variables specifying the width and the height of the luma prediction block, nPbW and nPbH,
    a variable partIdx specifying the index of the current prediction unit within the current coding unit.

Outputs of this process are (with X being 0 or 1, respectively)
    the availability flags availableFlagA$_0$, availableFlagA$_1$, availableFlagB$_0$, availableFlagB$_1$, availableFlagB$_2$ of the neighbouring prediction units,
    the reference indices refIdxLXA$_0$, refIdxLXA$_1$, refIdxLXB$_0$, refIdxLXB$_1$, refIdxLXB$_2$ of the neighbouring prediction units,
    the prediction list utilization flags predFlagLXA$_0$, predFlagLXA$_1$, predFlagLXB$_0$, predFlagLXB$_1$, predFlagLXB$_2$ of the neighbouring prediction units,
    the motion vectors mvLXA$_0$, mvLXA$_1$, mvLXB$_0$, mvLXB$_1$, mvLXB$_2$ of the neighbouring prediction units.

For the derivation of availableFlagA$_1$, refIdxLXA$_1$, predFlagLXA$_1$, and mvLXA$_1$ the following applies.
    The luma location (xA$_1$, yA$_1$) inside the neighbouring luma coding block is set equal to (xC − 1, yC + nCbH − 1).
    The availability derivation process for a prediction block as specified in subclause 6.4.2 is invoked with the luma location (xC, yC), the luma location (xC, yC), the width and the height of the luma prediction block nCbW and nCbH, the luma location (xA$_1$, yA$_1$) and the partition index partIdx as inputs and the output is assigned to the prediction block availability flag availableA$_1$.
    When one or more of the following conditions are true, availableA$_1$ is set equal to FALSE
        (xC >> (log2_parallel_merge_level_minus2 + 2)) is equal to
        (xA$_1$ >> (log2_parallel_merge_level_minus2 + 2)) and
        (yC >> (log2_parallel_merge_level_minus2 + 2)) is equal to
        (yA$_1$ >> (log2_parallel_merge_level_minus2 + 2)).
    The variables availableFlagA$_1$, refIdxLXA$_1$, predFlagLXA$_1$, and mvLXA$_1$ are derived as follows.
        If availableA$_1$ is equal to FALSE, availableFlagA$_1$ is set equal to 0, both components mvLXA$_1$ are set equal to 0, refIdxLXA$_1$ is set equal to −1 and predFlagLXA$_1$ is set equal to 0 (with X being 0 or 1, respectively).
        Otherwise, availableFlagA$_1$ is set equal to 1 and the following assignments are made.

mvLXA$_1$ = MvLX[xA$_1$][yA$_1$]     (8-85)
    refIdxLXA$_1$ = RefIdxLX[xA$_1$][yA$_1$]     (8-86)
    predFlagLXA$_1$ = PredFlagLX[xA$_1$][yA$_1$]     (8-87)

For the derivation of availableFlagB$_1$, refIdxLXB$_1$, predFlagLXB$_1$, and mvLXB$_1$ the following applies.
    The luma location (xB$_1$, yB$_1$) inside the neighbouring luma coding block is set equal to (xP + nPbW 1, yP 1).
    The availability derivation process for a prediction block as specified in subclause 6.4.2 is invoked with the luma location (xC, yC), the current luma coding block size nCbS set equal to nCS, the luma location (xP, yP), the width and the height of the luma prediction block nPbW and nPbH, the luma location (xB$_1$, yB$_1$) and the partition index partIdx as inputs and the output is assigned to the prediction block availability flag availableB$_1$.
    When one or more of the following conditions are true, availableB$_1$ is set equal to FALSE
        (xP >> (log2_parallel_merge_level_minus2 + 2)) is equal to
        (xB$_1$ >> (log2 parallel_merge_level_minus2 + 2)) and
        (yP >> (log2_parallel_merge_level_minus2 + 2)) is equal to
        (yB$_1$ >> (log2_parallel_merge_level_minus2 + 2)).
        singleMCLFlag is equal to 0 and PartMode of the current prediction unit is PART_2NxN or PART_2NxnU or PART_2NxnD and partIdx is equal to 1
    The variables availableFlagB$_1$, refIdxLXB$_1$, predFlagLXB$_1$, and mvLXB$_1$ are derived as follows.
        If one or more of the following conditions are true, availableFlagB$_1$ is set equal to 0, both components mvLXB$_1$ are set equal to 0, refIdxLXB$_1$ is set equal to −1 and predFlagLXB$_1$ is set equal to 0 (with X being 0 or 1, respectively).

TABLE 24-continued 1. availableB$_1$ is equal to FALSE
2. availableA$_1$ is equal to TRUE and the prediction units covering luma location
   (xA$_1$, yA$_1$) and luma location (xB$_1$, yB$_1$) have the same motion vectors and the
   same reference indices
   Otherwise, availableFlagB$_1$ is set equal to 1 and the following assignments are made.
   mvLXB$_1$ = MvLX[xB$_1$][yB$_1$]     (8-88)
   refIdxLXB$_1$ = RefIdxLX[xB$_1$][yB$_1$]     (8-89)
   predFlagLXB$_1$ = PredFlagLX[xB$_1$][yB$_1$]     (8-90)

For the derivation of availableFlagB$_0$, refIdxLXB$_0$, predFlagLXB$_0$, and mvLXB$_0$ the following applies.
The luma location (xB$_0$, yB$_0$) inside the neighbouring luma coding block is set equal to
(xP + nPbW, yP 1).
The availability derivation process for a prediction block as specified in subclause 6.4.2 is
invoked with the luma location (xC, yC), the current luma coding block size nCbS set
equal to nCS, the luma location (xP, yP), the width and the height of the luma prediction
block nPbW and nPbH, the luma location (xB$_0$, yB$_0$) and the partition index partIdx as
inputs and the output is assigned to the prediction block availability flag availableB$_0$.
When (xP >> (log2_parallel_merge_level_minus2 + 2)) is equal to
(xB$_0$ >> (log2_parallel_merge_level_minus2 + 2)) and
(yP >> (log2_parallel_merge_level_minus2 + 2)) is equal to
(yB$_0$ >> (log2_parallel_merge_level_minus2 + 2)), availableB$_0$ is set equal to FALSE
The variables availableFlagB$_0$, refIdxLXB$_0$, predFlagLXB$_0$, and mvLXB$_0$ are derived as follows.
   If one or more of the following conditions are true, availableFlagB$_0$ is set equal to 0, both
   components mvLXB$_0$ are set equal to 0, refIdxLXB$_0$ is set equal to −1 and predFlagLXB$_0$
   is set equal to 0 (with X being 0 or 1, respectively).
3. availableB$_0$ is equal to FALSE
4. availableB$_1$ is equal to TRUE and the prediction units covering luma location
   (xB$_1$, yB$_1$) and luma location (xB$_0$, yB$_0$) have the same motion vectors and the
   same reference indices
   Otherwise, availableFlagB$_0$ is set equal to 1 and the following assignments are made.
   mvLXB$_0$ = MVLX[xB$_0$][yB$_0$]     (8-91)
   refIdxLXB$_0$ = RefIdxLX[xB$_0$][yB$_0$]     (8-92)
   predFlagLXB$_0$ = PredFlagLX[xB$_0$][yB$_0$]     (8-93)

For the derivation of availableFlagA$_0$, refIdxLXA$_0$, predFlagLXA$_0$, and mvLXA$_0$ the following applies.
The luma location (xA$_0$, yA$_0$) inside the neighbouring luma coding block is set equal to
(xP − 1, yP + nPbH).
The availability derivation process for a prediction block as specified in subclause 6.4.2 is
invoked with the luma location (xC, yC), the current luma coding block size nCbS set
equal to nCS, the luma location (xP, yP), the width and the height of the luma prediction
block nPbW and nPbH, the luma location (xA$_0$, yA$_0$) and the partition index partIdx as
inputs and the output is assigned to the prediction block availability flag availableA$_0$.
When (xP >> (log2_parallel_merge_level_minus2 + 2)) is equal to
(xA$_0$ >> (log2_parallel_merge_level_minus2 + 2)) and
(yP >> (log2_parallel_merge_level_minus2 + 2)) is equal to
(yA$_0$ > > (log2_parallel_merge_level_minus2 + 2)), availableA$_0$ is set equal to FALSE
The variables availableFlagA$_0$, refIdxLXA$_0$, predFlagLXA$_0$, and mvLXA$_0$ are derived as follows.
   If one or more of the following conditions are true, availableFlagA$_0$ is set equal to 0,
   both components mvLXA$_0$ are set equal to 0, refIdxLXA$_0$ is set equal to 1 and
   predFlagLXA$_0$ is set equal to 0 (with X being 0 or 1, respectively).
5. availableA$_0$ is equal to FALSE
6. availableA$_1$ is equal to TRUE and the prediction units covering luma location
   (xA$_1$, yA$_1$) and luma location (xA$_0$, yA$_0$) have the same motion vectors and the
   same reference indices
   Otherwise, availableFlagA$_0$ is set equal to 1 and the following assignments are made.
   mvLXA$_0$ = MvLX[xA$_0$][yA$_0$]     (8-94)
   refIdxLXA$_0$ = RefIdxLX[xA$_0$][yA$_0$]     (8-95)
   predFlagLXA$_0$ = PredFlagLX[xA$_0$][yA$_0$]     (8-96)

For the derivation of availableFlagB$_2$, refIdxLXB$_2$, predFlagLXB$_2$, and mvLXB$_2$ the following applies.
The luma location (xB$_2$, yB$_2$) inside the neighbouring luma coding block is set equal to
(xP 1, yP 1).
The availability derivation process for a prediction block as specified in subclause 6.4.2 is
invoked with the luma location (xC, yC), the current luma coding block size nCbS set
equal to nCS, the luma location (xP, yP), the width and the height of the luma prediction
block nPbW and nPbH, the luma location (xB$_2$, yB$_2$) and the partition index partIdx as
inputs and the output is assigned to the prediction block availability flag availableB$_2$.
When (xP >> (log2_parallel_merge_level_minus2 + 2)) is equal to
(xB$_2$ >> (log2 parallel_merge_level_minus2 + 2)) and
(yP >> (log2_parallel_merge_level_minus2 + 2)) is equal to
(yB$_2$ >> (log2_parallel_merge_level_minus2 + 2)), availableB$_2$ is set equal to FALSE
The variables availableFlagB$_2$, refIdxLXB$_2$, predFlagLXB$_2$, and mvLXB$_2$ are derived as follows.
   If one or more of the following conditions are true, availableFlagB$_2$ is set equal to 0, both
   components mvLXB$_2$ are set equal to 0, refIdxLXB$_2$ is set equal to −1 and predFlagLXB$_2$
   is set equal to 0 (with X being 0 or 1, respectively).
7. availableB$_2$ is equal to FALSE
8. availableA$_1$ is equal to TRUE and prediction units covering luma location (xA$_1$, yA$_1$)
   and luma location (xB$_2$, yB$_2$) have the same motion vectors and the same reference
   indices TABLE 24-continued 9. availableB$_1$ is equal to TRUE and the prediction units covering luma location (xB$_1$, yB$_1$) and luma location (xB$_2$, yB$_2$) have the same motion vectors and the same reference indices
10. availableFlagA$_0$ + availableFlagA$_1$ + availableFlagB$_0$ + availableFlagB$_1$ is equal to 4. Otherwise, availableFlagB$_2$ is set equal to 1 and the following assignments are made.

mvLXB$_2$ = MvLX[xB$_2$][yB$_2$] (8-97)
refIdxLXB$_2$ = RefIdxLX[xB$_2$][yB$_2$] (8-98)
predFlagLXB$_2$ = PredFlagLX[xB$_2$][yB$_2$] (8-99)

11.1.1.1.3 Derivation process for combined bi-predictive merging candidates
Inputs of this process are
    a merging candidate list mergeCandList,
    reference indices refIdxL0N and refIdxL1N of every candidate N being in mergeCandList,
    prediction list utilization flags predFlagL0N and predFlagL1N of every candidate N being in mergeCandList,
    motion vectors mvL0N and mvL1N of every candidate N being in mergeCandList,
    the number of elements numMergeCand within mergeCandList,
    the number of elements numOrigMergeCand within the mergeCandList after the spatial and temporal merge candidate derivation process,
Outputs of this process are
    the merging candidate list mergeCandList,
    the number of elements numMergeCand within mergeCandList.
    reference indices refIdxL0combCand$_k$ and refIdxL1combCand$_k$ of every new candidate combCand$_k$ being added in mergeCandList during the invocation of this process,
    prediction list utilization flags predFlagL0combCand$_k$ and predFlagL1combCand$_k$ of every new candidate combCand$_k$ being added in mergeCandList during the invocation of this process,
    motion vectors mvL0combCand$_k$ and mvL1combCand$_k$ of every new candidate combCand$_k$ being added in mergeCandList during the invocation of this process,
When numOrigMergeCand is greater than 1 and less than MaxNumMergeCand, the variable numInputMergeCand is set to numMergeCand, the variable combIdx is set to 0, the variable combStop is set to FALSE and the following steps are repeated until combStop is equal to TRUE.
    1. The variables l0CandIdx and l1CandIdx are derived using combIdx as specified in Table 8-6.
    2. The following assignments are made with l0Cand being the candidate at position l0CandIdx and l1Cand being the candidate at position l1CandIdx in the merging candidate list mergeCandList (l0Cand = mergeCandList[l0CandIdx], l1Cand = mergeCandList[l1CandIdx]).
    3. When all of the following conditions are true,
        1. predFlagL0l0Cand == 1,
        2. predFlagL1l1Cand == 1,
        3. DiffPicOrderCnt(RefPicList0[refIdxL0l0Cand], RefPicList1[refIdxL1l1Cand]) != 0 || mvL0l0Cand != mvL1l1Cand,
    the candidate combCand$_k$ with k equal to (numMergeCand numInputMergeCand) is added at the end of mergeCandList (mergeCandList[numMergeCand] = combCand$_k$) and the reference indices, the prediction list utilization flags and the motion vectors of combCand$_k$ are derived as follows and numMergeCand is incremented by 1.

refIdxL0combCand$_k$ = refIdxL0l0Cand (8-100)
refIdxL1combCand$_k$ = refIdxL1l1Cand (8-101)
predFlagL0combCand$_k$ = 1 (8-102)
predFlagL1combCand$_k$ = 1 (8-103)
mvL0combCand$_k$[0] = mvL0l0Cand[0] (8-104)
mvL0combCand$_k$[1] = mvL0l0Cand[1] (8-105)
mvL1combCand$_k$[0] = mvL1l1Cand[0] (8-106)
mvL1combCand$_k$[1] = mvL1l1Cand[1] (8-107)
numMergeCand = numMergeCand + 1 (8-108)

4. The variable combIdx is incremented by 1.
    5. When combIdx is equal to (numOrigMergeCand * (numOrigMergeCand 1)) or numMergeCand is equal to MaxNumMergeCand, combStop is set to TRUE.

Table 8-6 - Specification of l0CandIdx and l1CandIdx

| combIdx | 0 | 1 | 2 | 3 | 4 | 5 | 6 | 7 | 8 | 9 | 10 | 11 |
|---|---|---|---|---|---|---|---|---|---|---|---|---|
| l0CandIdx | 0 | 1 | 0 | 2 | 1 | 2 | 0 | 3 | 1 | 3 | 2 | 3 |
| l1CandIdx | 1 | 0 | 2 | 0 | 2 | 1 | 3 | 0 | 3 | 1 | 3 | 2 |

11.1.1.1.4 Derivation process for zero motion vector merging candidates
Inputs of this process are
    a merging candidate list mergeCandList,
    reference indices refIdxL0N and refIdxL1N of every candidate N being in mergeCandList,
    prediction list utilization flags predFlagL0N and predFlagL1N of every candidate N being in mergeCandList,
    motion vectors mvL0N and mvL1N of every candidate N being in mergeCandList,
    the number of elements numMergeCand within mergeCandList,

TABLE 24-continued

Outputs of this process are
- the merging candidate list mergeCandList,
- the number of elements numMergeCand within mergeCandList.
- reference indices refIdxL0zeroCand$_m$ and refIdL10zeroCand$_m$ of every new candidate zeroCand$_m$ being added in mergeCandList during the invokation of this process,
- prediction list utilization flags predFlagL0zeroCand$_m$ and predFlagL10zeroCand$_m$ of every new candidate zeroCand$_m$ being added in mergeCandList during the invokation of this process,
- motion vectors mvL0zeroCand$_m$ and mvL10zeroCand$_m$ of every new candidate zeroCand$_m$ being added in mergeCandList during the invokation of this process, The variable numRefIdx is derived as follows.
- If slice_type is equal to P, numRefIdx is set to num_ref_idx_l0_active_minus1 + 1
- Otherwise (slice_type is equal to B), numRefIdx is set to Min(num_ref_idx_l0_active_minus1 + 1, num_ref_idx_l1_active_minus1 + 1)

When numMergeCand is less than MaxNumMergeCand, the variable numInputMergeCand is set to numMergeCand, the variable zeroIdx is set to 0, and the following steps are repeated until numMergeCand is equal to MaxNumMergeCand.

1. For the derivation of the reference indices, the prediction list utilization flags and the motion vectors of the zero motion vector merging candidate, the following applies.
   1. If slice_type is equal to P, the candidate zeroCand$_m$ with m equal to (numMergeCand numInputMergeCand) is added at the end of mergeCandList (mergeCandList[numMergeCand] = zeroCand$_m$) and the reference indices, the prediction list utilization flags and the motion vectors of zeroCand$_m$ are derived as follows and numMergeCand is incremented by 1.

refIdxL0zeroCand$_m$ = (zeroIdx < numRefIdx) ? zeroIdx:0  (8-109)
   refIdxL1zeroCand$_m$ = 1  (8-110)
   predFlagL0zeroCand$_m$ = 1  (8-111)
   predFlagL1zeroCand$_m$ = 0  (8-112)
   mvL0zeroCand$_m$[0] = 0  (8-113)
   mvL0zeroCand$_m$[1] = 0  (8-114)
   mvL1zeroCand$_m$[0] = 0  (8-115)
   mvL1zeroCand$_m$[1] = 0  (8-116)
   numMergeCand = numMergeCand + 1  (8-117)

2. Otherwise (slice_type is equal to B), the candidate zeroCand$_m$ with m equal to (numMergeCand − numInputMergeCand) is added at the end of mergeCandList (mergeCandList[numMergeCand] = zeroCand$_m$) and the reference indices, the prediction list utilization flags and the motion vectors of zeroCand$_m$ are derived as follows and numMergeCand is incremented by 1.

refIdxL0zeroCand$_m$ = (zeroIdx < numRefIdx) ? zeroIdx:0  (8-118)
   refIdxL1zeroCand$_m$ = (zeroIdx < numRefIdx) ? zeroIdx:0  (8-119)
   predFlagL0zeroCand$_m$ = 1  (8-120)
   pred FlagL1zeroCand$_m$ = 1  (8-121)
   mvL0zeroCand$_m$[0] = 0  (8-122)
   mvL0zeroCand$_m$[1] = 0  (8-123)
   mvL1zeroCandm[0] = 0  (8-124)
   mvL1zeroCand$_m$[1] = 0  (8-125)
   numMergeCand = numMergeCand + 1  (8-126)

2. The variable zeroIdx is incremented by 1.

11.1.1.1.5 Derivation process for luma motion vector prediction

Inputs to this process are
- a luma location (xC, yC) of the top-left sample of the current luma coding block relative to the top-left luma sample of the current picture,
- a variable nCS specifying the size of the current luma coding block,
- a luma location (xP, yP) specifying the top-left sample of the current luma prediction block relative to the top-left luma sample of the current picture,
- variables specifying the width and the height of the luma prediction block, nPbW and nPbH,
- the reference index of the current prediction unit partition refIdxLX (with X being 0 or 1),
- a variable partIdx specifying the index of the current prediction unit within the current coding unit.

Output of this process is
- the prediction mvpLX of the motion vector mvLX (with X being 0 or 1).

The motion vector predictor mvpLX is derived in the following ordered steps.
1. The derivation process for motion vector predictor candidates from neighboring prediction unit partitions in subclause 8.5.3.1.6 is invoked with the luma coding block location (xC, yC), the coding block size nCS, the luma prediction block location (xP, yP), the width and the height of the luma prediction block nPbW and nPbH, refIdxLX (with X being 0 or 1, respectively), and the partition index partIdx as inputs and the availability flags availableFlagLXN and the motion vectors mvLXN with N being replaced by A, B as the output.
2. If both availableFlagLXA and availableFlagLXB are equal to 1 and mvLXA is not equal to mvLXB, availableFlagLXCol is set equal to 0, otherwise, the derivation process for temporal luma motion vector prediction in subclause 8.5.3.1.7 is invoked with luma location (xP, yP), the width and the height of the luma prediction block nPbW and nPbH, and refIdxLX (with X being 0 or 1, respectively) as the inputs and with the output being the availability flag availableFlagLXCol and the temporal motion vector predictor mvLXCol.
3. The motion vector predictor candidate list, mvpListLX, is constructed as follows.
   1. mvLXA, if availableFlagLXA is equal to 1
   2. mvLXB, if availableFlagLXB is equal to 1
   3. mvLXCol, if availableFlagLXCol is equal to 1

TABLE 24-continued

4. The motion vector predictor list is modifed as follows.
  1. When mvLXA and mvLXB have the same value, mvLXB is removed from the list and the variable numMVPCandLX is set to the number of elements within the mvpListLX.
  2. When numMVPCandLX is less than 2, the following applies repeatedly until numMVPCandLX is equal to 2.
    mvpListLX[numMVPCandLX][0] = 0                                                  (8-127)
    mvpListLX[numMVPCandLX][1] = 0                                                  (8-128)
    numMVPCandLX = numMVPCandLX + 1                                                 (8-129)
  3. When numMVPCandLX is greater than 2, all motion vector predictor candidates mvpListLX[idx] with idx greater than 1 are removed from the list.
5. The motion vector of mvpListLX[mvp_IX_flag[xP][yP]] is assigned to mvpLX.

Figure 20:
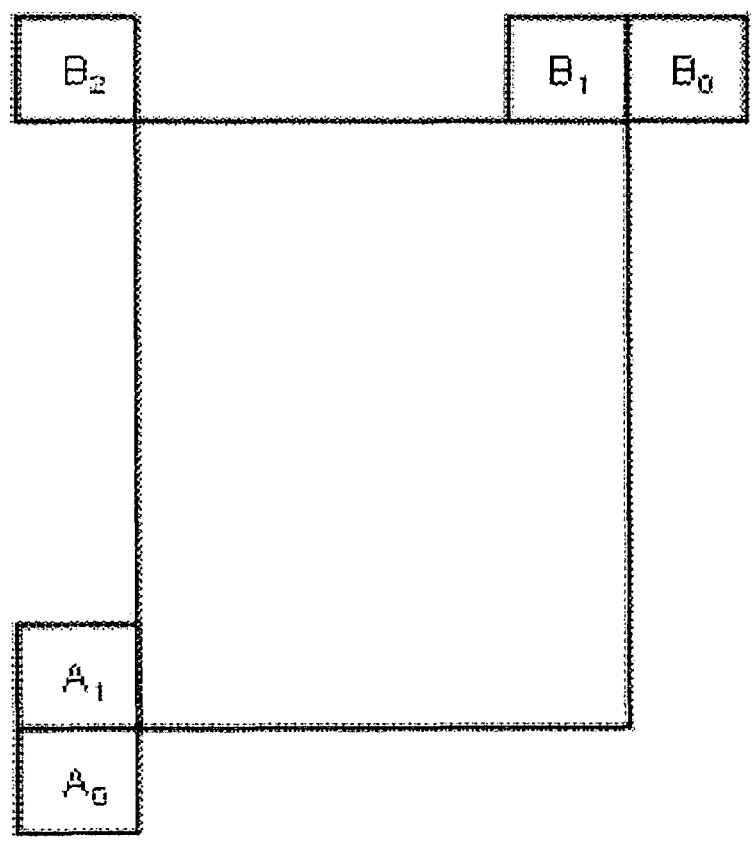
FIG. 20 illustrates spatial motion vector neighbors.

8.1.1.1.6 Derivation process for motion vector predictor candidates
Inputs to this process are
  a luma location (xC, yC) of the top-left sample of the current luma coding block relative to
  the top-left luma sample of the current picture,
  a variable nCS specifying the size of the current luma coding block,
  a luma location (xP, yP) specifying the top-left sample of the current luma prediction block
  relative to the top-left luma sample of the current picture,
  variables specifying the width and the height of the luma prediction block, nPbW and nPbH,
  the reference index of the current prediction unit partition refIdxLX (with X being 0 or 1),
  a variable partIdx specifying the index of the current prediction unit within the current coding
  unit.
Outputs of this process are (with N being replaced by A, or B)
  the motion vectors mvLXN of the neighbouring prediction units,
the availability flags availableFlagLXN of the neighbouring prediction units.
        FIG. 20 illustrates spatial motion vector neighbors (informative)
8.1.1.1.7 Derivation process for advanced temporat motion prediction merging candidate
inputs to this process are
  a luma location (xC, yC) specifying the top-left sample of the current luma prediction block
  relative to the top-left luma sample of the current picture,
  variables specifying the width and the height of the luma prediction block, nCbW and nCbH,
  variable specifying the type of merge mode, mergeType,
  variable specifying the size of sub block unit, subblockLog2Size,
  the availability flags availableFlag$A_0$, availableFlag$A_1$, availableFlag$B_0$, availableFlag $B_1$, with X
  being 0 or 1,
  the reference indices refIdxLX$A_0$, refidxLX$A_1$, refIdxLX$B_0$, refIdxLX$B_1$, with X being 0 or 1,
  the prediction list utilization flags predFlagLX$A_0$, predFlagLX$A_1$, predFlagLX$B_0$, predFlagLX$B_1$,
  with X being 0 or 1,
  the motion vectors mvLX$A_0$, mvLX$A_1$, mvLX$B_0$, mvLX$B_1$, with X being 0 or 1,
  a reference index refIdxLX, with X being 0 or 1.
Outputs of this process are
  the motion vector prediction mvLXATMVP[xP][yP],
  the prediction utilization flags predFlagLXATMVP[xP][yP],
  the availability flag availableFlagATMVP,
The variable subCU specifies the sub luma prediction block at luma location (XP, yP) , 1 <<
subblocksLog2Size as unit.
The variables mvLXATMVP[xP][yP] and availableFlagATMVP are derived as follows.
  If slice_temporal_mvp_enable_flag or sps_atmvp_flag is equal to 0, both components of
  mvLXATMVP are set equal to (0, 0) and availableFlagATMVP is set equal to 0.
  Otherwise, the following ordered steps apply.
  1. Identify the corresponding block in a reference picture, sourcePicture. The derivation
    process for motion parameters for collocated block as specified in subclause 8.1.1.1.7.1
    is invoked with the availability flags availableFlagA0, availableFlagA1, availableFlagB0 and
    availableFlagB1, the prediction list utilization flags predFlagLXA0, predFlagLXA1,
    predFlagLXB0 and predFlagLXB1, the reference indices refIdxLXA0, refIdxLXA1, refIdxLXB0
    and refIdxLXB1 and the motion vectors mvLXA0, mvLXA1, mvLXB0 and mvLXB1, with X
    being 0 or 1, the coding block location (xCb + (nCbW >> 1), yCb + (nCbH >> 1)) and the
    collocated picture colPic as input and the motion vectors centerMvLX, the prediction list
    utilization flags centerPredFlagLX and the reference indices centerRefIdxLX of the
    collocated block (with X = 0,1), and one motion vector mvTemporal as output.
  2. If centerPredFlagLX equalt to 0, availableFlagATMVP is set equal to 0.
  3. Otherwise, the following ordered steps apply.
    availableFlagATMVP is set equal to 1.
    Split the current coding unit into sub coding units and obtain the motion vectors as well
    as reference indices of each sub coding units from the block corespinding to each subCU.
      Derive the temporal motion vector for each subCU. Depending on the values of
      sourcePicture and mvTemporal, is derived as follows.
        The central collocated motion vector is derived as follows.
        xPCtr = Clip3(xCurrCtu, min(CurPicWidthInSamplesY − 1, xCurrCtu +           (8-167)
        (1 << CtuLog2Size) + 3), xP + (nPbW >> 1) + (mvTemporal[0] >> 4))
        yPCtr = Clip3(yCurrCtu, min(CurPicHeightInSamplesY − 1, yCurrCtu +          (8-168)
        (1 << CtuLog2Size) + 3), yP + (nPbH >> 1) + (mvTemporal[1] >> 4))
        The variable colPb specifies the luma prediction block covering the modified
        location given by ((xPCtr >> 3) << 3, (yPCtr >> 3) << 3) inside the
        sourcePicture.
        The luma location (xPCol, yPCol) is set equal to the top-left sample of the of
        the collocated luma prediction block specified by colPb relative to the top-left
        luma sample of the collocated picture specified by sourcePicture.

TABLE 24-continued

The derivation process for motion vectors of each sub coding unit as specified
in subclause 8.1.1.1.9 is invoked with colPic, colPb, (xPCol, yPCol), and refIdxLX
as inputs and the output being assigned to mvLXATMVP[xP][yP] and
predFlagLXATMVP[xP][yP].
If availableFlagLXCol equalt to 0, set colVector equal to centerMvLX.

8.1.1.1.7.1 Derivation process of motion parameters for collocated block
Inputs to this process are:
    a luma location (xCb, yCb) specifying the top-left luma sample of the collocated block relative
to the top-left luma sample of the collocated picture,
    the availability flags availableFlagA0, availabteFlagA1, availableFlagB0 and availableFlagB1,
    the prediction list utilization flags predFlagLXA0, predFlagLXA1, predFlagLXB0, predFlagLXB1
with X being 0 or 1,
    the reference indices refIdxLXA0, refIdxLXA1, refIdxLXB0 and refIdxLXB1, with X being 0 or 1,
    the motion vectors mvLXA0, mvLXA1, mvLXB0 and mvLXB1, with X being 0 or 1,
    a variable colPic, specifying the collocated picture.
Outputs of this process are:
    the motion vectors centerMvLX, with X being 0 or 1,
    the prediction list utilization flags centerPredFlagLX, with X being 0 or 1,
    the reference indices of the collocated block centerRefIdxLX,
    the temporal motion vector mvTemporal.
centerPredFlagLX and centerRefIdxLX, with X being 0 or 1, are set equal to 0 and a variable
candStop is set equal to FALSE.
centerMvLX, with X being 0 or 1, are set equal to (0, 0).
mvTemporal is set equal to (0, 0).
For i in the range of 0 to (slice_type = = B) ? 1:0, inclusive, the following applies:
    If DiffPicOrderCnt(aPic, currPic) is less than or equal to 0 for every picture aPic in every
    reference picture list of the current slice, slice_type is equal to B and
    collocated_from_|0_flag is equal to 0, X is set equal to (1 − i).
    Otherwise, X is set equal to i.
mvTemporal is derived as following step order:
    1. If candStop is equal to FALSE, availableFlagLXA0 is set equal to 1 and
       DiffPicOrderCnt(colPic, RefPicListX[refIdxLXA0]) is equal to 0, the following applies:

| | |
|---|---:|
| mvTemporal = mvLXA0 | (X-XX) |
| candStop = TRUE | (X-XX) |

2. If candStop is equal to FALSE, availableFlagLXB0 is set equal to 1, DiffPicOrderCnt(colPic,
       RefPicListX[refIdxLXB0]) is equal to 0, the following applies:

| | |
|---|---:|
| mvTemporal = mvLXB0 | (X-XX) |
| candStop = TRUE | (X-XX) |

3. If candStop is equal to FALSE, availableFlagLXB1 is set equal to 1, DiffPicOrderCnt(colPic,
       RefPicListX[refIdxLXB1]) is equal to 0, the following applies:

| | |
|---|---:|
| mvTemporal = mvLXB1 | (X-XX) |
| candStop = TRUE | (X-XX) |

4. If candStop is equal to FALSE, availableFlagLXA1 is set equal to 1, DiffPicOrderCnt(colPic,
       RefPicListX[refIdxLXA1]) is equal to 0, the following applies:

| | |
|---|---:|
| mvTemporal = mvLXA1 | (X-XX) |
| candStop = TRUE | (X-XX) |

The luma location (xColPb, yColPb) of the collocated block of the prediction block inside the
collocated picture is derived as:
    xColPb = Clip3(xCurrCtu,
       min(CurPicWidthInSamplesY-1, xCurrCtu + (1 << CtuLog2Size) + 3), xCb +     (X-XX)
       (mvTemporal[0] >> 4))
    yColPb = Clip3(CurrCtu,
       min(CurPicHeightinSamplesY-1, yCurrCtu + (1 << CtuLog2Size) + 3), yCb +     (X-XX)
       (mvTemporal[1] >> 4))
The array colPredMode[x][y] is set equal to the prediction mode array of the collocated picture
specified by colPic.
    if colPredMode[xColPb >> 2][yColPb >> 2] is equal to MODE_INTER, the following applies:
       The derivation process for temporal motion vector prediction in subclause 8.1.1.19 is
       invoked the luma sample location (xColPb, yColPb), colPic, centerRefIdxL0 as inputs and
       the output being assigned to centerMvL0 and centerPredFlagL0.
       The derivation process for temporal motion vector prediction in subclause 8.1.1.1.9 is
       invoked the luma sample location (xColPb, yColPb), colPic, centerRefIdxL1 as inputs and
       the output being assigned to centerMvL1 and centerPredFlagL1.
8.1.1.1.8 Derivation process for temporal luma motion vector prediction
Inputs to this process are
    a luma location (xP, yP) specifying the top-left sample of the current luma prediction block
    relative to the top-left luma sample of the current picture,
    variables specifying the width and the height of the luma prediction block, nPbW and nPbH,
    a reference index refIdxLX (with X being 0 or 1).
Outputs of this process are
    the motion vector prediction mvLXCol,
    the availability flag availableFlagLXCol.
The variable currPb specifies the current luma prediction block at luma location (xP, yP).
The variables mvLXCol and availableFlagLXCol are derived as follows.
    If slice_temporal_mvp_enable_flag is equal to 0, both components of mvLXCol are set equal
    to 0 and availableFlagLXCol is set equal to 0.
    Otherwise, the following ordered steps apply.
    4. Depending on the values of slice_type, collocated_from_|0_flag, and collocated_ref_idx,
       the variable colPic, specifying the picture that contains the collocated partition, is derived
       as follows.

TABLE 24-continued

If slice_type is equal to B and collocated_from_l0_flag is equal to 0, the variable
colPic specifies the picture that contains the collocated partition as specified by
RefPicList1[collocated_ref_idx].
Otherwise (slice_type is equal to B and collocated_from_l0_flag is equal to 1 or
slice_type is equal to P), the variable colPic specifies the picture that contains the
collocated partition as specified by RefPicList0[collocated_ref_idx].

5. The bottom right collocated motion vector is derived as follows xPRb = xP + nPbW    (8-162)
yPRb = yP + nPbH    (8-163)

If (yP >> Log2CtbSizeY) is equal to (yPRb >> Log2CtbSizeY), and xPRb is less
than pic_width_in_luma_samples, the following applies.
  The variable colPb specifies the luma prediction block covering the modified
  location given by ((xPRb >> 4) << 4, (yPRb >> 4) << 4) inside the
  collocated picture specified by colPic.
  The luma location (xPCol, yPCol) is set equal to the top-left sample of the of
  the collocated luma prediction block specified by colPb relative to the top-left
  luma sample of the collocated picture specified by colPic.
  The derivation process for collocated motion vectors as specified in
  subclause 8.5.3.1.9 is invoked with currPb, colPic, colPb, (xPCol, yPCol), and
  refIdxLX as inputs and the output being assigned to mvLXCol and
  availableFlagLXCol.
Otherwise, both components of mvLXCol are set equal to 0 and availableFlagLXCol
is set equal to 0.

6. When availableFlagLXCol is equal to 0, the central collocated motion vector is derived as
follows.

xPCtr = xP + (nPbW >> 1)    (8-164)
yPCtr = yP + (nPbH >> 1)    (8-165)

The variable colPb specifies the luma prediction block covering the modified
location given by ((xPCtr >> 4) << 4, (yPCtr >> 4) << 4) inside the colPic.
The luma location (xPCol, yPCol) is set equal to the top-left sample of the of the
collocated luma prediction block specified by colPb relative to the top-left luma
sample of the collocated picture specified by colPic.
The derivation process for collocated motion vectors as specified in
subclause 8.5.3.1.9 is invoked with currPb, colPic, colPb, (xPCol, yPCol), and
refIdxLX as inputs and the output being assigned to mvLXCol and
availableFlagLXCol.

8.1.1.1.9 Derivation process for collocated motion vectors
Inputs to this process are
  currPb specifying the current prediction block,
  colPic specifying the collocated picture,
  colPb specifying the collocated prediction block inside the collocated picture specified by
  colPic,
  a luma location (xPCol, yPCol) specifying the top-left sample of the collocated luma
  prediction block specified by colPb relative to the top-left luma sample of the collocated
  picture specified by colPic,
  a reference index refidxLX (with X being 0 or 1).
Outputs of this process are
  the motion vector prediction mvLXCol,
  the availability flag availableFlagLXCol.
The variable currPic specifies the current picture.
The arrays predFlagLXCol[x][y], mvLXCol[x][y] and refIdxLXCol[x][y] are set equal to the
corresponding arrays of the collocated picture specified by colPic, PredFlagLX[x][y],
MvLX[x][y] and RefIdxLX[x][y], respectively with X being the value of X this process is invoked
for.
The variables mvLXCol and availableFlagLXCol are derived as follows.
  If colPb is coded in an intra prediction mode, both components of mvLXCol are set equal
  to 0 and availableFlagLXCol is set equal to 0.
  Otherwise, the motion vector mvCol, the reference index refIdxCol, and the reference list
  identifier listCol are derived as follows.
  If predFlagL0Col[xPCol][yPCol] is equal to 0, mvCol, refIdxCol, and listCol are set equal
  to mvL1Col[xPCol][yPCol], refIdxL1Col[xPCol][yPCol], and L1, respectively.
  Otherwise if predFlagL0Col[xPCol][yPCol] is equal to 1 and
  predFlagL1Col[xPCol][yPCol] is equal to 0, mvCol, refIdxCol, and listCol are set equal
  to mvL0Col[xPCol][yPCol], refIdxL0Col[xPCol][yPCol], and L0, respectively.
  Otherwise (predFlagL0Col[xPCol][yPCol] is equal to 1 and
  predFlagL1Col[xPCol][yPCol] is equal to 1), the following assignments are made.
    If DiffPicOrderCnt(currPic, pic) is less than or equal to 0 for every picture pic in every
    reference picture list of the current slice, mvCol, refIdxCol, and listCol are set equal
    to mvLXCol[xPCol][yPCol], refIdxLXCol[xPCol][yPCol] and LX, respectively with X
    being the value of X this process is invoked for.
    Otherwise, mvCol, refIdxCol and listCol are set equal to mvLNCol[xPCol][yPCol],
    refIdxLNCol[xPCol][yPCol] and LN, respectively with N being the value of
    collocated_from_l0_flag.
  and mvLXCol and availableFlagLXCol are derived as follows.
    If LongTermRefPic(currPic, currPb, refIdxLX, LX) is not equal to LongTermRefPic(colPic,
    colPb, refIdxCol, listCol), both components of mvLXCol are set equal to 0 and
    availableFlagLXCol is set equal to 0.

TABLE 24-continued

Otherwise, the variable availableFlagLXCol is set equal to 1, refPicListCol[refIdxCol] is set to be the picture with reference index refIdxCol in the reference picture list listCol of the slice containing prediction block currPb in the picture colPic, and the following applies.

$$\text{colPocDiff} = \text{DiffPicOrderCnt}(\text{colPic}, \text{refPicListCol}[\text{refIdxCol}]) \quad (8\text{-}166)$$
$$\text{currPocDiff} = \text{DiffPicOrderCnt}(\text{currPic}, \text{RefPicListX}[\text{refIdxLX}]) \quad (8\text{-}167)$$

If RefPicListX[refIdxLX] is a long-term reference picture, or colPocDiff is equal to currPocDiff, mvLXCol is derived as:

$$\text{mvLXCol} = \text{mvCol} \quad (8\text{-}168)$$

Otherwise, mvLXCol is derived as scaled version of the motion vector mvCol as specified below.

$$tx = (16384 + (\text{Abs}(td) >> 1))/td \quad (8\text{-}169)$$
$$\text{distScaleFactor} = \text{Clip3}(-4096, 4095, (tb * tx + 32) >> 6) \quad (8\text{-}170)$$
$$\text{mvLXCol} = \text{Clip3}(-32768, \quad (8\text{-}171)$$
$$32767, \text{Sign}(\text{distScaleFactor} * \text{mvCol}) * ((\text{Abs}(\text{distScaleFactor} * \text{mvCol}) + 127) >> 8))$$

where td and tb are derived as $$td = \text{Clip3}(-128, 127, \text{colPocDiff}) \quad (8\text{-}172)$$
$$tb = \text{Clip3}(-128, 127, \text{currPocDiff}) \quad (8\text{-}173)$$

8.1.1.1.10 Derivation process for chroma motion vectors
[Ed.: (WJ) 4:2:0 assumption yet]
Inputs to this process are a luma motion vector mvLX and a reference index refIdLX.
Output of this process is a chroma motion vector mvCLX.
A chroma motion vector is derived from the corresponding luma motion vector.
For the derivation of the chroma motion vector mvCLX, the following applies.

$$\text{mvCLX}[0] = \text{mvLX}[0] \quad (8\text{-}174)$$
$$\text{mvCLX}[1] = \text{mvLX}[1]$$

In the aforementioned embodiment, methods have been described based on flowcharts as a series of steps or blocks, but the methods are not limited to the order of the steps of the present disclosure and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present disclosure and may be deleted.

The embodiments described herein may be implemented and performed on a processor, a microprocessor, a controller, or a chip. For example, functional units illustrated in each drawing may be implemented and performed on a computer, the processor, the microprocessor, the controller, or the chip. In this case, information (e.g., information on instructions) or an algorithm for implementation may be stored in a digital storage medium.

In addition, the decoding apparatus and the encoding apparatus to which the present disclosure may be included in a multimedia broadcasting transmitting and receiving device, a mobile communication terminal, a home cinema video device, a digital cinema video device, a surveillance camera, a video chat device, a real time communication device such as video communication, a mobile streaming device, storage media, a camcorder, a video on demand (VoD) service providing device, an (Over the top) OTT video device, an Internet streaming service providing device, a 3 dimensional (3D) video device, a video telephone video device, a transportation means terminal (e.g., a vehicle terminal, an airplane terminal, a ship terminal, etc.), and a medical video device, etc., and may be used to process a video signal or a data signal. For example, the Over the top (OTT) video device may include a game console, a Blu-ray player, an Internet access TV, a home theater system, a smartphone, a tablet PC, a digital video recorder (DVR), and the like.

In addition, a processing method to which the present disclosure is applied may be produced in the form of a program executed by the computer, and may be stored in a computer-readable recording medium. Multimedia data having a data structure according to the present disclosure may also be stored in the computer-readable recording medium. The computer-readable recording medium includes all types of storage devices and distribution storage devices storing computer-readable data. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media implemented in the form of a carrier wave (e.g., transmission over the Internet). Further, the bitstream generated by the encoding method may be stored in the computer-readable recording medium or transmitted through a wired/wireless communication network.

In addition, the embodiment of the present disclosure may be implemented as a computer program product by a program code, which may be performed on the computer by the embodiment of the present disclosure. The program code may be stored on a computer-readable carrier.

Figure 19:
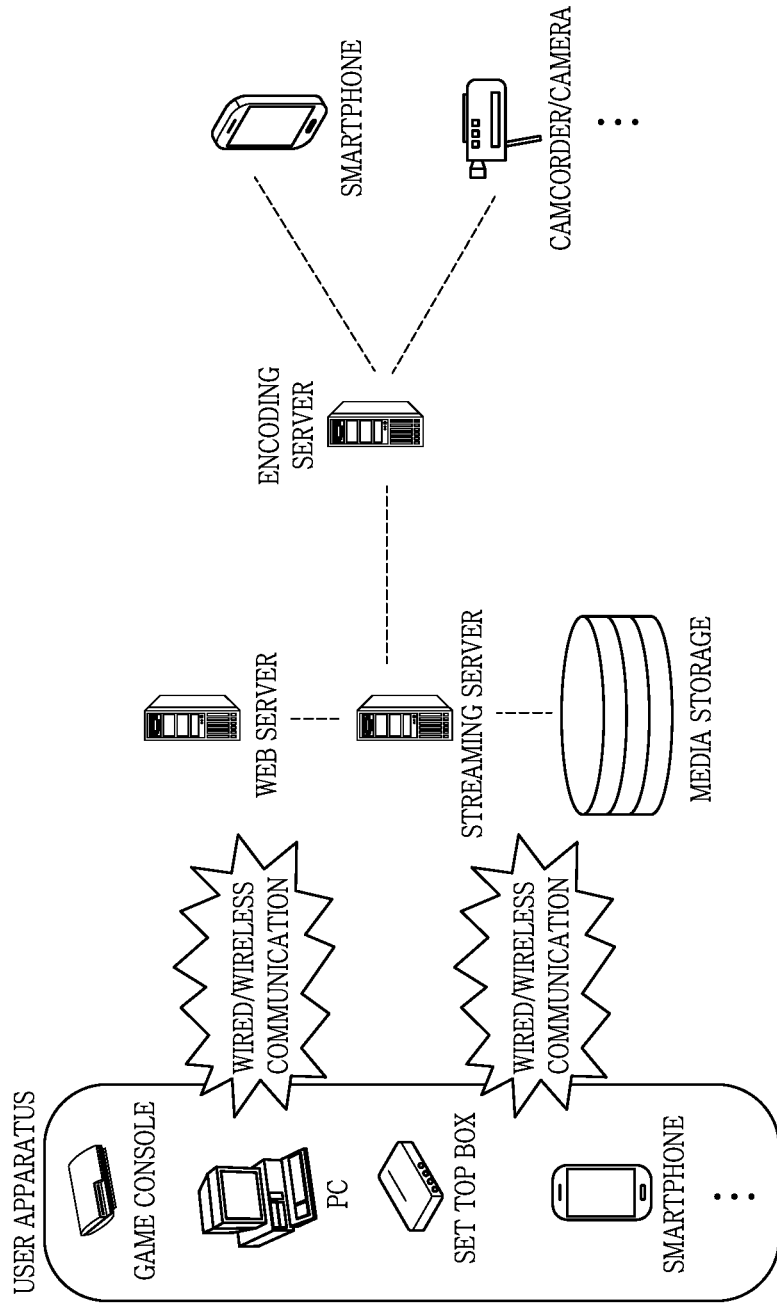
FIG. 19 exemplarily illustrates a configuration diagram of a content streaming system to which the present disclosure is applied.

FIG. 19 illustrates an example of a content streaming system to which embodiments disclosed in this document may be applied.

The content streaming system to which the embodiment(s) of this document is applied may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

What is claimed is:

1. An image decoding method performed by a decoding apparatus, the method comprising:
   obtaining a flag indicating whether to use an advanced temporal motion vector predictor (ATMVP) candidate of a sub-block unit from a bitstream,
   determining whether to use the ATMVP candidate of the sub-block unit for a current block based on the flag;
   specifying a corresponding block related to the current block in a reference picture based on a motion vector for a spatial neighboring block of the current block in case of the ATMVP candidate of the sub-block unit being used;
   deriving the ATMVP candidate of the sub-block unit for the current block based on motion vectors of corresponding sub-blocks related to current sub-blocks split from the current block;
   constructing a merge candidate list including the ATMVP candidate of the sub-block unit for the current block;
   generating prediction samples of the current block by deriving motion vectors of the sub-block unit for the current block based on the merge candidate list; and
   reconstructing a current picture based on the prediction samples of the current block,
   wherein the ATMVP candidate of the sub-block unit is determined not to be used for the current block based on a size of the current block being smaller than a fixed sub-block size which is pre-defined as a minimum sub-block size of 8×8.

2. The image decoding method of claim 1, wherein the ATMVP candidate of the sub-block unit is determined not to be used for the current block based on the size of the current block being any one of 4×4, 4×8, 8×4, or 8×8, and
   wherein based on the ATMVP candidate of the sub-block unit being determined not to be used for the current block, the merge candidate list does not include the ATMVP candidate of the sub-block unit for the current block.

3. The image decoding method of claim 1, wherein the motion vector for the spatial neighboring block of the current block is the motion vector of any one of bottom-left corner neighboring block, left neighboring block, top-right corner neighboring block, top neighboring block, and top-left corner neighboring block of the current block.

4. The image decoding method of claim 3, wherein based on the spatial neighboring block of the current block including at least one of the bottom-left corner neighboring block, the left neighboring block, the top-right corner neighboring block, the top neighboring block, and the top-left corner neighboring block,
   the motion vector for the spatial neighboring block of the current block is a motion vector of a spatial neighboring block determined as being first available by checking an availability of the motion vector of the spatial neighboring block while searching for the spatial neighboring block of the current block in a pre-defined order.

5. The image decoding method of claim 1, wherein the specifying of the corresponding block comprises:
   specifying a location of a top-left sample of the corresponding block corresponding to a location of a top-left sample of the current block in the reference picture; and
   specifying a location moved from the location of the top-left sample of the corresponding block by the motion vector for the spatial neighboring block of the current block in the reference picture as a location of the corresponding block.

6. The image decoding method of claim 1, wherein the deriving of the ATMVP candidate of the sub-block unit for the current block comprises:
   splitting the current block into sub-blocks based on a fixed sub-block size, and
   deriving the motion vectors of sub-blocks within the corresponding block corresponding to sub-blocks within the current block to use the motion vectors of the sub-blocks as the ATMVP candidate of the sub-block unit.

7. The image decoding method of claim 6, wherein the fixed sub-block size is pre-defined as a size of 8×8, 16×16, or 32×32.

8. The image decoding method of claim 6, wherein the information on the fixed sub-block size is signaled from an encoding apparatus.

9. The image decoding method of claim 8, wherein the information on the fixed sub-block size is signaled from the encoding apparatus based on the ATMVP candidate of the sub-block unit being used.

10. The image decoding method of claim 1, wherein the deriving of the ATMVP candidate of the sub-block unit for the current block comprises
    deriving a motion vector of a sample located at the center within the corresponding block and
    using the motion vector of the sample as a motion vector of a specific sub-block, based on the motion vector not existing in the specific sub-block of the corresponding block.

11. An image encoding method performed by an encoding apparatus, the method comprising:
    determining whether to use an advanced temporal motion vector predictor (ATMVP) candidate of a sub-block unit for a current block;
    generating a flag indicating whether to use the ATMVP candidate of the sub-block unit for the current block;
    specifying a corresponding block related to the current block in a reference picture based on a motion vector for a spatial neighboring block of the current block in case of the ATMVP candidate of the sub-block unit being used;

deriving the ATMVP candidate of the sub-block unit for the current block based on motion vectors of corresponding sub-blocks related to current sub-blocks split from the current block;

constructing a merge candidate list including the ATMVP candidate of the sub-block unit for the current block;

generating a candidate index indicating a candidate applied to the current block among the candidates in the merge candidate list; and encoding image information including the flag and the candidate index to output a bitstream, wherein the ATMVP candidate of the sub-block unit is determined not to be used for the current block based on a size of the current block being smaller than a fixed sub-block size which is pre-defined as a minimum sub-block size of 8×8.

12. A non-transitory computer-readable digital storage medium storing a bitstream generated by an image encoding method, the method comprising:

determining whether to use an advanced temporal motion vector predictor (ATMVP) candidate of a sub-block unit for a current block;

generating a flag indicating whether to use the ATMVP candidate of the sub-block unit for the current block;

specifying a corresponding block related to the current block in a reference picture based on a motion vector for a spatial neighboring block of the current block in case of the ATMVP candidate of the sub-block unit being used;

deriving the ATMVP candidate of the sub-block unit for the current block based on motion vectors of corresponding sub-blocks related to current sub-blocks split from the current block;

constructing a merge candidate list including the ATMVP candidate of the sub-block unit for the current block;

generating a candidate index indicating a candidate applied to the current block among the candidates in the merge candidate list; and encoding image information including the flag and the candidate index to output the bitstream, wherein the ATMVP candidate of the sub-block unit is determined not to be used for the current block based on a size of the current block being smaller than a fixed sub-block size which is pre-defined as a minimum sub-block size of 8×8.

* * * * *